US011343725B2

(12) United States Patent
Jin et al.

(10) Patent No.: US 11,343,725 B2
(45) Date of Patent: May 24, 2022

(54) COMMUNICATION METHOD AND APPARATUS

(71) Applicant: HUAWEI TECHNOLOGIES CO., LTD., Guangdong (CN)

(72) Inventors: Yinghao Jin, Shanghai (CN); Yang Yang, Shanghai (CN); Hong Li, Shanghai (CN); Wei Tan, Shanghai (CN); Wenqi Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 57 days.

(21) Appl. No.: 16/265,756

(22) Filed: Feb. 1, 2019

(65) Prior Publication Data

US 2019/0174364 A1 Jun. 6, 2019

Related U.S. Application Data

(63) Continuation of application No. PCT/CN2017/095171, filed on Jul. 31, 2017.

(30) Foreign Application Priority Data

Aug. 11, 2016 (CN) .......................... 201610659437.5

(51) Int. Cl.
*H04W 36/00* (2009.01)
*H04W 36/08* (2009.01)

(52) U.S. Cl.
CPC ... *H04W 36/0033* (2013.01); *H04W 36/0058* (2018.08); *H04W 36/0072* (2013.01); *H04W 36/08* (2013.01)

(58) Field of Classification Search
CPC ............. H04W 72/048; H04W 72/082; H04W 72/0413; H04W 16/10; H04W 36/30;
(Continued)

(56) References Cited

U.S. PATENT DOCUMENTS 11,140,587 B2 * 10/2021 Teyeb ............... H04W 36/0069
2005/0025182 A1 * 2/2005 Nazari ................. H04W 88/06
370/469
(Continued)

FOREIGN PATENT DOCUMENTS

CN 101043734 A 9/2007
CN 104053146 A 9/2014
(Continued)

OTHER PUBLICATIONS

Da Silva Icaro Leonardo et al: "A novel state model for 5G Radio Access Networks", 2016 IEEE International Conference on Communications Workshops (ICC), IEEE, May 23, 2016, pp. 632-637, XP032919936.
(Continued)

*Primary Examiner* — Mahendra R Patel
(74) *Attorney, Agent, or Firm* — Rimon PC

(57) ABSTRACT

This application discloses a communication method and apparatus. The method includes: receiving, by a first device, a first message, where the first device is a primary access network device of a terminal device in a first state, the terminal device in the first state does not send channel state information to the first device, and a core network device and the first device reserve a data plane connection of the terminal device in the first state; determining, by the first device based on the first message, that a second device is a secondary access network device of the terminal device in the first state; sending, by the first device, a second message to the second device, where the second message is used to request to add the second device as the secondary access network device of the terminal device in the first state.

20 Claims, 32 Drawing Sheets

(58) Field of Classification Search
CPC ........ H04W 36/0033; H04W 36/0058; H04W 36/0072; H04W 36/08; H04W 36/0011; H04W 36/0055; H04W 36/14; H04L 5/0053; H04L 5/005; H04L 5/0073; H04M 3/18
USPC .............................. 370/329, 310.2; 455/436
See application file for complete search history.

(56) References Cited

U.S. PATENT DOCUMENTS

| | | | |
|---|---|---|---|
| 2007/0053359 A1* | 3/2007 | Wu | H04L 45/64 370/392 |
| 2009/0003204 A1* | 1/2009 | Okholm | H04L 69/12 370/230 |
| 2009/0161547 A1* | 6/2009 | Riddle | H04L 69/161 370/236 |
| 2009/0186613 A1* | 7/2009 | Ahn | H04L 5/003 455/434 |
| 2010/0184454 A1* | 7/2010 | Luft | H04W 48/02 455/456.5 |
| 2013/0143570 A1* | 6/2013 | Kapoor | H04W 36/0066 455/436 |
| 2013/0229931 A1* | 9/2013 | Kim | H04L 5/0053 370/252 |
| 2014/0004863 A1* | 1/2014 | Zhang | H04W 36/30 455/444 |
| 2014/0036873 A1* | 2/2014 | Cheng | H04W 36/0033 370/331 |
| 2014/0269575 A1* | 9/2014 | Zhang | H04W 72/042 370/329 |
| 2015/0078173 A1* | 3/2015 | Javed | H04W 24/08 370/241 |
| 2015/0103665 A1* | 4/2015 | Kaippallimalil | H04W 76/12 370/235 |
| 2015/0133126 A1* | 5/2015 | Liu | H04W 76/16 455/437 |
| 2015/0171941 A1* | 6/2015 | Yokomakura | H04B 7/0645 370/329 |
| 2015/0181473 A1* | 6/2015 | Horn | H04W 36/0027 370/331 |
| 2015/0223085 A1 | 8/2015 | Siomina | |
| 2015/0288526 A1* | 10/2015 | McLean | H04L 63/0807 713/168 |
| 2016/0021591 A1* | 1/2016 | Lin | H04W 36/30 370/332 |
| 2016/0037405 A1* | 2/2016 | Choi | H04W 48/20 455/444 |
| 2016/0073442 A1* | 3/2016 | Koskinen | H04W 76/15 370/329 |
| 2016/0100344 A1* | 4/2016 | Kodali | H04W 68/02 455/437 |
| 2016/0127107 A1* | 5/2016 | Zhang | H04L 5/001 370/329 |
| 2016/0142973 A1* | 5/2016 | Lee | H04W 36/38 370/311 |
| 2016/0174285 A1* | 6/2016 | Ke | H04W 36/08 370/329 |
| 2016/0212661 A1* | 7/2016 | Basu Mallick | H04L 1/1614 |
| 2016/0212790 A1* | 7/2016 | Fujishiro | H04W 28/0252 |
| 2016/0219475 A1* | 7/2016 | Kim | H04W 28/08 |
| 2016/0302254 A1 | 10/2016 | Dai et al. | |
| 2017/0181044 A1* | 6/2017 | Wen | H04W 76/19 |
| 2017/0215125 A1 | 7/2017 | Wu et al. | |
| 2017/0230898 A1* | 8/2017 | Hapsari | H04M 1/00 |
| 2017/0265133 A1* | 9/2017 | Chandramouli | H04W 36/0072 |
| 2018/0037405 A1* | 2/2018 | Holdstock | D06M 13/10 |
| 2018/0352457 A1 | 12/2018 | Kim et al. | |
| 2019/0159097 A1* | 5/2019 | Tang | H04W 36/22 |
| 2019/0239273 A1* | 8/2019 | Berggren | H04W 76/12 |
| 2020/0092291 A1* | 3/2020 | Vempati | H04L 63/08 |

FOREIGN PATENT DOCUMENTS

| | | |
|---|---|---|
| CN | 104145503 A | 11/2014 |
| CN | 104202778 A | 12/2014 |
| CN | 104581854 A | 4/2015 |
| CN | 104811924 A | 7/2015 |
| CN | 104822169 A | 8/2015 |
| CN | 105307259 A | 2/2016 |
| EP | 2077692 A2 | 7/2009 |
| KR | 20150051143 A | 5/2015 |
| WO | 2015176738 A1 | 11/2015 |
| WO | 2016/013814 A1 | 1/2016 |
| WO | 2016/020752 A2 | 2/2016 |
| WO | 2016087104 A1 | 6/2016 |
| WO | WO-2018018621 A1 * | 2/2018 ......... H04W 72/085 |

OTHER PUBLICATIONS

Ericsson: "Solution for Infrequent Small Data", 3GPP Draft; S2-164249, Jul. 17, 2016, XP051121872.

Mikko Säily et al: "Mobile and wireless Communications Enablers for the Twenty-twenty Information Society-II Deliverable D6.1 Draft Asynchronous Control Functions and Overall Control Plane Design", Jun. 30, 2016, XP055322758.

Huawei, HiSilicon, "Considerations on power efficient RRC state definition in NR",3GPP TSG-RAN2 Meeting #94 R2-164167,Nanjing, China, May 23-27, 2016,total 3 pages.

Ericsson,"Handling of inactive UEs",3GPP TSG-RAN WG2 #94 Tdoc R2-163998,Nanjing, P.R.China, May 23-27, 2016,total 6 pages.

3GPP TR 23.799 V0.7.0 (Aug. 2016);3rd Generation Partnership Project;Technical Specification Group Services and System Aspects;Study on Architecture for Next Generation System(Release 14),total 322 pages.

Catt, UE states in NR from RAN point of view, 3GPP TSG RAN WG2 Meeting #94, R2-163469, Nanjing, China, May 23-27, 2016, 4 pages.

* cited by examiner

COMMUNICATION METHOD AND APPARATUS

CROSS-REFERENCE TO RELATED APPLICATIONS

This application is a continuation of International Application No. PCT/CN2017/095171, filed on Jul. 31, 2017, which claims priority to Chinese Patent Application No. 201610659437.5, filed on Aug. 11, 2016. The disclosures of the aforementioned applications are hereby incorporated by reference in their entireties.

TECHNICAL FIELD

This application relates to the communications field, and in particular, to a communication method and apparatus in the communications field.

BACKGROUND

In a moving process, a terminal device is becoming far away from a cell covered by a network device that originally serves the terminal device, and arrives at a cell covered by a new network device. Generally, the terminal device is handed over from the cell covered by the original network device to the cell covered by the new network device. In a handover process, the terminal device needs to initiate an access request to the new network device, and the new network device obtains context information of the terminal device from the original network device. The new network device needs to perform path transfer with a core network device. Consequently, signaling exchange between the network device and the core network device is increased, causing a relatively large waste of resources.

SUMMARY

A communication method provided in embodiments of this application can reduce signaling overheads and improve resource utilization.

A first aspect provides a communication method, where the method includes: receiving, by a first device, a first message, where the first device is a primary access network device of a terminal device in a first state, the terminal device in the first state does not send channel state information to the first device, and a core network device and the first device reserve a data plane connection of the terminal device in the first state; determining, by the first device based on the first message, that a second device is a secondary access network device of the terminal device in the first state; sending, by the first device, a second message to the second device, where the second message is used to request to add the second device as the secondary access network device of the terminal device in the first state; and receiving, by the first device, an acknowledgment message that is for the second message and that is sent by the second device based on the second message.

In this way, the first device may add the second device as the secondary access network device of the terminal device in the first state, the core network device and the first device reserve at least one data plane connection, the second device does not need to establish a data plane connection to the core network device, and the second device may transmit data by using the data plane connection between the first device and the core network, so as to prevent the core network device from interacting with the second device to generate signaling, thereby improving resource utilization.

The primary access network device maintains a data plane connection between the core network device and the access network device for the terminal device in the first state, and the secondary network device does not reserve a data plane connection between the core network device and the access network device for the terminal device in the first state, but may perform data transmission for the terminal device in the first state on an air interface side.

That the terminal device in the first state does not send the channel state information to the first device may be that the terminal device in the first state does not send the channel state information to the first device in real time. However, in a special scenario, for example, when the first device instructs the terminal device in the first state to send the channel state information, the terminal device in the first state may also send the channel state information to the first device.

Further, when the terminal device in the first state moves from a cell covered by the first device to a cell covered by the second device, no handover operation is performed, but the second device is added as the secondary access network device of the terminal device in the first state. The terminal device in the first state does not need to re-establish a context connection, and the core network device neither perceives mobility of the terminal device in the first state, thereby reducing signaling overheads.

Still further, when network load of the first device is relatively heavy, the second device may be added as the secondary access network device to balance the network load. In this way, the second device may implement data splitting, so that transmission load of the first device can be reduced.

In one embodiment, after the second device is added as the secondary access network device of the terminal device in the first state, the terminal device in the first state may transmit a small data packet with the second device. For example, the small data packet may be data occupying a small quantity of bytes, for example, may be data occupying tens to hundreds of bytes.

In one embodiment, at least one data plane connection of the terminal device in the first state is reserved on the first device, and the terminal device in the first state may also reserve some access stratum context information such as a security algorithm.

In one embodiment, after the receiving, by the first device, an acknowledgment message that is for the second message and that is sent by the second device based on the second message, the method further includes: sending, by the first device, a third message to the terminal device in the first state, where the third message is used to notify the terminal device in the first state that the second device is the secondary access network device of the terminal device in the first state.

In one embodiment, the second device may also send the third message to the terminal device in the first state. For example, when the terminal device in the first state is far away from the cell covered by the first device and reaches the cell covered by the second device, the second device may send the third message to the terminal device in the first state.

In one embodiment, the first device receives an acknowledgment message that is for the third message and that is sent by the terminal device in the first state based on the third message.

In one embodiment, the third message includes at least one of first indication information, identification information of the terminal device in the first state, identification information of a first radio bearer, type information of a radio bearer, and timing advance TA information, where the first indication information is used to indicate that the first device and the core network device reserve a data plane connection and/or the first device reserves a radio bearer of the terminal device in the first state, the identification information of the first radio bearer is used to identify a radio bearer that is able to be transmitted by the second device to the terminal device in the first state, the type information of the radio bearer is used to indicate an allocation manner that is between the first device and the second device and that is of a protocol stack corresponding to the radio bearer, and the TA information is used to indicate time information of timing advance of uplink synchronization between the terminal device in the first state and the second device.

In this way, the terminal device in the first state may learn that the second device is the secondary access network device of the terminal device in the first state, and the terminal device in the first state may learn, based on the first indication information, that the first device and the core network device reserve the data plane connection, and that the first device reserves at least one data plane connection. The terminal device may reserve at least one data plane connection to the first device, and release another data plane connection to the first device, so as to reduce resource wastes and improve resource utilization. In addition, if the third message includes the TA information, the terminal device may adjust time for synchronization with the second device based on a TA value.

In one embodiment, the second message includes at least one of the identification information of the terminal device in the first state, the type information of the radio bearer, and identification information of at least one radio bearer that the first device requests the second device to transmit, where the type information of the radio bearer is used to indicate the allocation manner that is between the first device and the second device and that is of the protocol stack corresponding to the radio bearer.

The type information of the radio bearer may be an allocation manner that is between the first device and the second device and that is of a protocol stack corresponding to a radio bearer that is of the terminal device in the first state and that is reserved by the access network device, and the access network device may include the first device and the second device.

In one embodiment, the acknowledgment message for the second message includes the identification information of the first radio bearer that is able to be transmitted by the second device to the terminal device in the first state, and the identification information of the at least one radio bearer includes the identification information of the first radio bearer.

In one embodiment, the receiving, by a first device, a first message includes: receiving, by the first device, a first measurement report, where the first measurement report is used to indicate first channel quality information between the terminal device in the first state and the second device; and the determining, by the first device based on the first message, that a second device is a secondary access network device of the terminal device in the first state includes: determining, by the first device based on the first channel quality information, that the second device is the secondary access network device of the terminal device in the first state.

In an uplink measurement process, the second device may determine the first measurement report based on a tracking signal, and may send the first measurement report to the first device, so that the first device determines, based on the first measurement report, to add the second device as the secondary access network device of the terminal device in the first state.

Optionally, the first measurement report includes resource indication information of the second device, identity information of the cell covered by the second device, and the identification information of the terminal device in the first state.

In one embodiment, when the second device determines, based on the first channel quality information, that the terminal device in the first state is to be out of synchronization with the second device, the second device adds the TA value to the first measurement report and sends the first measurement report to the first device. The first device may send the TA value to the terminal device in the first state, and the terminal device in the first state adjusts time for synchronization with the second device based on the TA value, so as to reduce a delay caused in a random access process.

In one embodiment, the receiving, by a first device, a first message includes: receiving, by the first device, a cell update message of the terminal device in the first state, where the cell update message is used to indicate that the terminal device in the first state moves from a cell covered by the first device to a cell covered by the second device; and the determining, by the first device based on the first message, that a second device is a secondary access network device of the terminal device in the first state includes: determining, by the first device based on the cell update message, that the second device is the secondary access network device of the terminal device in the first state.

When the terminal device in the first state performs reselection to move from the cell covered by the first device to the cell covered by the second device, the terminal device in the first state may send the cell update message to the second device, and the second device adds a cell identity of the terminal device in the first state and resource indication information of the second device to the cell update message and sends the cell update message to the first device.

Optionally, the cell update message includes the identification information of the terminal device in the first state, identification information of a current cell in which the terminal device in the first state is located, and resource indication information of a remaining resource of the second device.

In one embodiment, the receiving, by a first device, a first message includes: receiving, by the first device, a first state switching request message of the terminal device in the first state, where the first state switching request message is used to request the second device that the terminal device in the first state needs to switch from the first state to an active state; and the determining, by the first device based on the first message, that a second device is a secondary access network device of the terminal device in the first state includes: determining, by the first device based on the first state switching request message, that the second device is the secondary access network device of the terminal device in the first state.

In one embodiment, the first state switching request message includes the identification information of the terminal device in the first state, the identification information of the current cell in which the terminal device in the first state is located, and the resource indication information of the remaining resource of the second device.

In one embodiment, the first message includes at least one of the identification information of the terminal device in the first state, the identification information of the current cell in which the terminal device in the first state is located, a channel quality parameter between the second device and the terminal device in the first state, and resource indication information of the second device, where the current cell in which the terminal device in the first state is located is the cell covered by the second device.

In one embodiment, before the receiving, by a first device, a first message, the method further includes: sending, by the first device, first-state configuration information to the terminal device, so that the terminal device enters the first state according to the first-state configuration information, where the terminal device becomes a terminal device in the first state when the terminal device enters the first state, and the first-state configuration information includes at least one of measurement manner indication information, identification information of the first state allocated by the first device to the terminal device, identification information of a radio bearer reserved by the first device, and a radio resource allocated by the first device to the terminal device.

In one embodiment, before the sending, by the first device, first-state configuration information to the terminal device, the method further includes: receiving, by the first device, capability information of the terminal device that is sent by the terminal device or the core network device, where the capability information includes at least one of: whether the terminal device supports the first state, whether the terminal device supports uplink measurement, and whether the terminal device supports downlink measurement; and the sending, by the first device, first-state configuration information to the terminal device includes: sending, by the first device, the first-state configuration information to the terminal device based on the capability information.

In one embodiment, before the sending, by the first device, first-state configuration information to the terminal device, the method further includes: sending, by the first device, a first-state preset condition to the terminal device; and receiving, by the first device, a second state switching request message sent by the terminal device based on the first-state preset condition, where the second state switching request message is used to request that the terminal device needs to switch from a current state to the first state; and the sending, by the first device, first-state configuration information to the terminal device includes: sending, by the first device, the first-state configuration information to the terminal device based on the second state switching request message.

In one embodiment, the method further includes: sending, by the first device, a paging signal to the terminal device in the first state, where the paging signal includes at least one of a TA value, second indication information, and the identification information of the terminal device in the first state, and the second indication information is used to indicate that a purpose of sending the paging signal is to adjust the TA.

The first device may send the TA value to the terminal device in the first state by using the paging signal. Optionally, the second device sends the TA value to the first device once the second device finds that the second device is to be out of synchronization with the terminal device in the first state, and the first device may send the TA value in the paging signal, so that the terminal device in the first state synchronizes with the second device. In this way, the second device may send the TA value to the terminal device in the first state once the second device finds that synchronization is to be lost, so as to further ensure channel quality of data transmission.

In one embodiment, the first device is an anchor network device AnNR, the second device is an assistant network device AsNR, and the receiving, by a first device, a first message includes: receiving, by the AnNR, the first message sent by the AsNR.

In one embodiment, the first device is an anchor central unit AnCU, the second device is an assistant distribute unit AsDU, the AnCU is configured to control the AsDU and an anchor distribute unit AnDU, and the receiving, by a first device, a first message includes: receiving, by the AnCU, the first message sent by the AsDU.

In one embodiment, before the determining, by the first device based on the first message, that a second device is a secondary access network device of the terminal device in the first state, the method further includes: receiving, by the AnCU, a second measurement report sent by the AnDU, where the second measurement report is used to indicate second channel quality information between the terminal device in the first state and the AnDU; and the determining, by the first device based on the first message, that a second device is a secondary access network device of the terminal device in the first state includes: determining, by the AnCU based on the first message and the second channel quality information, that the AsDU is the secondary access network device of the terminal device in the first state.

The first device may determine, based on the first channel quality information between the second device and the terminal device in the first state, whether to add the second device as the secondary access network device. In addition, the first device may determine, based on the second channel quality information between the first device and the terminal device in the first state, whether to add the second device as the secondary access network device. For example, when channel quality represented by the second channel quality information is better than channel quality represented by the first channel quality information, the second device may not be added as the secondary access network device. When the channel quality represented by the first channel quality information is better than the channel quality represented by the second channel quality information, the second device may be added as the secondary access network device. In this way, the determined second device may reduce a data packet loss rate and further improve data transmission efficiency.

In one embodiment, the first device may determine, based on the cell update information and the second channel quality information, whether to add the second device as the secondary access network device of the terminal device in the first state, or may determine, based on the first state request message and the second channel quality information, whether to add the second device as the secondary access network device of the terminal device in the first state.

In one embodiment, the first device is an anchor central unit AnCU, the second device is an assistant distribute unit AsDU, the AnCU is configured to control an AnDU, and an assistant central unit AsCU is configured to control the AsDU; the receiving, by a first device, a first message includes: receiving, by the AnCU, the first message sent by the AsDU by using the AsCU; the sending, by the first device, a second message to the second device includes: sending, by the AnCU, the second message to the AsDU by using the AsCU; and the receiving, by the first device, an acknowledgment message that is for the second message and that is sent by the second device includes: receiving, by the AnCU, the acknowledgment message that is for the second message and that is sent by the AsDU by using the AsCU.

In one embodiment, before the determining, by the first device based on the first message, that a second device is a secondary access network device of the terminal device in the first state, the method further includes: receiving, by the AnCU, a third measurement report sent by the AnDU, where the third measurement report is used to indicate third channel quality information between the terminal device in the first state and the AnDU; and the determining, by the first device based on the first message, that a second device is a secondary access network device of the terminal device in the first state includes: determining, by the AnCU based on the first message and the third channel quality information, that the second device is the secondary access network device of the terminal device in the first state.

In one embodiment, when the first device is the AnCU and the second device is the AsDU, the first device may receive the third channel quality information that is between the AnDU and the terminal device in the first state and that is sent by the AnDU. The AnCU may compare the first channel quality information and the third channel quality information. If a channel represented by the first channel quality information is better than a channel represented by the third channel quality information, the AnCU determines to add the AsDU as the secondary access network device. If the channel quality represented by the third channel quality information is better than the channel represented by the first channel quality information, the AnCU determines not to add the AsDU as the secondary access network device. The second device determined in this manner may reduce a data packet loss rate and further improve data transmission efficiency.

In one embodiment, the sending, by the first device, a third message to the terminal device in the first state includes: sending, by the AnCU, the third message to the terminal device in the first state by using the AnDU; and the receiving, by the first device, an acknowledgment message that is for the third message and that is sent by the terminal device in the first state based on the third message includes: receiving, by the first device, the acknowledgment message that is for the third message and that is sent by the terminal device in the first state based on the third message by using the AnDU.

In one embodiment, the first message further includes at least one of resource indication information of the AsCU, identification information of the AsCU, and identification information of the AsDU.

That is, when the first device is the AnCU, and the second device is the AsDU, information sent by the second device to the first device needs to be sent by using the AsCU. Therefore, the first information may also include the identification information of the AsCU, the resource indication information of the AsCU, and the like.

In one embodiment, the identification information of the terminal device in the first state includes an identifier of the first device and an identifier of the terminal device in the first state.

In this way, the identification information of the terminal device in the first state may be uniquely identified on the first device and the second device. For example, when the second device obtains the identification information of the terminal device in the first state, the second device may identify, based on the identification information, that a network device serving the terminal device in the first state is the first device, and may send the first measurement report, or the first state request message, or the cell update information to the first device.

A second aspect provides a communication method, where the method includes: receiving, by a second device, a first message, where the first message is used to determine that a third device is a secondary access network device of a terminal device in the first state, the terminal device in the first state does not send channel state information to the first device, and a core network device and the first device reserve a data plane connection of the terminal device in the first state; determining, by the second device based on the first message, that the third device is a secondary access network device of the terminal device in the first state; sending, by the second device, a second message to the first device, where the second message is used to request to add the third device as a secondary access network device of the terminal device in the first state, and the first device is a primary access network device of the terminal device in the first state; and receiving, by the second device, an acknowledgment message that is for the second message and that is sent by the first device based on the second message.

In one embodiment, after the receiving, by the second device, an acknowledgment message that is for the second message and that is sent by the first device based on the second message, the method further includes: sending, by the second device, a third message to the terminal device in the first state, where the third message is used to notify the terminal device in the first state that the third device is the secondary access network device of the terminal device in the first state.

In one embodiment, the third message includes at least one of first indication information, identification information of the terminal device in the first state, identification information of a first radio bearer, type information of a radio bearer, and timing advance TA information, where the first indication information is used to indicate that the first device and the core network device reserve a data plane connection and/or the first device reserves a radio bearer of the terminal device in the first state, the identification information of the first radio bearer is used to identify a radio bearer that is able to be transmitted by the third device to the terminal device in the first state, the type information of the radio bearer is used to indicate an allocation manner that is between the first device and the third device and that is of a protocol stack corresponding to the radio bearer, and the TA information is used to indicate time information of timing advance of uplink synchronization the terminal device in the first state and the third device.

In one embodiment, the second message includes at least one of the identification information of the terminal device in the first state, identification information of at least one radio bearer that is able to be transmitted by the second device, the type information of the radio bearer, and identification information of a cell in which the terminal device in the first state is currently located, where the type information of the radio bearer is used to indicate the allocation manner that is between the first device and the third device and that is of the protocol stack corresponding to the radio bearer, and the cell in which the terminal device in the first state is currently located is a cell served by the second device.

In one embodiment, the acknowledgment message for the second message includes the identification information of the terminal device in the first state and/or the identification information of the first radio bearer that the first device allows the third device to transmit for the terminal device in the first state.

In one embodiment, the receiving, by a second device, a first message includes: determining, by the second device, a first measurement report, where the first measurement report is used to indicate first channel quality information between the terminal device in the first state and the third device; and the determining, by the second device based on the first message, that the third device is a secondary access network device of the terminal device in the first state includes: determining, by the second device based on the first measurement report, that the third device is a secondary access network device of the terminal device in the first state.

In one embodiment, the determining, by the second device, a first measurement report includes: receiving, by the second device, the first measurement report sent by the third device; or the determining, by the second device, a first measurement report includes: receiving, by the second device, an uplink tracking signal sent by the terminal device in the first state, and determining, by the second device, the first measurement report based on the uplink tracking signal, where the first measurement report is used to indicate first channel quality information between the terminal device in the first state and the second device. The second device determines the first channel quality between the third device and the terminal device in the first state based on the first measurement report between the third device and the terminal device in the first state. When the first channel quality meets a channel preset condition, the second device determines to add the third device as the secondary access network device. Alternatively, the second device determines the first channel quality information between the second device and the terminal device in the first state based on the first measurement report between the second device and the terminal device in the first state, and when the first channel quality information meets a channel preset condition, the second device determines to add the second device as the secondary access network device.

In one embodiment, the receiving, by a second device, a first message includes: receiving, by the second device, a cell update message, where the cell update message is used to indicate that the terminal device in the first state moves from a cell covered by the first device to a cell covered by the third device; and the determining, by the second device based on the first message, that the third device is a secondary access network device of the terminal device in the first state includes: determining, by the second device based on the cell update message, that the third device is the secondary access network device of the terminal device in the first state.

In one embodiment, the receiving, by a second device, a first message includes: receiving, by the second device, a first state switching request message, where the first state switching request message is used to request that the terminal device in the first state needs to switch from the first state to an active state; and the determining, by the second device based on the first message, that the third device is a secondary access network device of the terminal device in the first state includes: determining, by the second device based on the first state switching request message, that the third device is the secondary access network device of the terminal device in the first state.

In one embodiment, the first message includes the identification information of the terminal device in the first state and/or identification information of a radio bearer of the terminal device in the first state.

In one embodiment, the first device is an anchor network device AnNR, the second device is an assistant network device AsNR, and the third device is the AsNR.

In one embodiment, the first device is an anchor central unit AnCU, the second device is an assistant central unit AsCU, the third device is an assistant distribute unit AsDU, and the receiving, by a second device, a first message includes: receiving, by the second device, the first message sent by the terminal device in the first state by using the AsDU.

In one embodiment, the sending, by the second device, a third message to the terminal device in the first state includes: sending, by the AsCU, the third message to the terminal device in the first state by using the AsDU.

A third aspect provides an embodiment of a communication method, where the method includes: determining, by a network device, to perform first-state configuration on a terminal device; and sending, by the network device, first-state configuration information to the terminal device, so that the terminal device enters a first state according to the first-state configuration information, where the first-state configuration information is used to indicate that the network device and a core network device reserve a data plane connection, and the first-state configuration information includes at least one of measurement manner indication information, identification information of the first state allocated by the network device to the terminal device, identification information of a radio bearer reserved by the network device, and a radio resource allocated by the network device to the terminal device.

Optionally, the network device receives acknowledgment information that is for the first-state configuration information and that is sent by the terminal device.

In one embodiment, the first-state configuration information is further used to indicate that the network device reserves radio bearer information of the terminal device.

In one embodiment, the determining, by a network device, to perform first-state configuration on a terminal device includes: receiving, by the network device, capability information of the terminal device that is sent by the terminal device or the core network device, where the capability information includes at least one of: whether the terminal device supports the first state, identification information of the terminal device, whether the terminal device supports uplink measurement, and whether the terminal device supports downlink measurement; and determining, by the network device based on the capability information, to perform first-state configuration on the terminal device.

In one embodiment, the determining, by a network device, to perform first-state configuration on a terminal device includes: sending, by the network device, a first-state preset condition to the terminal device; receiving, by the network device, a second state switching request message sent by the terminal device based on the first-state preset condition, where the second state switching request message is used to request that the terminal device needs to switch from a current state to the first state; and determining, by the network device based on the first state switching request message, to perform first-state configuration on the terminal device.

A fourth aspect provides an embodiment of a communication method, where the method includes: sending, by a second device, a first message to a first device, where the first message is used by the first device to determine that the second device is a secondary access network device of a terminal device in a first state, the first device is a primary access network device of the terminal device in the first state, the terminal device in the first state does not send channel state information to the first device, and a core network device and the network device reserve a data plane connection of the terminal device in the first state; receiving, by the second device, a second message sent by the first device based on the first message, where the second message is used to request to add the second device as the secondary access network device of the terminal device in the first state; and sending, by the second device, an acknowledgment message for the second message to the first device based on the second message.

In one embodiment, after the sending, by the second device, an acknowledgment message for the second message to the first device based on the second message, the method further includes: sending, by the second device, a third message to the terminal device in the first state, where the third message is used to notify the terminal device in the first state that the second device is the secondary access network device of the terminal device in the first state; and receiving, by the second device, an acknowledgment message that is for the third message and that is sent by the terminal device in the first state based on the third message.

In one embodiment, the third message includes at least one of first indication information, identification information of the terminal device in the first state, identification information of a first radio bearer, type information of a radio bearer, and timing advance TA information, where the first indication information is used to indicate that the first device and the core network device reserve a data plane connection and/or the first device reserves a radio bearer of the terminal device in the first state, the identification information of the first radio bearer is used to identify a radio bearer that is able to be transmitted by the second device to the terminal device in the first state, the type information of the radio bearer is used to indicate an allocation manner that is between the first device and the second device and that is of a protocol stack corresponding to the radio bearer, and the TA information is used to indicate time information of timing advance of uplink synchronization between the terminal device in the first state and the second device.

In one embodiment, the second message includes at least one of the identification information of the terminal device in the first state, the type information of the radio bearer, and identification information of at least one radio bearer that the first device requests the second device to transmit.

In one embodiment, the acknowledgment message for the second message includes the identification information of the first radio bearer that is able to be transmitted by the second device to the terminal device in the first state, and the identification information of the at least one radio bearer includes the identification information of the first radio bearer.

In one embodiment, the sending, by a second device, a first message to a first device includes: sending, by the second device, a first measurement report to the first device, where the first measurement report is used to indicate first channel quality information between the terminal device in the first state and the second device; and the receiving, by the second device, a second message sent by the first device based on the first message includes: receiving, by the second device, the second message sent by the first device based on the first channel quality information.

In one embodiment, the sending, by a second device, a first message to a first device includes: sending, by the second device, a cell update message of the terminal device in the first state to the first device, where the cell update message is used to indicate that the terminal device in the first state moves from a cell covered by the first device to a cell covered by the second device; and the receiving, by the second device, a second message sent by the first device based on the first message includes: receiving, by the second device, the second message sent by the first device based on the cell update message.

In one embodiment, the sending, by a second device, a first message to a first device includes: sending, by the second device, a first state switching request message of the terminal device in the first state to the first device, where the first state switching request message is used to request the second device that the terminal device in the first state needs to switch from the first state to an active state; and the receiving, by the second device, a second message sent by the first device based on the first message includes: receiving, by the second device, the second message sent by the first device based on the first state switching request message.

In one embodiment, the first message includes at least one of the identification information of the terminal device in the first state, identification information of a current cell in which the terminal device in the first state is located, a channel quality parameter between the second device and the terminal device in the first state, and resource indication information of the second device, where the current cell in which the terminal device in the first state is located is the cell covered by the second device.

In one embodiment, the method further includes: sending, by the second device, a paging signal to the terminal device in the first state, where the paging signal includes at least one of a TA value, second indication information, and the identification information of the terminal device in the first state, and the second indication information is used to indicate that a purpose of sending the paging signal is to adjust the TA.

In one embodiment, the first device is an anchor network device AnNR, and the second device is an assistant network device AsNR.

In one embodiment, the first device is an anchor central unit AnCU, the second device is an assistant distribute unit AsDU, and the AnCU is configured to control the AsDU and an anchor distribute unit AnDU.

In one embodiment, the first device is an anchor central unit AnCU, the second device is an assistant distribute unit AsDU, the AnCU is configured to control an AnDU, and an assistant central unit AsCU is configured to control the AsDU; the sending, by a second device, a first message to a first device includes: sending, by the AsDU, the first message to the AnCU by using the AsCU; the receiving, by the second device, a second message sent by the first device based on the first message includes: receiving, by the AsDU, the second message sent by the AnCU by using the AsCU; and the sending, by the second device, an acknowledgment message for the second message to the first device based on the second message includes: sending, by the AsDU, the acknowledgment message for the second message to the AnCU by using the AsCU.

In one embodiment, the first message further includes at least one of resource indication information of the AsCU, identification information of the AsCU, and identification information of the AsDU.

In one embodiment, the identification information of the terminal device in the first state includes an identifier of the first device and an identifier of the terminal device in the first state.

A fifth aspect provides a communication method, where the method includes: sending, by a terminal device in a first state, a fourth message to a second device, where the fourth information is used by the second device to send a first message, the first message is used to determine that the second device is a secondary access network device of the terminal device in the first state, and the first device is a primary access network device of the terminal device in the first state; when the second device is a secondary access network device of the terminal device in the first state, receiving, by the terminal device in the first state, a third message, where the third message is used to notify the terminal device in the first state that the second device is the secondary access network device of the terminal device in the first state; and sending, by the terminal device in the first state, an acknowledgment message for the third message based on the third message, where the terminal device in the first state does not send channel state information to the first device, and a core network device and the first device reserve a data plane connection of the terminal device in the first state.

In one embodiment, the third message includes at least one of first indication information, identification information of the terminal device in the first state, identification information of a first radio bearer, type information of a radio bearer, and timing advance TA information, where the first indication information is used to indicate that the first device and the core network device reserve a data plane connection and/or the first device reserves a radio bearer of the terminal device in the first state, the identification information of the first radio bearer is used to identify a radio bearer that can be transmitted by the third device to the terminal device in the first state, the type information of the radio bearer is used to indicate an allocation manner that is between the first device and the third device and that is of a protocol stack corresponding to the radio bearer, and the TA information is used to indicate time information of timing advance of uplink synchronization the terminal device in the first state and the third device.

In one embodiment, the sending, by a terminal device in a first state, a fourth message to a second device includes: sending, by the terminal device in the first state, a cell update message of the terminal device in the first state to the second device, where the cell update message is used to indicate that the terminal device in the first state moves from a cell covered by the first device to a cell covered by the second device, and the cell update message includes the identification information of the terminal device in the first state.

In one embodiment, the sending, by a terminal device in a first state, a fourth message to a second device includes: sending, by the terminal device in the first state, a first state switching request message to the second device, where the first state switching request message is used to request the second device that the terminal device in the first state needs to switch from the first state to an active state, and the first state switching request message includes at least one of the identification information of the terminal device in the first state and identification information of the radio bearer of the terminal device in the first state.

In one embodiment, before the sending, by a terminal device in a first state, a fourth message to a second device, the method includes: receiving, by the terminal device, first-state configuration information sent by the first device, where the first-state configuration information includes at least one of measurement manner indication information, identification information of the first state allocated by the network device to the terminal device, identification information of a radio bearer reserved by the network device, and a radio resource allocated by the network device to the terminal device; and entering, by the terminal device, the first state according to the first-state configuration information, and becoming the terminal device in the first state.

In one embodiment, before the receiving, by the terminal device, first-state configuration information sent by the first device, the method further includes: sending, by the terminal device, capability information of the terminal device to the first device, where the capability information includes at least one of: whether the terminal device supports the first state, whether the terminal device supports uplink measurement, and whether the terminal device supports downlink measurement; and the receiving, by the terminal device, first-state configuration information sent by the first device includes: receiving, by the terminal device, the first-state configuration information sent by the first device based on the capability information.

In one embodiment, before the receiving, by the terminal device, first-state configuration information sent by the first device, the method further includes: receiving, by the terminal device, a first-state preset condition sent by the first device; and when the terminal device meets the first-state preset condition, sending, by the terminal device, a second state switching request message to the first device, where the second state switching request message is used to request that the terminal device needs to switch from a current state to the first state.

In one embodiment, the first device is an anchor network device AnNR, and the second device is an assistant network device AsNR.

In one embodiment, the first device is an anchor central unit AnCU, and the second device is an assistant distribute unit AsDU.

A sixth aspect provides a communication method, where the method includes: sending, by a fourth device, a first message to a first device, where the first message is used by the first device to determine that the second device is a secondary access network device of a terminal device in a first state, the first device is a primary access network device of the terminal device in the first state, the terminal device in the first state does not send channel state information to the first device, and a core network device and the first device reserve a data plane connection of the terminal device in the first state; receiving, by the fourth device, a third message sent by the first device based on the first message, and sending the third message to the terminal device in the first state, where the third message is used to notify the terminal device in the first state that the second device is the secondary access network device of the terminal device in the first state; and receiving, by the fourth device, an acknowledgment message that is for the third message and that is sent by the terminal device in the first state, and sending the acknowledgment message for the third message to the first device.

In one embodiment, the third message includes at least one of first indication information, identification information of the terminal device in the first state, identification information of a first radio bearer, type information of a radio bearer, and timing advance TA information, where the first indication information is used to indicate that the first device and the core network device reserve a data plane connection and/or the first device reserves a radio bearer of the terminal device in the first state, the identification information of the first radio bearer is used to identify a radio bearer that is able to be transmitted by the second device to the terminal device in the first state, the type information of the radio bearer is used to indicate an allocation manner that is between the first device and the second device and that is of a protocol stack corresponding to the radio bearer, and the TA information is used to indicate time information of timing advance of uplink synchronization between the terminal device in the first state and the second device.

In one embodiment, the first message is used to indicate second channel quality information between the terminal device in the first state and the fourth device.

In one embodiment, the first device is an anchor central unit AnCU, the second device is an assistant distribute unit AsDU, and the fourth device is an anchor distribute unit AnDU.

A seventh aspect provides a communication method, where the method includes: receiving, by a sixth device, a first message sent by a second device, and sending the first message to a first device, where the first message is used by the first device to determine that the second device is a secondary access network device of a terminal device in a first state, the first device is a primary access network device of the terminal device in the first state, the terminal device in the first state does not send channel state information to the first device, and a core network device and the first device reserve a data plane connection of the terminal device in the first state; receiving, by the sixth device, a second message sent by the first device based on the first message, and sending the second message to the second device, where the second message is used to request to add the second device as the secondary access network device of the terminal device in the first state; and receiving, by the sixth device, an acknowledgment message that is for the second message and that is sent by the second device, and sending the acknowledgment message for the second message to the first device.

In one embodiment, after the receiving, by the sixth device, an acknowledgment message that is for the second message and that is sent by the second device, and sending the acknowledgment message for the second message to the second device, the method further includes: sending, by the sixth device, a third message to the second device, so that the second device sends the third message to the terminal device in the first state, where the third message is used to notify the terminal device in the first state that the second device is the secondary access network device of the terminal device in the first state; and receiving, by the sixth device, an acknowledgment message that is for the third message and that is sent by the second device, where the acknowledgment message for the third message is sent by the terminal device in the first state and received by the second device.

In one embodiment, the first device is an anchor central unit AnCU, the second device is an assistant distribute unit AsDU, and the sixth device is an assistant central unit AsCU.

An eighth aspect provides a communication method, where the method includes: receiving, by a first device, a second message sent by a second device, where the second message is used to request to add a third device as a secondary access network device of a terminal device in the first state, and the first device is a primary access network device of the terminal device in the first state; and sending, by the first device, an acknowledgment message for the second message to the second device, where the terminal device in the first state does not send channel state information to the first device, and a core network device and the first device reserve a data plane connection of the terminal device in the first state.

In one embodiment, the second message includes at least one of identification information of the terminal device in the first state, identification information of a radio bearer, a type of the radio bearer, and identification information of a cell in which the terminal device in the first state is currently located, where the cell in which the terminal device in the first state is currently located is a cell served by the third device.

In one embodiment, the acknowledgment message for the second message includes the identification information of the terminal device in the first state and/or identification information of a first radio bearer that the first device allows the third device to transmit for the terminal device in the first state.

In one embodiment, the first device is an anchor network device AnNR, the second device is an assistant network device AsNR, and the third device is the AsNR.

In one embodiment, the first device is an anchor central unit AnCU, the second device is an assistant central unit AsCU, and the third device is an assistant distribute unit AsDU.

A ninth aspect provides a communication method, where the method includes: receiving, by a terminal device, first-state configuration information sent by a network device, where the first-state configuration information is used to indicate that the network device and a core network device reserve a data plane connection, and the first-state configuration information includes at least one of measurement manner indication information and identification information of a first state allocated by the network device to the terminal device; and entering, by the terminal device, the first state according to the first-state configuration information, where the terminal device in the first state does not send channel state information to the first device, and the core network device and the first device reserve a data plane connection of the terminal device in the first state.

In one embodiment, before the receiving, by a terminal device, first-state configuration information sent by a network device, the method further includes: sending, by the terminal device, capability information of the terminal device to the network device, where the capability information includes at least one of: whether the terminal device supports the first state, identification information of the terminal device, whether the terminal device supports uplink measurement, and whether the terminal device supports downlink measurement; and the receiving, by a terminal device, first-state configuration information sent by a network device includes: receiving, by the terminal device, the first-state configuration information sent by the network device based on the capability information.

In one embodiment, before the receiving, by a terminal device, first-state configuration information sent by a network device, the method further includes: receiving, by the terminal device, a first-state preset condition sent by the network device; and when the terminal device meets the first-state preset condition, sending, by the terminal device, a second state request message to the network device, where the second state request message is used to request that the terminal device needs to switch from a current state to the first state.

A tenth aspect provides a communications apparatus, configured to perform the method in the first aspect or any possible implementation of the first aspect. Specifically, the apparatus includes units configured to perform the method in the first aspect or any possible implementation of the first aspect.

An eleventh aspect provides a communications apparatus, configured to perform the method in the second aspect or any possible implementation of the second aspect. Specifically, the apparatus includes units configured to perform the method in the second aspect or any possible implementation of the second aspect.

A twelfth aspect provides a communications apparatus, configured to perform the method in the third aspect or any possible implementation of the third aspect. Specifically, the apparatus includes units configured to perform the method in the third aspect or any possible implementation of the third aspect.

A thirteenth aspect provides a communications apparatus, configured to perform the method in the fourth aspect or any possible implementation of the fourth aspect. Specifically, the apparatus includes units configured to perform the method in the fourth aspect or any possible implementation of the fourth aspect.

A fourteenth aspect provides a communications apparatus, configured to perform the method in the fifth aspect or any possible implementation of the fifth aspect. Specifically, the apparatus includes units configured to perform the method in the fifth aspect or any possible implementation of the fifth aspect.

A fifteenth aspect provides a communications apparatus, configured to perform the method in the sixth aspect or any possible implementation of the sixth aspect. Specifically, the apparatus includes units configured to perform the method in the sixth aspect or any possible implementation of the sixth aspect.

A sixteenth aspect provides a communications apparatus, configured to perform the method in the seventh aspect or any possible implementation of the seventh aspect. Specifically, the apparatus includes units configured to perform the method in the seventh aspect or any possible implementation of the seventh aspect.

A seventeenth aspect provides a communications apparatus, configured to perform the method in the eighth aspect or any possible implementation of the eighth aspect. Specifically, the apparatus includes units configured to perform the method in the eighth aspect or any possible implementation of the eighth aspect.

An eighteenth aspect provides a communications apparatus, configured to perform the method in the ninth aspect or any possible implementation of the ninth aspect. Specifically, the apparatus includes units configured to perform the method in the ninth aspect or any possible implementation of the ninth aspect.

A nineteenth aspect provides a communications system, including at least two apparatuses of the apparatus according to the tenth aspect or any possible implementation of the tenth aspect, the apparatus according to the thirteenth aspect or any possible implementation of the thirteenth aspect, the apparatus according to the fourteenth aspect or any possible implementation of the fourteenth aspect, the apparatus according to the fifteenth aspect or any possible implementation of the fifteenth aspect, and the apparatus according to the sixteenth aspect or any possible implementation of the sixteenth aspect.

A twentieth aspect provides a communications system, including at least one apparatus of the apparatus according to the eleventh aspect or any possible implementation of the eleventh aspect, the apparatus according to the fourteenth aspect or any possible implementation of the fourteenth aspect, the apparatus according to the fifteenth aspect or any possible implementation of the fifteenth aspect, and the apparatus according to the seventeenth aspect or any possible implementation of the seventeenth aspect.

A twenty-first aspect provides a communications system, including the apparatus according to the twelfth aspect and the apparatus according to the eighteenth aspect.

A twenty-second aspect provides a communications apparatus, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and control the transceiver to send a signal. In addition, when the processor executes the instruction stored in the memory, the execution enables the processor to perform the method in the first aspect or any possible implementation of the first aspect.

A twenty-third aspect provides a communications apparatus, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and control the transceiver to send a signal. In addition, when the processor executes the instruction stored in the memory, the execution enables the processor to perform the method in the second aspect or any possible implementation of the second aspect.

A twenty-fourth aspect provides a communications apparatus, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and control the transceiver to send a signal. In addition, when the processor executes the instruction stored in the memory, the execution enables the processor to perform the method in the third aspect or any possible implementation of the third aspect.

A twenty-fifth aspect provides a communications apparatus, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and control the transceiver to send a signal. In addition, when the processor executes the instruction stored in the memory, the execution enables the processor to perform the method in the fourth aspect or any possible implementation of the fourth aspect.

A twenty-sixth aspect provides a communications apparatus, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and control the transceiver to send a signal. In addition, when the processor executes the instruction stored in the memory, the execution enables the processor to perform the method in the fifth aspect or any possible implementation of the fifth aspect.

A twenty-seventh aspect provides a communications apparatus, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and control the transceiver to send a signal. In addition, when the processor executes the instruction stored in the memory, the execution enables the processor to perform the method in the sixth aspect or any possible implementation of the sixth aspect.

A twenty-eighth aspect provides a communications apparatus, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and control the transceiver to send a signal. In addition, when the processor executes the instruction stored in the memory, the execution enables the processor to perform the method in the seventh aspect or any possible implementation of the seventh aspect.

A twenty-ninth aspect provides a communications apparatus, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and control the transceiver to send a signal. In addition, when the processor executes the instruction stored in the memory, the execution enables the processor to perform the method in the eighth aspect or any possible implementation of the eighth aspect.

A thirtieth aspect provides a communications apparatus, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and control the transceiver to send a signal. In addition, when the processor executes the instruction stored in the memory, the execution enables the processor to perform the method in the ninth aspect or any possible implementation of the ninth aspect.

A thirty-first aspect provides a computer readable medium, configured to store a computer program, and the computer program includes an instruction used to perform the method in the first aspect or any possible implementation of the first aspect.

A thirty-second aspect provides a computer readable medium, configured to store a computer program, and the computer program includes an instruction used to perform the method in the second aspect or any possible implementation of the second aspect.

A thirty-third aspect provides a computer readable medium, configured to store a computer program, and the computer program includes an instruction used to perform the method in the third aspect or any possible implementation of the third aspect.

A thirty-fourth aspect provides a computer readable medium, configured to store a computer program, and the computer program includes an instruction used to perform the method in the fourth aspect or any possible implementation of the fourth aspect.

A thirty-fifth aspect provides a computer readable medium, configured to store a computer program, and the computer program includes an instruction used to perform the method in the fifth aspect or any possible implementation of the fifth aspect.

A thirty-sixth aspect provides a computer readable medium, configured to store a computer program, and the computer program includes an instruction used to perform the method in the sixth aspect or any possible implementation of the sixth aspect.

A thirty-seventh aspect provides a computer readable medium, configured to store a computer program, and the computer program includes an instruction used to perform the method in the seventh aspect or any possible implementation of the seventh aspect.

A thirty-eighth aspect provides a computer readable medium, configured to store a computer program, and the computer program includes an instruction used to perform the method in the eighth aspect or any possible implementation of the eighth aspect.

A thirty-ninth aspect provides a computer readable medium, configured to store a computer program, and the computer program includes an instruction used to perform the method in the ninth aspect or any possible implementation of the ninth aspect.

DESCRIPTION OF EMBODIMENTS

Figure 1:
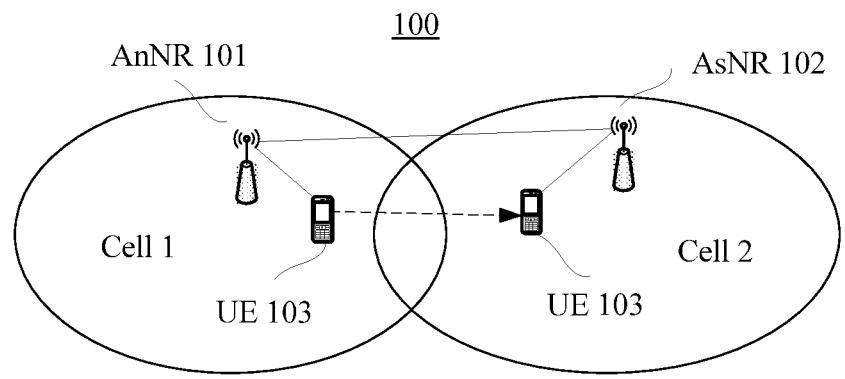
FIG. 1 is a schematic diagram of an application scenario according to an embodiment of this application.

It should be understood that the technical solutions in the embodiments of this application may be applied to various communications systems, for example, current communications systems such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, a Universal Mobile Telecommunications System (UMTS), and particularly a future communications system.

A terminal device in the embodiments of this application may also be referred to as user equipment (UE), an access terminal, a subscriber unit, a subscriber station, a mobile station, a terminal device, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (public land mobile network, PLMN), or the like.

A network device or an access network device in the embodiments of this application may be a device configured to communicate with the terminal device. The network device or the access network device may be a base transceiver station (BTS) in GSM or CDMA, or a NodeB (NodeB, NB) in a WCDMA system, or an evolved NodeB (eNB, or eNodeB) in an LTE system, or a radio controller in a cloud radio access network (CRAN) scenario; or the network device or the access network device may be a relay node, an access point, an in-vehicle device, a wearable device, a network device or an access network device in a future 5G network, a network device or an access network device in a future evolved PLMN network, or the like.

UE in a first state mentioned in the embodiments of this application may continue to reserve a dedicated user identity (dedicated UE ID, DUI) of the UE, and may have some or all of the following functions:

1. Capable of processing some background services and transmitting small packets.

2. Capable of supporting downlink scheduling-free (DL Scheduling-free) transmission, that is, using a downlink shared resource.

3. Capable of supporting uplink grant-free (UL grant-free) transmission, that is, using an uplink shared resource.

4. Capable of sending no channel state information to the first device. For example, the channel state information is not sent to the first device in real time. However, in some special scenarios, the terminal device in the first state may send the channel state information to the first device, for example, when the first device sends instruction information to the terminal device in the first state, and the instruction information instructs the terminal device in the first state to send the channel state information to the first device. This is not limited in the embodiments of this application.

5. Capable of performing a small amount of connection management, for example, long-period link adaptation and long-period measurement.

6. Capable of reserving a radio resource control (radio resource control, RRC) connection to a network side.

7. Capable of reserving a signaling plane bearer and a user plane bearer with a core network; or reserving only the signaling plane bearer with the core network and deleting the user plane bearer with the core network. When an uplink background service or small-packet data needs to be transmitted, the uplink background service or the small-packet data may be sent by using the signaling plane bearer with the core network. For example, the data packet may be carried by using signaling of an access stratum, or the data packet may be carried by using non-access stratum (non-access stratum, NAS) signaling. Optionally, after the data packet is transmitted to a mobility management entity (mobility management Entity, MME), the MME identifies the data packet as a background service or small-packet data, and forwards the background service or the small-packet data to a serving gateway (serving gateway, SGW). Optionally, in an implementation, the UE in the first state may reserve the signaling plane bearer with the core network, delete a dedicated user plane bearer with the core network, and establish a public or default user plane bearer with the core network. When an uplink background service or small-packet data needs to be transmitted, the uplink background service or the small-packet data may be transmitted by using the public or default user plane bearer with the core network.

8. Capable of sending an uplink reference signal, where the uplink reference signal may be sent periodically or may be sent after an event trigger condition is met. The event trigger condition may be triggering based on a speed of the UE, for example, a current sending period configured by the network side is T, and a speed threshold of the UE is V. When the speed of the UE is less than and/or equal to V, the UE may automatically extend a sending interval of the uplink reference signal to N*T, where N=2, 3, and . . . . Further, if the UE is still, the sending period of the uplink reference signal may be set to be infinite. During specific implementation, a maximum sending period of the reference signal may be set, for example, 256 s or 30 min.

The first state may be an ecology conservation optimization (ECO) state, or may be an energy conserved operation. The first state may be a power saving state. The first state may alternatively be an inactive state, and the like. This is not limited in the embodiments of this application.

Active-state UE has a DUI and may have some or all of the following functions:

1. Capable of processing interaction and session services.
2. Capable of using uplink and downlink shared resources and dedicated resources.
3. Capable of supporting fast connection management (such as fast link adaptation and short-period measurement).

As described above, the UE has two states and may switch between the two states. For example, when there is no service data transmission for a period of time after the UE completes data transfer, the UE may switch from the active state to the first state. The UE in the first state may not monitor a dynamic control channel, but merely needs to support a small amount of connection management, which consumes less power than that in the active state.

The following describes a schematic diagram of an application scenario 100 according to the embodiments of this application. The scenario 100 includes a primary network device, at least one secondary network device, and a terminal device. The primary network device may be an anchor new radio (anchor new radio, AnNR) 101, the secondary network device may be an assistant new radio (assistant new radio, AsNR) 102, and the terminal device may be UE 103. An interface exists between the AnNR 101 and the AsNR 102. Usually, the interface may be a wired interface. The UE 103 may be connected to the secondary network device 102 at the same time by using the AnNR 101. A connection established between the EU 103 and the AnNR 101 is a primary connection, and a connection established between the UE 103 and the AsNR 102 is a secondary connection. Control plane data of the UE 103 may be simultaneously transmitted by using the primary connection and the secondary connection. User plane data of the UE 103 may also be simultaneously transmitted by using the primary connection and the secondary connection. The control plane data of the UE 103 may alternatively be transmitted only by using the secondary connection. The user plane data of the UE 103 may alternatively be transmitted only by using the secondary connection. The user plane data of the UE 103 may also be transmitted only by using the primary connection. The user plane data of the UE 103 may also be transmitted only by using the primary connection. The user plane data of the UE 103 may be transmitted by using the primary connection, and the control plane data of the UE 103 may be transmitted by using the secondary connection. The user plane data of the UE 103 may be transmitted by using the secondary connection, and the control plane data of the UE 103 may be transmitted by using the primary connection. For example, when the UE 103 moves from a cell 1 covered by the AnNR 101 to a cell 2 covered by the AsNR 102, channel quality between the UE 103 and the AnNR 101 may deteriorate, and the AsNR 102 needs to offload at least some data transmission of the UE 103. For another example, when network load of the AnNR 101 is relatively heavy, the method in this embodiment of this application may also be used in a scenario in which the AsNR 102 needs to offload a radio bearer of at least some data for the AnNR 101. When the AsNR 102 offloads at least some data of the AnNR 101, a core network device side does not perceive mobility of the user. A context of the user is still maintained on the AnNR 101. When the UE 103 initiates a service on the AsNR 102, the context of the user does not need to be re-established. In addition, data may be offloaded in a protocol stack under a protocol stack 1. Security and integrity protection has been performed on the protocol stack 1, and an RRC verification process does not need to be further performed on an air interface side.

The following describes another application scenario 200 according to the embodiments of this application. The scenario 200 includes:

an anchor central unit (anchor central unit, AnCU) 201, an anchor distribute unit (anchor distribute unit, AnDU) 202, an assistant distribute unit (Assistant Distribute Unit, AsDU) 203, and UE 204. The AnCU 201 is configured to control the AnDU 202 and the AsDU 203. A connection established between the UE 204 and the AnDU 202 is referred to as a primary connection, and a connection established between the UE 204 and the AsDU 203 is referred to as a secondary connection. When the UE 204 moves from a cell 1 (Cell 1) covered by the AnDU 202 to a cell 2 (Cell 2) covered by the AsDU 203, channel quality between the UE 204 and the AnDU 202 may deteriorate, and the AsDU 203 needs to offload a radio bearer of at least some data of the UE 204. For another example, when network load of the AnDU 202 is relatively heavy, the method in this embodiment of this application may also be used in a scenario in which the AsDU 203 needs to offload a radio bearer of at least some data for the AnDU 202. When the AsDU 203 offloads at least some data of the AnDU 202, a core network device side does not perceive mobility of the user, and a context of the user is still maintained on the AnDU 202. When the UE 204 initiates a service on the AsDU 203, the context of the user does not need to be re-established.

The following describes still another application scenario 300 according to the embodiments of this application. The scenario 300 includes an anchor central unit (AnCU) 301, an assistant central unit (AsCU) 302, an anchor distribute unit (AnDU) 303, an assistant distribute unit (AsDU) 304, and UE 305. The AnCU 301 is configured to control the AnDU 303, the AsCU 302 is configured to control the AsDU 304, and an interface exists between the AnCU 301 and the AsCU 302. Usually, the interface may be a wired interface. A connection established between the UE 305 and the AnDU 303 is referred to as a primary connection, and a connection established between the UE 305 and the AsDU 304 is referred to as a secondary connection. When the UE 305 moves from a cell 1 (Cell 1) covered by the AnDU 303 to a cell 2 (Cell 2) covered by the AsDU 304, channel quality between the UE 305 and the AnDU 303 may deteriorate, and the AsDU 304 needs to offload a radio bearer of at least some data of the UE 305. In this scenario 300, an identity of a cell in which the UE 305 is located may be an identity of the cell covered by the AsDU or an identity of a cell covered by the AsCU. For another example, when network load of the AnDU 303 is relatively heavy, the method in this embodiment of this application may also be used in a scenario in which the AsDU 304 needs to offload a radio bearer of at least some data for the AnDU 303. When the AsDU 304 offloads at least some data of the AnDU 303, a core network device side does not perceive mobility of the user, and a context of the user is still maintained on the AnDU 303.

It should be understood that the foregoing UE 103, UE 204, and UE 305 may be UEs in a first state, for example, UEs in an ECO state. The embodiments of this application are not limited thereto.

The application scenarios according to the embodiments of this application are described in detail in the foregoing with reference to FIG. 1 to FIG. 3, and communication methods according to the embodiments of this application are described in detail in the following with reference to FIG. 4 to FIG. 23.

Figure 4:
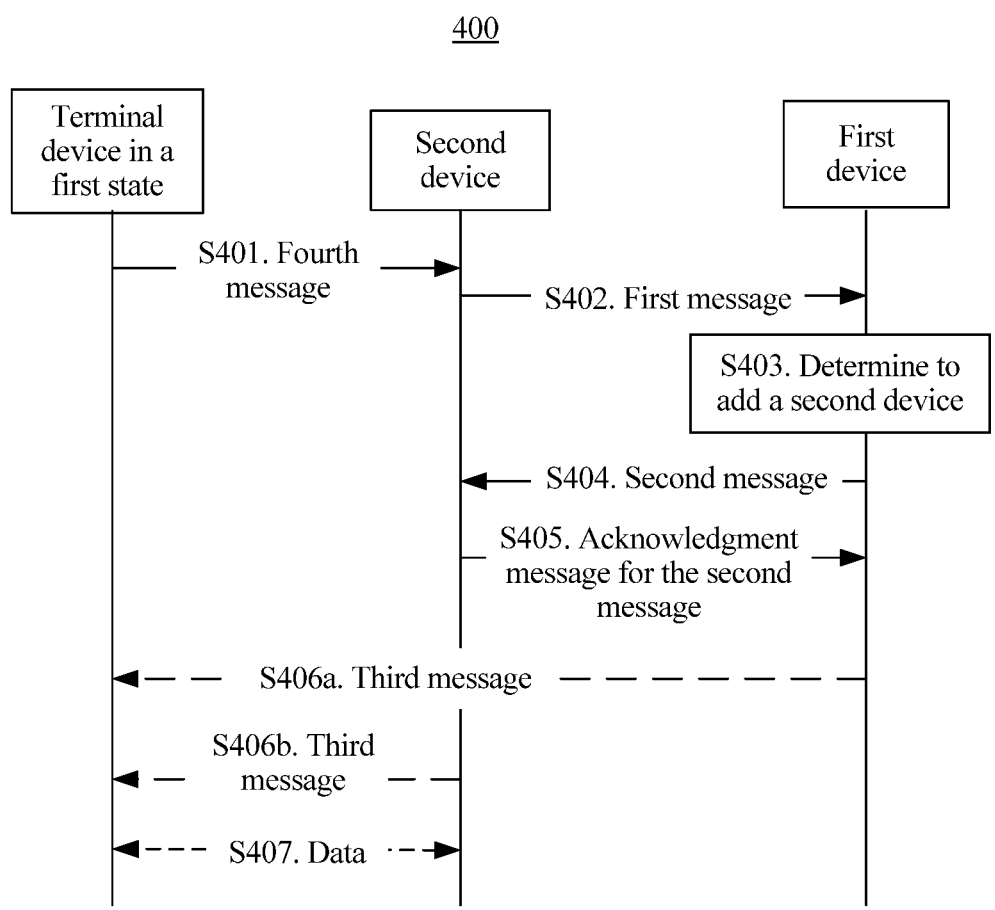
FIG. 4 is a schematic diagram of a communication method according to an embodiment of this application.

FIG. 4 is a schematic diagram of a communication method 400 according to an embodiment of this application. The method 400 includes the following operations.

Operation S401. A terminal device in a first state sends a fourth message to a second device. For example, the fourth message may be a trigger message, used to trigger the second device to send a first message. The first message is used to determine that the second device is a secondary access network device of the terminal device in the first state. The first device is a primary access network device of the terminal device in the first state. The terminal device in the first state does not send channel state information to the first device, and a core network device and the first device reserve a data plane connection of the terminal device in the first state.

For example, the first device may be the AnNR 101 in FIG. 1, the second device may be the AsNR 102 in FIG. 1, and the terminal device in the first state may be the UE 103 in FIG. 1. For another example, the first device may be the AnCU 201 in FIG. 2, the second device may be the AsDU 203 in FIG. 2, and the terminal device in the first state may be the UE 204 in FIG. 2. For still another example, the first device may be the AnCU 301 in FIG. 3, the second device may be the AsDU 304 in FIG. 3, and the terminal device in the first state may be the UE 305 in FIG. 3. Optionally, in S401, the fourth message includes identification information of the terminal device in the first state. Certainly, the fourth message may also include access capability information of the terminal device in the first state and information about a bearer reserved by the terminal device in the first state, for example, quality of service (quality of service, QoS) information of the bearer. This embodiment of this application is not limited thereto.

In operation S401, when the second device receives the fourth message sent by the terminal device in the first state, the second device sends the first message to the first device. That is, the fourth message is used to trigger the second device to send the first message to the first device. Specifically, the identification information of the terminal device in the first state may uniquely identify the terminal device in the first state and the first device that serves the terminal device in the first state. The first device maintains a data plane connection between an access network side and a core network for the terminal device in the first state, and maintains context information of some radio bearers of the terminal device in the first state, such as QoS information and protocol stack information. When receiving the fourth message, the second device finds, based on an identifier that is of the terminal device in the first state and that is carried in the fourth message, the first device serving the terminal device, and then sends the first message to the first device.

It should be understood that the primary access network device reserves the data plane connection of the terminal device in the first state between the core network device and the access network. Optionally, the primary access network device may maintain context information of at least some radio bearers of the terminal device in the first state. The secondary access network device does not reserve the data plane connection of the terminal device in the first state between the core network device and the access network device, but the secondary access network device may transmit data to the terminal device in the first state on an air interface side.

In one embodiment, the fourth message may be an uplink tracking signal (Tracking). When receiving the uplink tracking signal, the second device determines, based on the uplink tracking signal, channel quality information between the terminal device in the first state and a cell covered by the second device, forms a first measurement report, and sends the first measurement report to the first device, so that the first device determines, based on the first measurement report, whether to add the second device as the secondary access network device of the terminal device in the first state. The fourth message may also be a cell update message, that is, when the terminal device in the first state moves from a cell covered by the first device to the cell covered by the second device, the terminal device in the first state sends the cell update message to the second device. The cell update message includes the identification information of the terminal device in the first state. When the second device receives the cell update message, the second device may add, to the first message, resource indication information of a vacant resource location of the second device, the identification information of the terminal device in the first state, and identification information of a current cell in which the terminal device in the first state is located, and send the first message to the first device, so that the first device determines, based on the first message, to add the second device as the secondary access network device of the terminal device in the first state. Similarly, the fourth message may also be a first state switching request message, and the first state switching request message is used to request the second device that the terminal device in the first state needs to switch from the first state to an active state. The first state switching request message includes the identification information of the terminal device in the first state.

It should be understood that, in this embodiment of this application, triggering to add the second device as the secondary access network device of the terminal device in the first state is not limited, or the second device may be added as specified by a network protocol, or may be periodically added according to a specific rule, or may be added through network triggering. This embodiment of this application is not limited thereto.

Operation S402. The second device sends the first message to the first device, and the first device receives the first message.

Optionally, S402 includes: The second device directly sends the first message to the first device, for example, the first device may be the AnNR 101, and the second device may be the AsNR 102; or S402 may include the following: The second device sends the first message to the first device by using a sixth device, for example, the first device is the AnCU 301, the second device is the AsDU 304, and the sixth device may be the AsCU 302 in FIG. 3. Correspondingly, that the first device receives the first message includes: The first device directly receives the first message sent by the second device, or the first device receives the first message sent by the second device by using the sixth device.

In one embodiment, the first message may be a first measurement report, and the first measurement report is used to indicate first channel quality information between the terminal device in the first state and the second device. The first message may alternatively be a cell update message, and the cell update message is used to indicate that the terminal device in the first state moves from the cell covered by the first device to the cell covered by the second device. The first message may be a first state switching request message, and the first state switching request message is used to request the second device that the terminal device in the first state needs to switch from the first state to the active state. This is not limited in this embodiment of this application.

In S402, the first message includes at least one of the identification information of the terminal device in the first state, the identification information of the current cell in which the terminal device in the first state is located, a channel quality parameter between the second device and the terminal device in the first state, and resource indication information of the second device, where the current cell in which the terminal device in the first state is located is the cell covered by the second device.

When the first message is the first measurement report, the first message includes at least one of the identification information of the terminal device in the first state, the identification information of the current cell in which the terminal device in the first state is located, the channel quality parameter between the second device and the terminal device in the first state, and the resource indication information of the second device. Optionally, the first message includes the identification information of the terminal device in the first state, the identification information of the current cell in which the terminal device in the first state is located, and the channel quality parameter between the second device and the terminal device in the first state.

When the first message is the cell update message or the first state switching request message, the first message includes at least one of the identification information of the terminal device in the first state, the identification information of the current cell in which the terminal device in the first state is located, and the resource indication information of the second device. Optionally, the first message includes the identification information of the terminal device in the first state and the identification information of the current cell in which the terminal device in the first state is located.

Operation S403. The first device determines, based on the first message, that the second device is a secondary access network device of the terminal device in the first state.

When receiving the first measurement report, the first device may determine, based on the first channel quality information between the terminal device in the first state and the second device, whether to add the second device as the secondary access network device of the terminal device in the first state. For example, when a channel quality parameter represented by the first channel quality information is greater than a preset first threshold, it is considered that channel quality between the second device and the terminal device in the first state meets a data transmission condition, and the first device may determine that the second device is the secondary access network device of the terminal device in the first state. In one embodiment, the first device may compare the channel quality parameter between the terminal device in the first state and the second device with a channel quality parameter between the terminal device in the first state and the first device, and when the channel quality parameter between the terminal device in the first state and the second device is superior to the channel quality parameter between the terminal device in the first state and the first device, determine that the second device is the secondary access network device of the terminal device in the first state. Optionally, the first device may determine, based on at least one of the resource indication information of the second device, the channel quality parameter between the terminal device in the first state and the second device, and the channel quality parameter between the terminal device in the first state and the first device, whether to add the second device as the secondary access network device of the terminal device in the first state. This is not limited in this embodiment of this application. Certainly, the first device may alternatively determine, based on other information in the first measurement report, whether to add the second device as the secondary access network device of the terminal device in the first state. This embodiment of this application is not limited thereto.

When receiving the cell update message or the first state switching request message, the first device may add, when the first device receives the cell update message or the first state switching request message, the second device as the secondary access network device of the terminal device in the first state. Alternatively, the first device may determine, based on the resource indication information of the second device that is carried in the cell update message or the first state switching request message, whether to add the second device as the secondary access network device of the terminal device in the first state. For example, when a currently available resource of the second device is greater than a preset second threshold, it is determined to add the second device as the secondary access network device of the terminal device in the first state. Alternatively, the first device may determine, based on the channel quality between the first device and the terminal device in the first state and the resource indication information of the second device that is carried in the cell update message or the first state switching request message, whether to add the second device as the secondary access network device of the terminal device in the first state. This embodiment of this application is not limited thereto.

Operation S404. The first device sends a second message to the second device, and the second device receives the second message sent by the first device, where the second message is used to request to add the second device as the secondary access network device of the terminal device in the first state.

Optionally, the second message includes at least one of the identification information of the terminal device in the first state, type information of a radio bearer, and identification information of at least one radio bearer that the first device requests the second device to transmit. Optionally, the second message includes the identification information of the terminal device in the first state, the identification information of the radio bearer, and the type information of the radio bearer. In this way, when the second device transmits data corresponding to the identification information of the radio bearer, the second device is the secondary access network device of the terminal device in the first state. The type information of the radio bearer is used to indicate an allocation manner that is between the first device and the second device and that is of a protocol stack corresponding to the radio bearer.

Specifically, after the first device determines that the second device is the secondary access network device of the terminal device in the first state, the first device determines, based on the identification information of a first terminal device, radio bearer context information reserved by the first device for the terminal device in the first state, and determines, based on channel state information and the resource indication information of the second device that are in the first message, a type of a radio bearer and identification information of the radio bearer that the second device is expected to transmit as the secondary network device. The identification information of the radio bearer indicates that data of which bearers can be transmitted by the second device, so that the second device can transmit data based on the received type information of the radio bearer. The second device may also determine, based on identification information of at least one radio bearer that is sent by the first device, an identifier of a radio bearer that can be received by the second device, and send, to the first device by using an acknowledgment message for the second message, the identifier of the radio bearer that can be received by the second device.

The radio bearer type in this embodiment of this application may be a protocol stack allocation manner used when data corresponding to a specific radio bearer is transmitted. For example, control plane data and user plane data may use a same radio bearer type, or may use different radio bearer types. The type information of the radio bearer may be corresponding to the identification information of the radio bearer, or may not be corresponding to the identification information of the radio bearer. This embodiment of this application is not limited thereto.

For example, the second message may be a secondary-addition request message sent by the first device to the second device.

Operation S405. The second device sends an acknowledgment message for the second message to the first device based on the second message, and the first device receives the acknowledgment message for the second message.

Optionally, the acknowledgment message for the second message includes identification information of a first radio bearer that is able to be transmitted by the second device to the terminal device in the first state, and the identification information of the at least one radio bearer includes the identification information of the first radio bearer. Even if the second device receives the identification information of the radio bearer that is carried in the second message, the second device may determine, based on load of the second device, or identification information of a radio bearer supported by the second device, or resource information of the second device, identification information of a radio bearer that is for performing offloading for the first device. For example, the second message may include three radio bearer IDs, but the second device can transmit only one radio bearer ID in the three radio bearer IDs, and the second device may add, to the acknowledgment message for the second message, the radio bearer ID that can be transmitted by the second device, and send the acknowledgment message for the second message to the first device.

In an optional embodiment, after the first device receives the acknowledgment message that is for the second message and that is sent by the second device based on the second message, the method 400 further includes: S406a. The first device sends a third message to the terminal device in the first state, where the third message is used to notify the terminal device in the first state that the second device is the secondary access network device of the terminal device in the first state. The terminal device in the first state sends an acknowledgment message for the third message to the first device based on the third message, and the first device receives the acknowledgment message that is for the third message and that is sent by the terminal device in the first state based on the third message.

In an embodiment, after the second device sends the acknowledgment message for the second message to the first device based on the second message, the method 400 further includes: S406b. The second device sends a third message to the terminal device in the first state, where the third message is used to notify the terminal device in the first state that the second device is the secondary access network device of the terminal device in the first state. The terminal device in the first state sends an acknowledgment message for the third message to the second device based on the third message. The second device receives the acknowledgment message that is for the third message and that is sent by the terminal device in the first state based on the third message.

In an embodiment, for example, the third message may be a notification message or a paging message, and the third message includes at least one of first indication information, the identification information of the terminal device in the first state, the identification information of the first radio bearer, the type information of the radio bearer, and timing advance TA information. The first indication information is used to indicate that the first device and the core network device reserve a data plane connection and/or the first device reserves a radio bearer of the terminal device in the first state. The identification information of the first radio bearer is used to identify a radio bearer that is able to be transmitted by the second device to the terminal device in the first state, and the type information of the radio bearer is used to indicate the allocation manner that is between the first device and the second device and that is of the protocol stack corresponding to the radio bearer. The TA information is used to indicate time information of uplink synchronization timing advance between the terminal device in the first state and the second device. Optionally, the third message includes the identification information of the terminal device in the first state, the type information of the radio bearer, and the first indication information.

In an embodiment, the acknowledgment message for the third message includes the identification information of the terminal device in the first state.

Specifically, after the second device sends the acknowledgment message for the second message to the first device, the first device or the second device may send the third message to the terminal device in the first state, so as to notify the terminal device in the first state that the second device is a network device serving the terminal device in the first state. When receiving the third message sent by the first device, the terminal device in the first state returns the acknowledgment message for the third message to the first device. When receiving the third message sent by the second device, the terminal device in the first state returns the acknowledgment message for the third message to the second device. For example, when the terminal device in the first state is on the edge of the cell covered by the first device, the first device may send the third message to the terminal device in the first state. When the terminal device in the first state is located within the cell covered by the second device and is far away from the cell covered by the first device, the second device may send the third message to the terminal device in the first state. This is not limited in this embodiment of this application.

In an embodiment, that the terminal device in the first state sends the fourth message to the second device includes: The terminal device in the first state sends an uplink tracking signal to the second device, and the second device determines a first measurement report based on the uplink tracking signal. That the second device sends the first message to the first device includes: The second device sends the first measurement report to the first device, where the first measurement report is used to indicate first channel quality information between the terminal device in the first state and the second device. That the second device receives the second message sent by the first device based on the first message includes: The second device receives the second message sent by the first device based on the first channel quality information. That the first device receives the first message includes: The first device receives the first measurement report. That the first device determines, based on the first message, that the second device is the secondary access network device of the terminal device in the first state includes: The first device determines, based on the first channel quality information, that the second device is the secondary access network device of the terminal device in the first state.

Specifically, the second device may directly send the first measurement report to the first device, or may send the first measurement report to the first device by using the sixth device. The first device may directly receive the first measurement report sent by the second device, or may receive the first measurement report sent by the second device by using the sixth device. When the second device directly sends the first measurement report to the first device, the first measurement report may carry the identification information of the terminal device in the first state, the channel quality parameter between the second device and the terminal device in the first state, the resource indication information of the second device, and identification information of the second device. The identification information of the second device may be construed as the identification information of the current cell in which the terminal device in the first state is located. When the second device sends the first measurement report to the first device by using the sixth device, the first measurement report carries identification information of the sixth device in addition to the foregoing information.

For example, the first channel quality information may be reference signal power, a signal-to-noise ratio, a channel quality indicator (channel quality indicator, CQI), or the like.

In an embodiment, that the terminal device in the first state sends the fourth message to the second device includes: The terminal device in the first state sends a cell update message of the terminal device in the first state to the second device. The cell update message is used to indicate that the terminal device in the first state moves from the cell covered by the first device to the cell covered by the second device, and in this case, the cell update message includes the identification information of the terminal device in the first state. That the second device sends the first message to the first device includes: The second device sends the cell update message of the terminal device in the first state to the first device. That the second device receives the second message sent by the first device based on the first message includes: The second device receives the second message sent by the first device based on the cell update message. That the first device receives the first message includes: The first device receives the cell update message of the terminal device in the first state. That the first device determines, based on the first message, that the second device is the secondary access network device of the terminal device in the first state includes: The first device determines, based on the cell update message, that the second device is the secondary access network device of the terminal device in the first state. In this case, the cell update information includes at least one of the identification information of the terminal device in the first state, the identification information of the current cell in which the terminal device in the first state is located, and the resource indication information of the second device. Optionally, the first message includes the identification information of the terminal device in the first state and the identification information of the current cell in which the terminal device in the first state is located.

Specifically, when the terminal device in the first state uses downlink measurement, and the terminal device in the first state performs reselection based on a result of downlink measurement, to move from the cell covered by the first device to the cell covered by the second device, the terminal device in the first state sends the cell update message to the second device, so as to request the second device that the terminal device in the first state needs to update the cell. The second device sends the cell update message to the first device. The cell update message carries the identification information of the cell in which the terminal device in the first state is located, the resource identification information of the second device, and the identification information of the terminal device in the first state. When receiving the cell update information, the first device determines the second device as the secondary access network device of the terminal device in the first state. Alternatively, the first device determines the second device as the secondary access network device of the first device based on information carried in the cell update message.

In an embodiment, that the terminal device in the first state sends the fourth message to the second device includes: The terminal device in the first state sends a first state switching request message to the second device, where the first state switching request message is used to request the second device that the terminal device in the first state needs to switch from the first state to an active state. In this case, the first state switching request message includes at least one of the identification information of the terminal device in the first state and the identification information of the radio bearer of the terminal device in the first state. That the second device sends the first message to the first device includes: The second device sends the first state switching request message of the terminal device in the first state to the first device. In this case, the first state switching request message includes at least one of the identification information of the terminal device in the first state, the identification information of the current cell in which the terminal device in the first state is located, and the resource indication information of the second device. That the second device receives the second message sent by the first device based on the first message includes: The second device receives the second message sent by the first device based on the first state switching request message. That the second device receives the first message includes: The second device receives the first state switching request message sent by the terminal device in the first state. That the second device determines, based on the first message, that the third device is the secondary access network device of the terminal device in the first state includes: The second device determines, based on the first state switching request message, that the third device is the secondary access network device of the terminal device in the first state.

Specifically, when the terminal device in the first state moves from the cell covered by the first device to the cell covered by the second device, and the terminal device in the first state needs to transmit data, the terminal device in the first state sends the first state switching request message to the second device, to request that the terminal device in the first state needs to switch from the first state to the active state. In this case, the first state switching request message carries the identification information of the first state. When receiving the first state switching request message, the second device sends the first state switching request message to the second device. In this case, the first state switching request message carries at least one of the identification information of the cell in which the terminal device in the first state is located, the resource identification information of the second device, and the identification information of the terminal device in the first state. When receiving the first state switching request message, the first device determines the second device as the secondary access network device of the terminal device in the first state. Alternatively, the first device determines the second device as the secondary access network device of the first device based on information carried in the first state switching request message.

In an embodiment, before the first device receives the first message, the method 400 further includes: The first device sends first-state configuration information to a terminal device, so that the terminal device enters the first state according to the first-state configuration information. The terminal device becomes a terminal device in the first state when the terminal device enters the first state. The first-state configuration information includes at least one of measurement manner indication information, identification information of the first state allocated by the first device to the terminal device, identification information of a radio bearer reserved by the first device, and a radio resource allocated by the first device to the terminal device. The terminal device receives the first-state configuration information sent by the first device.

Specifically, a network needs to perform configuration, so that the terminal device enters the first state. When the terminal device receives the first-state configuration information sent by the first device, the terminal device enters the first state according to the first-state configuration information. Optionally, the first-state configuration information includes the measurement manner indication information, the identification information of the first state allocated by the first device to the terminal device, and the identification information of the radio bearer reserved by the first device. The measurement manner indication information is used to indicate a manner in which the terminal device performs measurement. For example, the measurement manner indication information indicates that the terminal device uses uplink measurement, downlink measurement, or uplink and downlink measurement, and radio bearer information may be, for example, the identification information of the radio bearer. The identification information of the radio bearer is used to identify context information of bearers that is reserved by the first device for the user, and a measurement manner used by the terminal device to transmit data corresponding to the identification information of the radio bearer. In this way, the first state of the terminal device may be configured by using the network, so that configuration flexibility can be improved.

In an embodiment, before the terminal device receives the first-state configuration information sent by the first device, the method 400 further includes: The terminal device or a core network device sends capability information of the terminal device to the first device. The capability information includes at least one of: whether the terminal device supports the first state, whether the terminal device supports uplink measurement, and whether the terminal device supports downlink measurement. Before the first device sends the first-state configuration information to the terminal device, the method 400 further includes: The first device receives the capability information of the terminal device that is sent by the terminal device or the core network device. That the first device sends the first-state configuration information to the terminal device includes: The first device sends the first-state configuration information to the terminal device based on the capability information. That the terminal device receives the first-state configuration information sent by the first device includes: The terminal device receives the first-state configuration information sent by the first device based on the capability information.

Specifically, the terminal device or the core network device may send the capability information of the terminal device to the first device that serves the terminal device, and the network device determines, based on the capability information of the terminal device, whether to perform first-state configuration for the terminal device. For example, when the terminal device supports both uplink and downlink measurement, the first device may determine the measurement manner based on a moving speed of the terminal device, a type of the terminal device, and a current network load status of the first device. For example, when the moving speed of the terminal device is relatively high, the terminal device may be set to use uplink measurement. When the moving speed of the terminal device is relatively low, the terminal device may be set to use downlink measurement.

In an embodiment, before the first device sends the first-state configuration information to the terminal device, the method 400 further includes: The first device or the core network device (such as a control plane gateway) sends a first-state preset condition to the terminal device, and the terminal device receives the first-state preset condition sent by the first device. When the terminal device meets the first-state preset condition, the terminal device sends a second state switching request message to the first device, where the second state switching request message is used to request that the terminal device needs to switch from a current state to the first state. The first device receives the second state switching request message sent by the terminal device based on the first-state preset condition. That the first device sends the first-state configuration information to the terminal device includes: The first device sends the first-state configuration information to the terminal device based on the second state switching request message.

Specifically, the first device may send the first-state preset condition to the terminal device by using access stratum (access stratum, AS) signaling. The first device may send the first-state preset condition in a broadcast, unicast, or multicast manner. A control plane gateway (control gateway, CGW) sends the first-state preset condition to the terminal device by using non-access stratum (non-access stratum, NAS) signaling. The first-state preset condition may be a timer, used to instruct the terminal device to send a second state request message to the first device when the terminal device has no uplink data to transmit or no downlink data to receive in a specific time period, so as to request to enter the first state. For example, the second state request message may carry at least one of information such as the identification information of the terminal device, indication information of a measurement capability supported by the terminal device, and a cause of sending the second state switching request message, where the cause is requesting to switch to the first state.

In an embodiment, the method 400 further includes: The first device or the second device sends a paging signal to the terminal device in the first state. The paging signal includes at least one of a TA value, second indication information, and the identification information of the terminal device in the first state, and the second indication information is used to indicate that a purpose of sending the paging signal is to adjust the TA. The terminal device receives the paging signal sent by the first device.

Specifically, when receiving an uplink tracking signal sent by the terminal device in the first state, the first device or the second device sends a paging signal to the terminal device in the first state if determining, based on the uplink tracking signal, that the terminal in the first state is to be out of synchronization. The paging signal includes the timing advance value, a cause of sending the paging signal, and the identification information of the terminal device in the first state. When the terminal device in the first state receives the paging signal, the terminal device in the first state implements synchronization with the first device or the second device based on the TA value in the paging signal. That is, the first device may send the paging signal to implement synchronization between the terminal device in the first state and the first device, and the second device may send the paging signal to implement synchronization between the terminal device in the first state and the second device. Optionally, the uplink tracking signal received by the first device and the uplink tracking signal received by the second device may be both considered to determine one TA value, and the first device or the second device sends the TA value to the terminal device in the first state, so that the terminal device in the first state can implement synchronization with the first device and the second device at the same time.

In an embodiment, the first device is the AnNR 101 in FIG. 1, and the second device is the AsNR 102 in FIG. 1. That the first device receives the first message includes: The AnNR 101 receives the first message sent by the AsNR 102.

Figure 2:
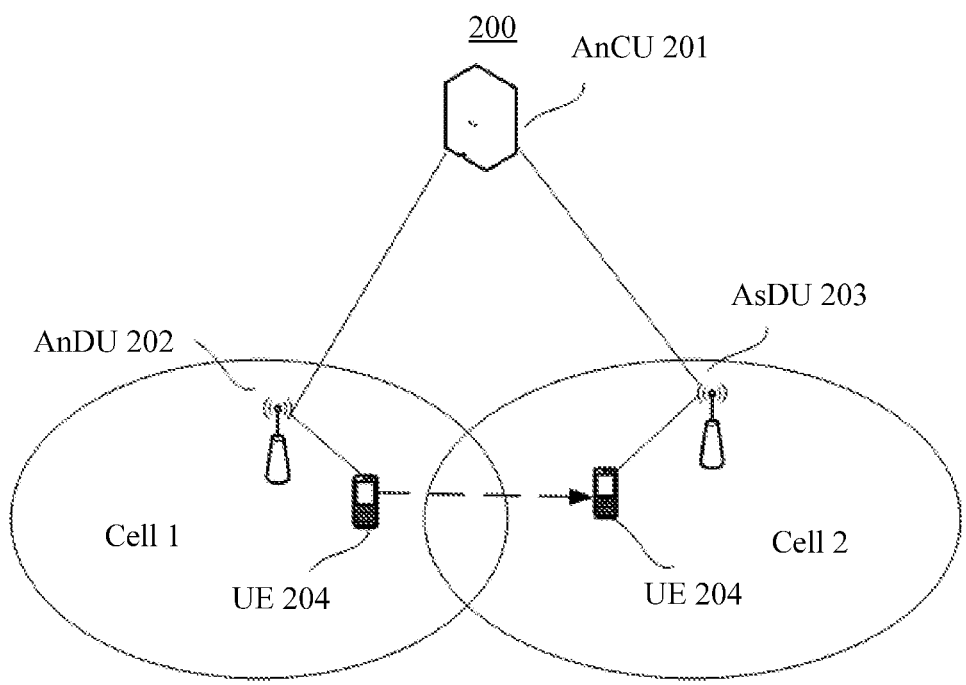
FIG. 2 is a schematic diagram of another application scenario according to an embodiment of this application.

In an optional embodiment, the first device is the anchor central unit AnCU 201 in FIG. 2, the second device is the assistant distribute unit AsDU 203, and the AnCU 201 is configured to control the AsDU 203 and the anchor distribute unit AnDU 202. That the first device receives the first message includes: The AnCU 201 receives the first message sent by the AsDU 203.

In an embodiment, before the first device determines, based on the first message, that the second device is the secondary access network device of the terminal device in the first state, the method 400 further includes: The AnCU 201 receives a second measurement report sent by the AnDU 202, where the second measurement report is used to indicate second channel quality information between the terminal device in the first state and the AnDU 202. That the first device determines, based on the first message, that the second device is the secondary access network device of the terminal device in the first state includes: The AnCU 201 determines, based on the first message and the second channel quality information, that the AnDU 202 is the secondary access network device of the terminal device in the first state.

Specifically, the AnCU 201 may not only receive the first measurement report, the cell update message, or the first state switching request sent by the AsDU 203, but also receive the second measurement report sent by the AnDU 202. The AnCU 201 may determine, based on the first measurement report, the cell update message, or the first state switching request, and the second measurement report, whether to add the AsDU 203 as the secondary access network device of the terminal device in the first state. For example, based on the first measurement report between the terminal device in the first state and the AsDU 203 and the second measurement report between the terminal device in the first state and the AnDU 202, the AnCU 201 determines channel quality between the terminal device in the first state and the two devices. When the channel quality between the terminal device in the first state and the AsDU 203 is better than the channel quality between the terminal device in the first state and the AnDU 202, the AnCU 201 determines that the AsDU 203 is the secondary access network device of the terminal device in the first state.

Figure 3:
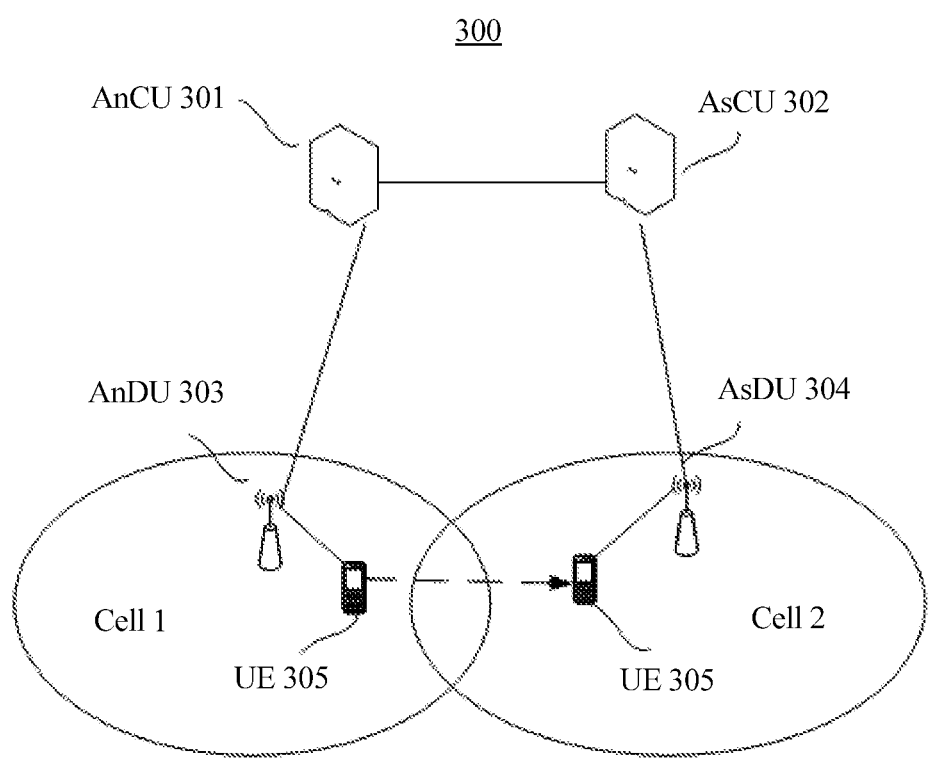
FIG. 3 is a schematic diagram of still another application scenario according to an embodiment of this application.

In an optional embodiment, the first device is the anchor central unit AnCU 301 in FIG. 3, the second device is the assistant distribute unit AsDU 304 in FIG. 3, the AnCU 301 is configured to control the AnDU 303, and the assistant central unit AsCU 302 is configured to control the AsDU 304. That the second device sends the first message to the first device includes: The AsDU sends the first message to the AnCU by using the AsCU 302. That the first device receives the first message includes: The AnCU 301 receives the first message sent by the AsDU 304 by using the AsCU 302. That the first device sends the second message to the second device includes: The AnCU 301 sends the second message to the AsDU 304 by using the AsCU 302. That the second device receives the second message sent by the first device based on the first message includes: The AsDU 304 receives the second message sent by the AnCU 301 by using the AsCU 302. That the second device sends the acknowledgment message for the second message to the first device based on the second message includes: The AsDU 304 sends the acknowledgment message for the second message to the AnCU 301 based on the second message by using the AsCU 302. That the first device receives the acknowledgment message that is for the second message and that is sent by the second device includes: The AnCU 301 receives the acknowledgment message that is for the second message and that is sent by the AsDU 304 by using the AsCU 302.

In an embodiment, the second device sends a first message to the sixth device, and the sixth device receives the first message and sends the first message to the first device. The first message is used by the first device to determine that the second device is the secondary access network device of the terminal device in the first state. The first device sends a second message to the sixth device based on the first message, the sixth device sends the second message to the second device, the sixth device receives an acknowledgment message for the second message, the sixth device sends a third message to the second device, the second device sends the third message to the terminal device in the first state, and the sixth device receives an acknowledgment message that is for the third message and that is sent by the second device. That is, the sixth device may be construed as a forwarding device. Specifically, the first device may be the AnCU 301, the second device may be the AsDU 304, and the sixth device may be the AsCU 302.

In an embodiment, before the first device determines, based on the first message, that the second device is the secondary access network device of the terminal device in the first state, the method 400 further includes: The AnDU 303 sends a third measurement report to the AnCU 301, and the AnCU 301 receives the third measurement report sent by the AnDU 303. The third measurement report is used to indicate third channel quality information between the terminal device in the first state and the AnDU 303. That the first device determines, based on the first message, that the second device is the secondary access network device of the terminal device in the first state includes: The AnCU 301 determines, based on the first message and the third channel quality information, that the second device is the secondary access network device of the terminal device in the first state.

Specifically, the AnCU 301 may not only receive the first measurement report, the cell update message, or the first state switching request sent by the AsDU 304, but also receive the third measurement report sent by the AnDU 303. The AnCU 301 may determine, based on the first measurement report, the cell update message, or the first state switching request, and the third measurement report, whether to add the AsDU 304 as the secondary access network device of the terminal device in the first state. For example, based on the first measurement report between the terminal device in the first state and the AsDU 304 and the third measurement report between the terminal device in the first state and the AnDU 303, the AnCU 301 determines channel quality between the terminal device in the first state and the two devices. When the channel quality between the terminal device in the first state and the AsDU 304 is better than the channel quality between the terminal device in the first state and the AnDU 303, the AnCU 301 determines that the AsDU 304 is the secondary access network device of the terminal device in the first state.

In one embodiment, that the first device sends the third message to the terminal device in the first state includes: The first device sends the third message to a fourth device, and the fourth device receives the third message sent by the first device based on the first information and sends the third message to the terminal device in the first state. The third message is used to notify the terminal device in the first state that the second device is the secondary access network device of the terminal device in the first state. The terminal device in the first state sends an acknowledgment message for the third message to the fourth device, and after receiving the acknowledgment message for the third message, the fourth device sends the acknowledgment message for the third message to the first device. Specifically, the first device is the AnCU 301, the second device is the AsDU 304, and the fourth device is the AnDU 303.

In an embodiment, that the first device sends the third message to the terminal device in the first state includes: The AnCU 301 sends the third message to the terminal device in the first state by using the AnDU 303. That the first device receives the acknowledgment message that is for the third message and that is sent by the terminal device in the first state based on the third message includes: The first device receives the acknowledgment message that is for the third message and that is sent by the terminal device in the first state based on the third message by using the AnDU 303.

In an embodiment, the first message further includes at least one of resource indication information of the AsCU, identification information of the AsCU, and identification information of the AsDU.

In an optional embodiment, the identification information of the terminal device in the first state includes an identifier of the first device and an identifier of the terminal device in the first state.

Optionally, the method 400 further includes: S407. After the second device is added as the secondary access network device, data may be forwarded to the second device by using the first device, and the data is transmitted between the second device and the terminal device in the first state. Certainly, the data may also be transmitted between both the first device and the second device and the terminal device in the first state. This embodiment of this application is not limited thereto.

Figure 5:
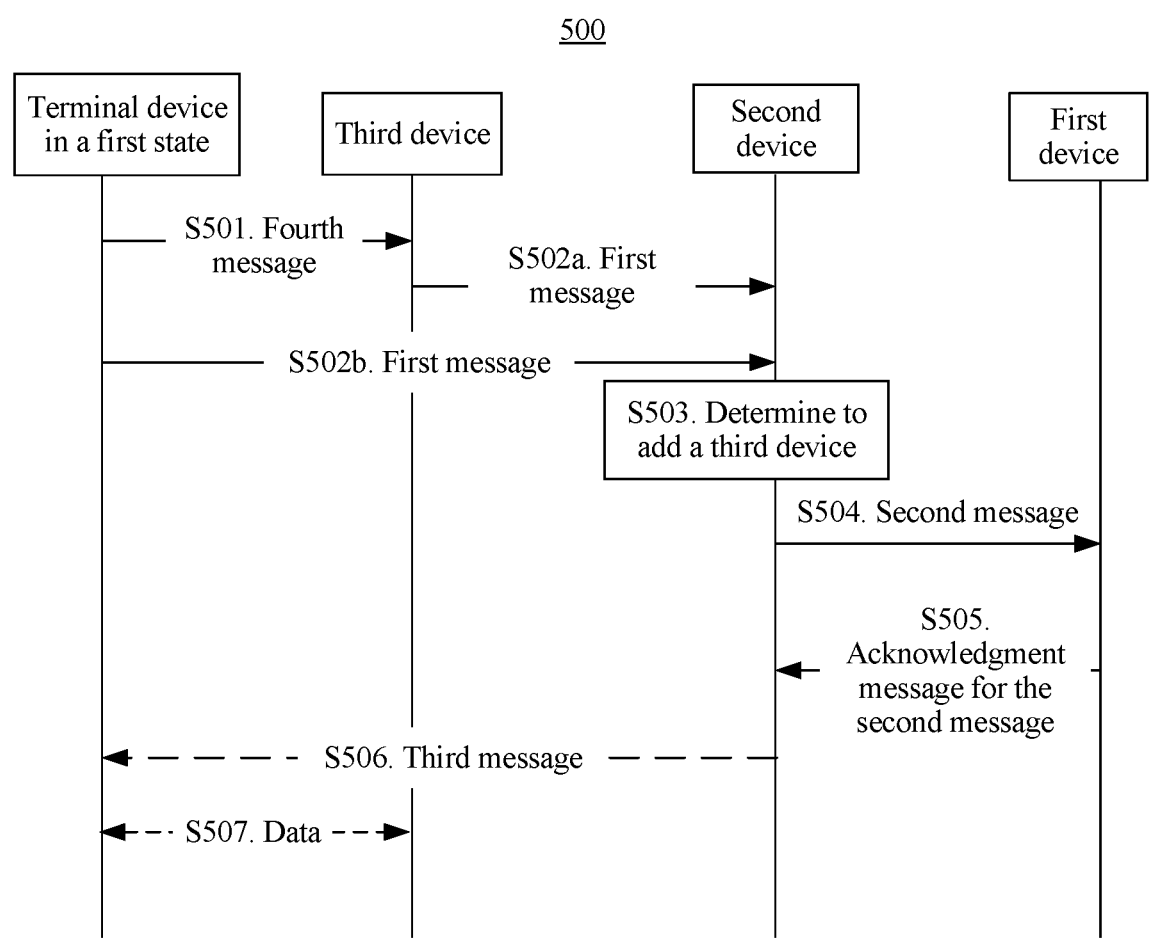
FIG. 5 is a schematic diagram of another communication method according to an embodiment of this application.

With reference to FIG. 4, the communication method 400 according to this embodiment of this application is described in detail in the foregoing. The method 400 is as follows: The first device determines to add the second device as the secondary access network device of the terminal device in the first state. With reference to FIG. 5, a method 500 for determining to add a second device or a third device as a secondary access network device of the terminal device in the first state by the second device is described in detail in the following.

FIG. 5 shows a communication method 500 according to an embodiment of this application. The method 500 includes the following operations.

Operation S501. A terminal device in a first state sends a fourth message to a third device, where the fourth information is used to instruct the third device to send a first message, the first message is used to determine that the second device is a secondary access network device of the terminal device in the first state, and the first device is a primary access network device of the terminal device in the first state.

Operation S502 includes S502a or S502b. S502a is as follows: The third device sends a first message to the second device. S502b is as follows: The terminal device in the first state sends a first message to the second device, where the first message is used to determine that the second device is the secondary access network device of the terminal device in the first state. The second device receives the first message. The second device may receive the first message sent by the terminal device in the first state, or the second device may receive the first message sent by the third device. The first message is used to determine that the third device is the secondary access network device of the terminal device in the first state. The terminal device in the first state does not send channel state information to the first device, and a core network device and the first device reserve a data plane connection of the terminal device in the first state.

It should be understood that the fourth message in S501 may be the fourth message in S401, that is, in S401, when the first device determines that the second device is the secondary access network device of the terminal device in the first state, a message received by the second device and sent by the terminal device in the first state is referred to as a fourth message. A message sent by the second device to the first device based on the fourth message is referred to as a first message. The message sent by the terminal device in the first state and received by the second device in S501 is used by the second device to determine that the third device is the secondary access network device of the terminal device in the first state, that is, both the message received by the first device and the message received by the second device for determining the secondary access network device of the terminal device in the first state are referred to as first messages.

Optionally, the first message includes identification information of the terminal device in the first state and/or identification information of a radio bearer of the terminal device in the first state.

Optionally, the first message may be a first measurement report, and the first measurement report is used to indicate first channel quality information between the terminal device in the first state and the third device. The first message may alternatively be a cell update message, and the cell update message is used to indicate that the terminal device in the first state moves from a cell covered by the first device to a cell covered by the second device. The first message may be a first state switching request message, and the first state switching request message is used to request the second device that the terminal device in the first state needs to switch from the first state to an active state. This is not limited in this embodiment of this application.

Operation S503. The second device determines, based on the first message, that the third device is the secondary access network device of the terminal device in the first state.

Specifically, when the terminal device in the first state sends uplink tracking to the third device, the third device determines the first measurement report based on the uplink tracking signal. The first measurement report is used to indicate the first channel quality information between the terminal device in the first state and the third device, and the third device sends the first measurement report to the second device. Then, the first message received by the second device is the first measurement report, and the second device determines, based on the first measurement report, whether to add the third device as the secondary access network device of the terminal device in the first state. For example, when the channel quality information is greater than a threshold of the device, it is determined to add the third device as the secondary access network device of the terminal device in the first state. For another example, the second device may determine, based on resource information of the second device and/or the channel quality information, whether to add the third device as the secondary access network device of the terminal device in the first state. This embodiment of this application is not limited thereto.

When the first message is the cell update message, that is, when the terminal device in the first state moves from the cell covered by the first device to a cell covered by the third device, the terminal device in the first state sends the cell update message to the third device. The cell update message includes the identification information of the terminal device in the first state and the identification information of the radio bearer of the terminal device in the first state. When receiving the cell update message, the second device determines, based on a current resource status of the second device and the identification information of the radio bearer of the terminal device in the first state, whether to add the third device as the secondary access network device of the terminal device in the first state. Likewise, the first message may alternatively be the first state switching request message, the first state switching request message is used to request the second device that the terminal device in the first state needs to switch from the first state to the active state. The first state switching request message includes the identification information of the terminal device in the first state. When the second device receives the first state switching request message, the second device determines to add the third device as the secondary access network device of the terminal device in the first state. Alternatively, when receiving the first state switching request, the second device determines, based on a resource status of the second device, whether to add the third device as the secondary access network device of the terminal device in the first state.

Operation S504. The second device sends a second message to the first device, and the first device receives the second message sent by the second device, where the second message is used to request to add the third device as the secondary access network device of the terminal device in the first state, and the first device is a primary access network device of the terminal device in the first state.

Optionally, the second message includes at least one of the identification information of the terminal device in the first state, the identification information of the radio bearer, a type of the radio bearer, and identification information of a cell in which the terminal device in the first state is currently located, where the cell in which the terminal device is currently located is the cell served by the second device.

Operation S505. The first device sends an acknowledgment message for the second message to the second device, and the second device receives the acknowledgment message that is for the second message and that is sent by the first device based on the second message.

Optionally, the acknowledgment message for the second message includes the identification information of the terminal device in the first state and/or type information of a radio bearer that is determined by the first device and that is able to be transmitted by the third device to the terminal device in the first state.

In an optional embodiment, after the second device receives the acknowledgment message that is for the second message and that is sent by the first device, the method 500 further includes: S506. The second device sends a third message to the terminal device in the first state, where the third message is used to notify the terminal device in the first state that the third device is the secondary access network device of the terminal device in the first state. The terminal device in the first state sends an acknowledgment message for the third message based on the third message, and the second device receives the acknowledgment message for the third message.

Optionally, the third message includes at least one of first indication information, the identification information of the terminal device in the first state, identification information of a first radio bearer, type information of the radio bearer, and timing advance TA information. The first indication information is used to indicate that the first device and the core network device reserve a data plane connection and/or the first device reserves the radio bearer of the terminal device in the first state. The identification information of the first radio bearer is used to identify a radio bearer that is able to be transmitted by the third device to the terminal device in the first state. The type information of the radio bearer is used to indicate an allocation manner that is between the first device and the third device and that is of a protocol stack corresponding to the radio bearer. The TA information is used to indicate time information of uplink synchronization timing advance between the terminal device in the first state and the second device.

In an optional embodiment, that the terminal device in the first state sends the first message to the second device includes: The terminal device in the first state sends a tracking signal to the second device. That the second device receives the first message includes: The second device determines a first measurement report. The second device receives an uplink tracking signal and determines the first measurement report based on the uplink tracking signal; or the second device receives a first measurement report sent by the third device, where the first measurement report is used to indicate first channel quality information between the terminal device in the first state and the third device. That the second device determines, based on the first message, that the third device is the secondary access network device of the terminal device in the first state includes: The second device determines the first channel quality information between the terminal device in the first state and the second device based on the tracking signal. When the first channel quality information meets a preset condition, the second device determines that the third device is the secondary access network device of the terminal device in the first state.

In an optional embodiment, that the terminal device in the first state sends the first message to the second device includes: The terminal device in the first state sends a cell update message of the terminal device in the first state to the second device. The cell update message is used to indicate that the terminal device in the first state moves from the cell covered by the first device to the cell covered by the third device, and the cell update message includes the identification information of the terminal device in the first state. That the second device receives the first message includes: The second device receives the cell update message sent by the terminal device in the first state. That the second device determines, based on the first message, that the third device is the secondary access network device of the terminal device in the first state includes: The second device determines, based on the cell update message, that the third device is the secondary access network device of the terminal device in the first state.

In an embodiment, that the terminal device in the first state sends the first message to the second device includes: The terminal device in the first state sends a state switching request message to the second device. That the second device receives the first message includes: The second device receives the first state switching request message sent by the terminal device in the first state, where the first state switching request message is used to request that the terminal device in the first state needs to switch from the first state to the active state. That the second device determines, based on the first message, that the third device is the secondary access network device of the terminal device in the first state includes: The second device determines, based on the first state switching request message, that the third device is the secondary access network device of the terminal device in the first state.

In an embodiment, the first device is the AnNR 101 in FIG. 1, the second device is the AsNR 102 in FIG. 2, and the third device is also the AsNR 102 in FIG. 2. That the second device receives the first message includes: The AsNR receives the first message sent by the terminal device in the first state.

In an embodiment, the first device is the anchor central unit AnCU 301 in FIG. 3, the second device is the assistant central unit AsCU 302 in FIG. 3, and the third device is the assistant distribute unit AsDU 304 in FIG. 3. That the second device receives the first message includes: The second device receives the first message sent by the terminal device in the first state by using the AsDU 304.

In an optional embodiment, the terminal device in the first state sends a first message to the third device, where the first message is used by the second device to determine that the third device is the secondary access network device of the terminal device in the first state. The third device receives a third message sent by the second device, and sends the third message to the terminal device in the first state. The third message is used to notify the terminal device in the first state that the third device is the secondary access network device of the terminal device in the first state. Specifically, the second device is the assistant central unit AsCU 302, and the third device is the assistant distribute unit AsDU 304.

In an embodiment, that the second device sends the third message to the terminal device in the first state includes: The AsCU 302 sends the third message to the terminal device in the first state by using the AsDU 304. That the terminal device in the first state receives the third message includes: The terminal device in the first state receives the third message sent by the AsCU 302 by using the AsDU 304.

Optionally, the method 500 further includes: S507. After the second device is added as the secondary access network device, data may be forwarded to the second device by using the first device, and the data is transmitted between the second device and the terminal device in the first state. Certainly, the data may also be transmitted between both the first device and the second device, and the terminal device in the first state. This embodiment of this application is not limited thereto.

The identifier of the radio bearer mentioned in this embodiment of this application may be an ID of the radio bearer, used to indicate which radio bearer is to be transmitted by the second device. For example, a bearer transmitted by the second device may be a data plane bearer, a control plane bearer, or data plane and user plane bearers. This embodiment of this application is not limited thereto.

The type of the radio bearer mentioned in this embodiment of this application may indicate a data transmission form used by the first device and the second device. It is assumed that a protocol stack 1, a protocol stack 2, a protocol stack 3, and a protocol stack 4 are other protocol stacks in addition to a control plane protocol stack of a network device. For example, in an LTE system, four protocol stacks are included: a Packet Data Convergence Protocol (packet data convergence protocol, PDCP), a radio link control (radio link control, RLC) layer protocol, a media access control (media access control, MAC) layer protocol, and a physical (Physical) layer protocol. A data transmission form may be as follows: Data plane data or control plane data is transmitted by the core network device to the first device, the first device transfers the data plane data or the control plane data to the second device, and after the data plane data or the control plane data is processed by using the foregoing four protocol stacks of the second device, the data plane data or the control plane data is transmitted to the terminal device in the first state. Alternatively, the control plane data or user plane data is transmitted by the core network device to the first device, the first device processes the control plane data or the user plane data by using the PDCP layer protocol and then transfers the control plane data or the user plane data to the second device, the control plane data or the user plane data is processed by using the RLC layer protocol, the MAC layer protocol, and the PHY layer protocol of the second device, and then the control plane data or the user plane data is transmitted to the terminal device in the first state. Alternatively, the control plane data or the user plane data is transmitted by the core network device to the first device, the first device processes the control plane data or the user plane data by using the PDCP layer protocol and the RLC layer protocol and then transfers the control plane data or the user plane data to the second device, the control plane data or the user plane data is processed by using the MAC layer protocol and the PHY layer protocol of the second device, and then the control plane data or the user plane data is transmitted to the terminal device in the first state. Alternatively, the user plane data or the control plane data is transmitted by the core network device to the first device, the first device processes the data plane data or the user plane data by using the PDCP layer protocol, the RLC layer protocol, and the MAC layer protocol and then transfers the user plane data or the control plane data to the second device, the user plane data or the control plane data is processed by using the PHY layer protocol of the second device, and then the user plane data or the control plane data is transmitted to the terminal device in the first state. Alternatively, the type of the radio bearer may be a type of a radio bearer in a future network system. This embodiment of this application is not limited thereto.

Figure 6:
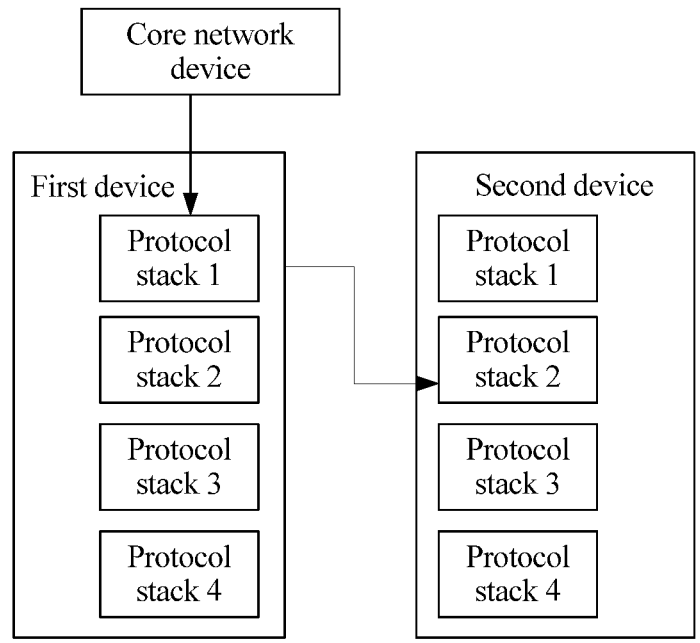
FIG. 6 is a schematic diagram of a type of a radio bearer according to an embodiment of this application.

For example, as shown in FIG. 6, when the core network device transmits data to the first device, the data may be processed by using a protocol stack 1 of the first device; when the first device transmits the data to the second device, the data is processed by using a protocol stack 2, a protocol stack 3, and a protocol stack 4 of the second device, and then the data is transmitted to the terminal device. Alternatively, when the core network device transmits data to the first device, the data is processed by using the protocol stack 1 and the protocol stack 2 of the first device; when the first device transmits the data to the second device, the data is processed by using the protocol stack 3 and the protocol stack 4 of the second device, and then the data is transmitted to the terminal device in the first state. Alternatively, when the core network device transmits data to the first device, the data is processed by using the protocol stack 1 of the first device, and after processing, the data is split into first data and second data. The first data continues to be processed by using the protocol stack 2, the protocol stack 3, and the protocol stack 4 of the first device and is transmitted to the terminal device. The first device transmits the second data to the second device, and the second data is processed by using the protocol stack 2, the protocol stack 3, and the protocol stack 4 of the second device, and then is transmitted to the terminal device in the first state. Different protocol stack allocation manners are different radio bearer types.

The four protocol stacks mentioned above are merely examples, and certainly more or fewer protocol stacks may be included, or protocol stack division may be different. For example, the protocol stack 1 is a PDCP layer protocol, the protocol stack 2 is an RLC layer protocol, the protocol stack 3 is a higher layer MAC protocol, and the protocol stack 4 is a lower layer MAC protocol.

The resource indication information mentioned in this embodiment of this application may be indication information of a remaining resource of the second device, or may be indication information of a resource currently used by the second device, and the resource indication information may indicate an air-interface time-frequency resource. This embodiment of this application is not limited thereto.

The identification information of the terminal device in the first state mentioned in this embodiment of this application may uniquely identify the terminal device in the first state and the first device that serves the terminal device in the first state. Therefore, when information needs to be sent to the terminal device in the first state or the first device, and the first device or the terminal device in the first state needs to be identified, the identification information of the terminal device in the first state may be carried. A specific opportunity to carry the identification information of the terminal device in the first state, or information that carries the identification information of the terminal device in the first state may be determined based on a specific situation. This embodiment of this application is not limited thereto.

The identification information of the terminal device in the first state mentioned in this embodiment of this application may be information that is allocated by the network to the terminal device in the first state and that uniquely identifies the terminal device in the first state. For example, the identification information may be an ID or a port identifier. This embodiment of this application is not limited thereto. The identification information of the terminal device mentioned in this embodiment of this application is identification information inherent in the terminal device.

The cell identity mentioned in this embodiment of this application may be an identifier of the AnNR, an identifier of the AsNR, an identifier of the AnCU, an identifier of the AsCU, an identifier of the AnDU, or an identifier of the AsDU. When the terminal device in the first state moves from the cell covered by the first device to the cell covered by the second device, an identity of a cell in which the terminal device in the first state is currently located may be the identifier of the AsNR, the identifier of the AsCU, or the identifier of the AsDU. This embodiment of this application is not limited thereto.

Figure 7:
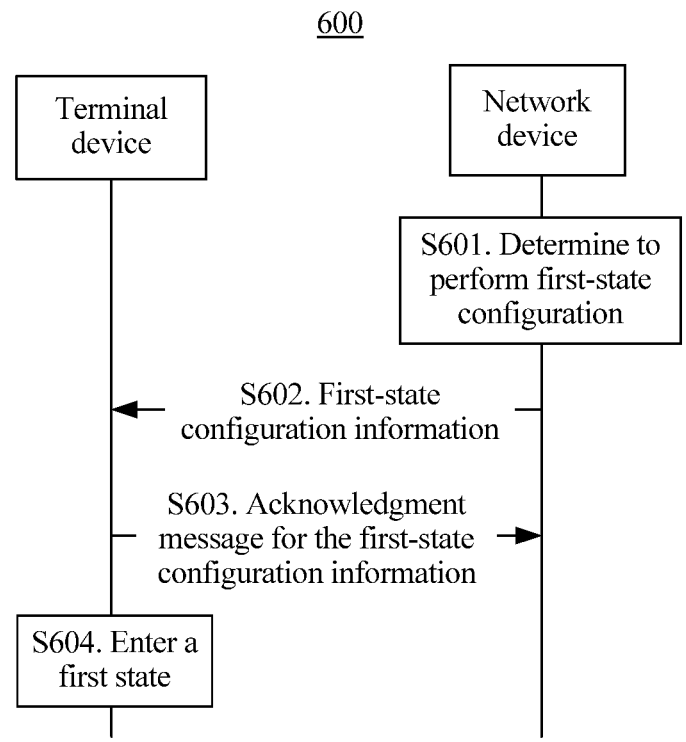
FIG. 7 is a schematic diagram of still another communication method according to an embodiment of this application.

With reference to FIG. 5 and FIG. 6, the communication method 500 according to this embodiment of this application is described in detail in the foregoing. The method 500 is as follows: The second device determines that the third device is the secondary access network device of the terminal device in the first state. With reference to FIG. 7, a communication method 600 according to an embodiment of this application is described in detail in the following. The method 600 is specifically a first-state configuration process of a terminal device.

FIG. 7 shows a data transmission method 600 according to an embodiment of this application. The method 600 includes the following operations.

Operation S601. A network device determines to perform first-state configuration on a terminal device. For example, the network device may be the AnNR 101 in FIG. 1, and the terminal device may be the UE 103 in FIG. 1. For another example, the network device may be the AnCU 201 in FIG. 2, and the terminal device may be the UE 204 in FIG. 2. For another example, the network device may be the AnCU 301 in FIG. 3, and the terminal device may be the UE 305 in FIG. 3.

Operation S602. The network device sends first-state configuration information to the terminal device, and the terminal device receives the first-state configuration information sent by the network device. The first-state configuration information is used to indicate that the network device and a core network device reserve a data plane connection. The first-state configuration information includes at least one of measurement manner indication information, identification information of the first state allocated by the network device to the terminal device, identification information of a radio bearer reserved by the network device, and a radio resource allocated by the network device to the terminal device.

Operation S603. The network device receives acknowledgment information that is for the first-state configuration information and that is sent by the terminal device.

Operation S604. The terminal device enters a first state according to the first-state configuration information.

It should be understood that, S603 may be before S604, or S604 may be before S603. This embodiment of this application is not limited thereto.

In an optional embodiment, the terminal device or the core network device sends capability information of the terminal device to the network device, and that the network device determines to perform first-state configuration on the terminal device includes: The network device receives the capability information of the terminal device that is sent by the terminal device or the core network device, and the network device determines, based on the capability information, to perform first-state configuration on the terminal device. The capability information includes at least one of: whether the terminal device supports the first state, identification information of the terminal device, whether the terminal device supports uplink measurement, and whether the terminal device supports downlink measurement. That the terminal device receives the first-state configuration information sent by the network device includes: The terminal device receives the first-state configuration information sent by the network device based on the capability information.

In an optional embodiment, that the network device determines to perform first-state configuration on the terminal device includes: The network device sends a first-state preset condition to the terminal device. The terminal device receives the first-state preset condition sent by the network device. When the terminal device meets the first-state preset condition, the terminal device sends a second state request message to the network device, where the second state request message is used to request that the terminal device needs to switch from a current state to the first state. The network device receives the second state request message sent by the terminal device based on the first-state preset condition, and the network device determines, based on the second state request message, to perform first-state configuration on the terminal device.

Specifically, the network device may configure the terminal device to enter the first state. The terminal device or the core network device sends the capability information of the terminal device to the network device, and the network device determines, based on the capability information of the terminal device, to perform first-state configuration on the terminal device, and sends the first-state configuration information to the terminal device. For example, when the terminal device supports both uplink and downlink measurement, the network device may determine a measurement manner based on a moving speed of the terminal device, a type of the terminal device, and a current network load status of the network device. For example, when the moving speed of the terminal device is relatively high, the terminal device may be set to use uplink measurement. When the moving speed of the terminal device is relatively low, the terminal device may be set to use downlink measurement. Alternatively, the network device or the core network device sends the first-state preset condition to the terminal device. When the terminal device meets the first-state preset condition, the terminal device sends the second state request message to the network device to request to enter the first state. Then, the network device sends the first-state configuration information to the terminal device based on the second state request message. For example, the network device may send the first-state preset condition to the terminal device by using access stratum signaling. The network device may send the first-state preset condition in a broadcast, unicast, or multicast manner. A control plane gateway (control gateway, CGW) sends the first-state preset condition to the terminal device by using non-access stratum (non-access stratum, NAS) signaling. The first-state preset condition may be a timer, and when the terminal device has no uplink data to send or no downlink data to receive within a specific time period, the first-state preset condition is used to instruct the terminal device to send a second state request message to the network device to request to enter the first state. For example, the second state request message may carry at least one of information such as the identification information of the terminal device, indication information of a measurement capability supported by the terminal device, and a cause of sending the second state switching request message, where the cause is requesting to switch to the first state.

Figure 8:
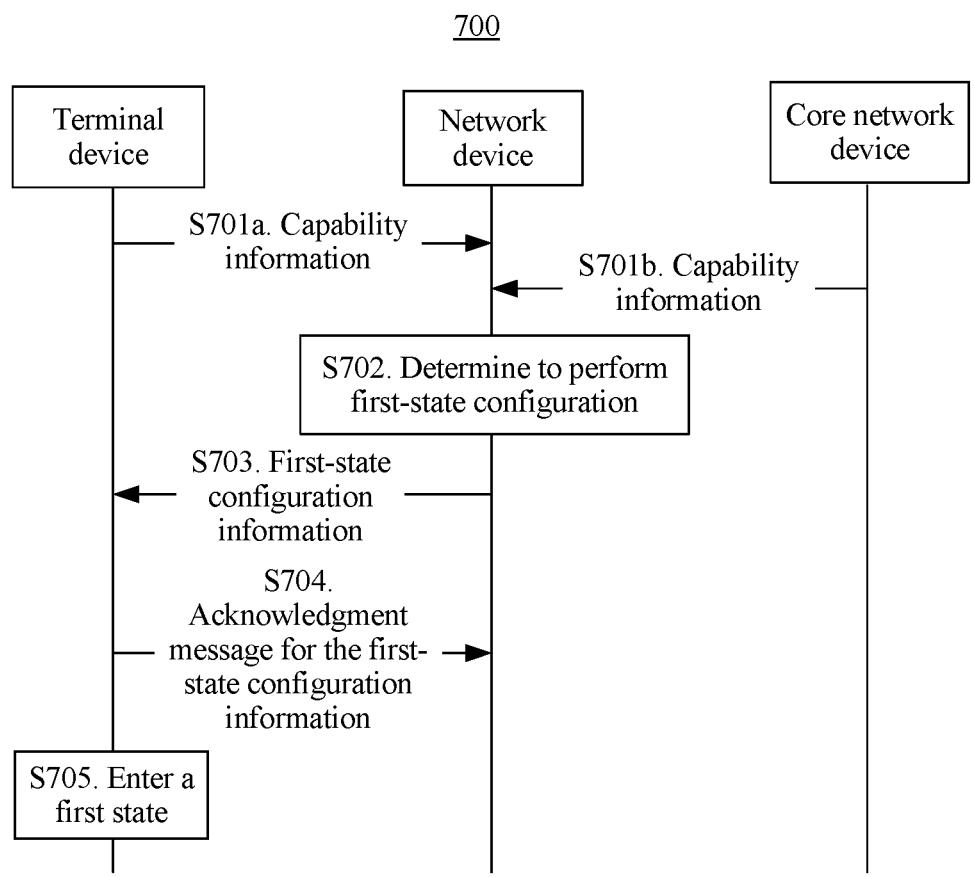
FIG. 8 is a schematic diagram of still another communication method according to an embodiment of this application.
Figure 9:
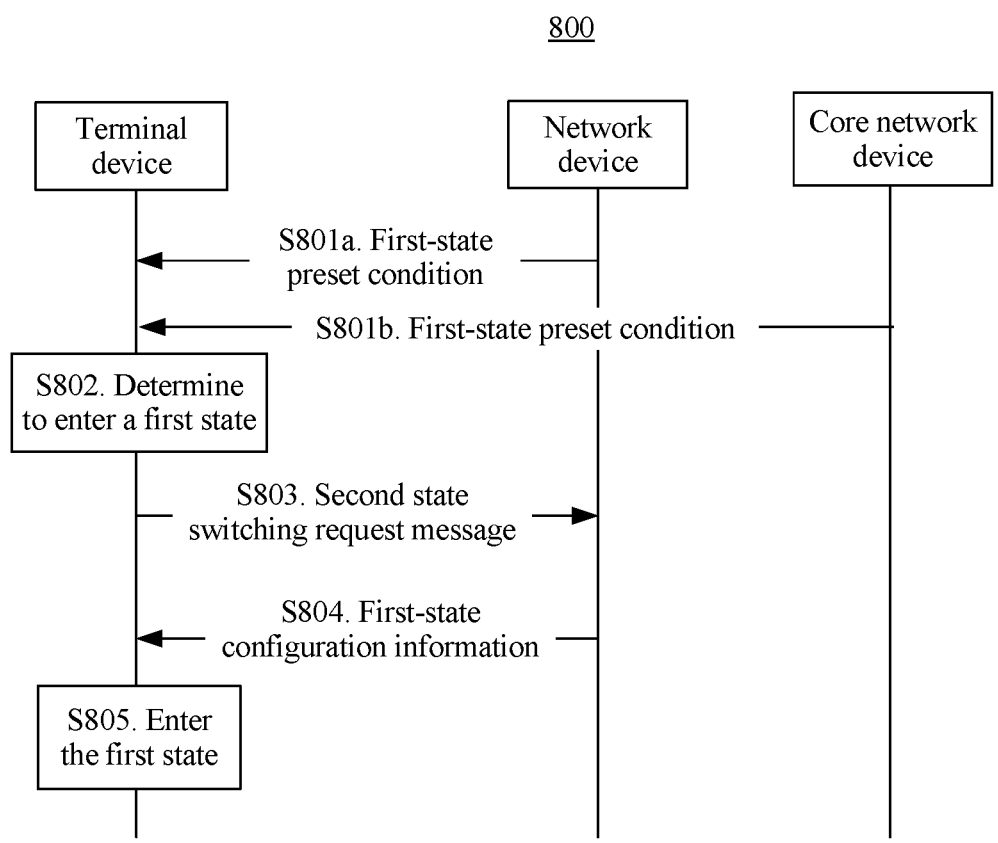
FIG. 9 is a schematic diagram of still another communication method according to an embodiment of this application.

With reference to FIG. 8 to FIG. 22, communication methods according to embodiments of this application are described in detail in the following. In FIG. 8 and FIG. 9, a terminal device is set to enter a first state; FIG. 10 to FIG. 15 are schematic diagrams of communication methods in the scenario shown in FIG. 1; FIG. 16A and FIG. 16B to FIG. 18 are schematic diagrams of communication methods in the scenario shown in FIG. 2; and FIG. 19A and FIG. 19B to FIG. 24 are schematic diagrams of communication methods in the scenario shown in FIG. 3.

FIG. 8 is a schematic diagram of a communication method 700 according to an embodiment of this application. A network device in the method 700 may be the AnNR 101 in FIG. 1, or may be the AnCU 201 in FIG. 2, or may be the AnCU 301 in FIG. 3. The method 700 includes the following operations.

Operation S701. Send capability information of a terminal device to the network device. Specifically, S701 may be S701*a*: The terminal device sends the capability information to the network device, or S701*b*: The terminal device sends the capability information of the terminal device to the network device, or a core network device sends the capability information of the terminal device to the network device. The capability information includes at least one of: whether the terminal device supports a first state, identification information of the terminal device, whether the terminal device supports uplink measurement, and whether the terminal device supports downlink measurement.

In one embodiment, in S701*a*, the capability information may be reported in an access process of the terminal device, or may be reported in other RRC signaling, or may be reported periodically, or may be reported in a manner specified in a protocol. This embodiment of this application is not limited thereto. In S701b, the capability information may be sent in a process of establishing a control plane connection between the core network device and the network device, or may be sent in another interaction process of the core network device and the network device. This embodiment of this application is not limited thereto. For example, the core network device may be a CGW. For example, in an access process, the terminal device reports the capability information of the terminal device to the core network device, and the core network device may send the capability information to the network device within a time specified in the protocol, or the core network device may periodically send the capability information to the network device.

Operation S702. The network device determines, based on the capability information sent by the terminal device and/or the capability information sent by the core network device, whether to perform first-state configuration on the terminal device. For example, the terminal device may be configured based on a current network load status, a type of the terminal device, and a moving speed of the terminal device, to generate first-state configuration information. For example, when the type of the terminal device is a service type of ultra reliable & low latency communication (ultra reliable & low latency communication, URLLC), the first configuration information configures the terminal device to use an uplink measurement manner.

Operation S703. The network device sends first-state configuration information to the terminal device. The first-state configuration information is used to indicate that the network device and the core network device reserve a data plane connection. The first-state configuration information includes at least one of measurement manner indication information, identification information of the first state allocated by the network device to the terminal device, identification information of a radio bearer reserved by the network device, and a radio resource allocated by the network device to the terminal device.

Specifically, the identification information of the terminal device in the first state is used to identify identification information, in the first state, of the terminal device. For example, the identification information may be an ID (Identity), and the identification information in the first state may be an ECO ID, used to uniquely identify the user on the network device. For example, the user may be uniquely identified on the AnNR 101 and the AsNR 101 in FIG. 1. In addition, based on the ECO ID, the AsNR 102 may know the user belongs to which AnNR.

Specifically, the ECO ID may be a single ID or in a form of a combination ID. For example, the form of the combination ID may be an A DI+B ID form, where the A ID indicates a primary network device, for example, the AnNR 101 in FIG. 1, the AnCU 201 in FIG. 2, and the AnCU 301 in FIG. 3. For example, the A ID may be a combination of one or more of an evolved cell global identifier (evolved cell global identifier, ECGI), an eNB ID, an AnCU ID, an AnDU ID, and a physical cell identifier (physical cell identifier, PCI), or may be a newly defined ID in a future network system. The B ID may indicate the terminal device and may be a combination of one or more of an international mobile subscriber identity (international mobile subscriber identity, IMSI), a cell radio network temporary identifier (cell radio network temporary identifier, C-RNTI), a temporary mobile subscriber identity (temporary mobile subscriber identity, TMSI), and a dedicated UE ID (dedicated UE ID, DUI), and certainly may be a newly defined ID in a future network system. This embodiment of this application is not limited thereto.

In one embodiment, the first-state configuration information further includes a reserved connection, and the reserved connection may be a connection between the network device and the core network device, for example, may be a connection S1 bearer+S5/S8 bearer between the network device and the core network device in LTE. The reserved connection may alternatively be a connection between the network device and the terminal device, for example, may be a radio bearer in LTE. The reserved connection may alternatively be a connection between the core network device and the network device and a connection between the network device and the terminal device, for example, an EPS (Evolved Packet System) bearer in LTE. The reserved connection may include only a data plane connection, or may include only a control plane connection, or may include both a data plane connection and a control plane connection. If the reserved connection includes the connection between the core network device and the network device and the connection between the network device and the terminal device, the network device allocates an air interface resource only to the terminal device in the ECO state. For example, the network device may send air-interface resource indication information to the terminal device in the ECO state, to indicate that the terminal device in the ECO state may transmit data on a resource indicated by the resource indication information. In this case, the terminal device in the ECO state may transmit data with the network device. There may be one or more reserved connections, and only when the reserved connection matches data to be sent by the terminal device, the data can be transmitted. If the reserved connection includes only the connection between the core network device and the network device, when the terminal device in the ECO state needs to send data, a connection between the network device and the terminal device needs to be established first.

Operation S704. The terminal device sends an acknowledgment message for the first-state configuration information to the network device, where the acknowledgment message may carry the identification information of the terminal device in the first state, for example, the ECO ID.

Operation S705. The terminal device enters the first state, and the terminal device performs a related measurement operation based on the first-state configuration information. Certainly, the terminal device may also perform another operation, for example, listen to a paging (paging) signal.

It should be understood that, in the foregoing three application scenarios, a specific process of configuring the terminal device to enter the first state is similar to the method 700. For example, the AnNR 101 in FIG. 1 performs configuration on behalf of the network device. The AnCU 201 in FIG. 2 performs configuration on behalf of the network device, and may specifically perform configuration by using the AnDU 202. The AnCU 301 in FIG. 3 performs configuration on behalf of the network device, and may specifically perform configuration by using the AnDU 303. A configuration signaling interaction procedure is similar to the method 700. To avoid repetition, examples are not provided herein.

FIG. 9 is a schematic diagram of a communication method 800 according to an embodiment of this application. The method 800 includes the following operations.

Operation S801. Send a first-state preset condition to a terminal device. Specifically, S801 may be S801a: A network device sends the first-state preset condition to the terminal device, or may be S801b: A core network device sends the first-state preset condition to the terminal device.

For example, the network device may send the first-state preset condition to the terminal device by using AS signaling. The network device may send the first-state preset condition in a broadcast, unicast, or multicast manner, and a CGW sends the first-state preset condition to the terminal device by using NAS signaling.

Operation S802. The terminal device determines, based on the first-state preset condition, to enter a first state.

Operation S803. The terminal device sends a second state switching request message to the network device, where the second state request message may carry at least one of information such as identification information of the terminal device, indication information of a measurement capability supported by the terminal device, and a cause of sending the second state switching request message, where the cause is requesting to switch to the first state.

For example, the first-state preset condition may be a timer, used to instruct the terminal device to send the second state request message to the network device when the terminal device has no uplink data to send or no downlink data to receive within a specific time period. The second state request message is used to request that the terminal device needs to enter the first state from a current state.

Operation S804. The network device sends first-state configuration information to the terminal device. The first-state configuration information is used to indicate that the network device and the core network device reserve a data plane connection, and the first-state configuration information includes at least one of measurement manner indication information and identification information of the first state allocated by the network device to the terminal device.

Specifically, the first-state configuration information may be the first-state configuration information in S704. To avoid repetition, details are not described herein again.

Operation S805. The terminal device enters the first state, and the terminal device performs a related measurement operation based on the first-state configuration information. Certainly, the terminal device may also perform another operation, for example, listen to a paging (paging) signal.

Figure 10:
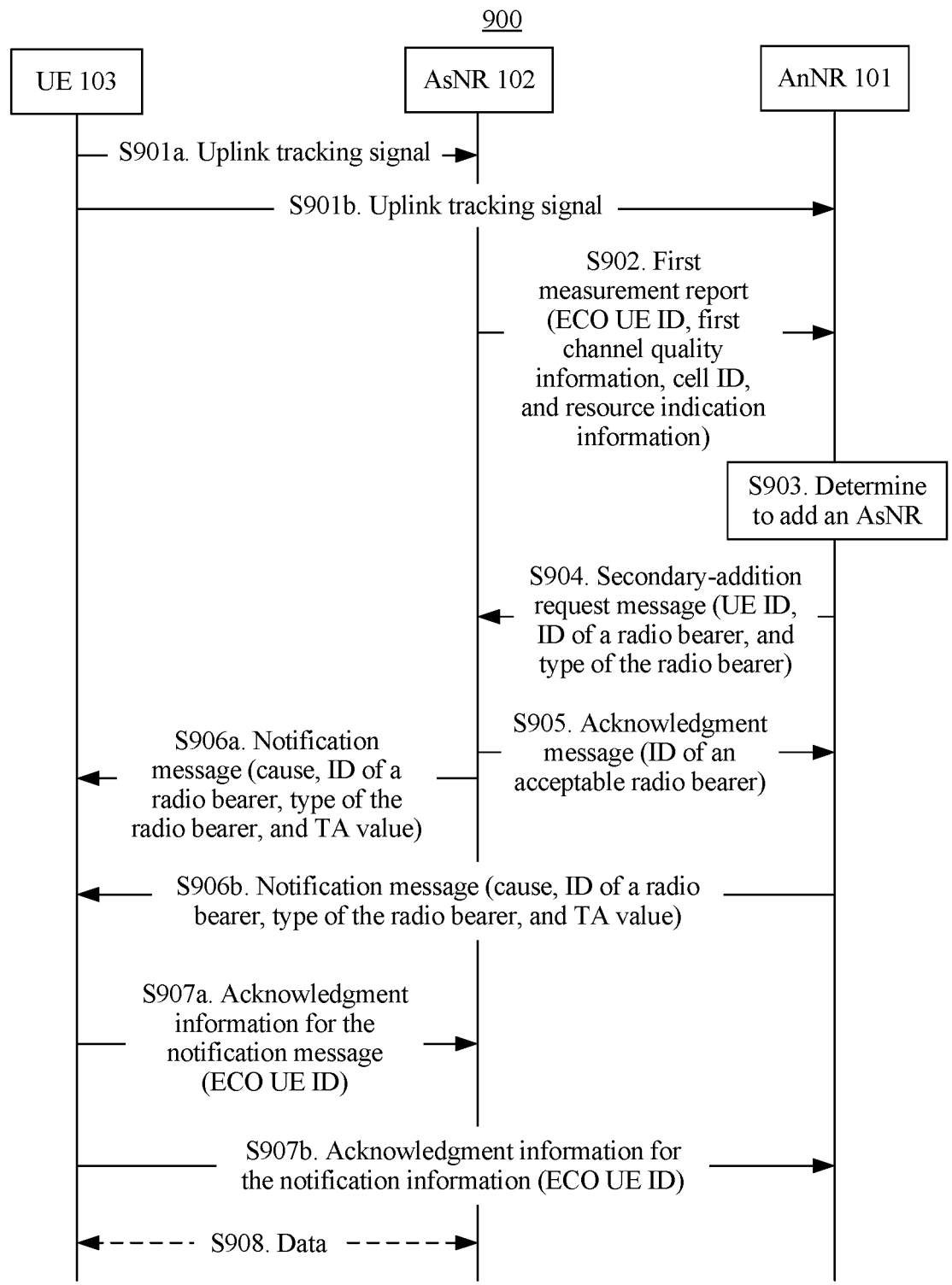
FIG. 10 is a schematic diagram of still another communication method according to an embodiment of this application.

FIG. 10 is a schematic diagram of a communication method 900 according to an embodiment of this application. The method may be applied to the scenario 100, and the method 900 includes the following operations.

Operation S901. ECO UE sends an uplink tracking signal. S901 may be S901a and/or S901b: S901a. The ECO UE sends the uplink tracking signal to the AsNR 102; S901b. The ECO UE sends the uplink tracking signal to the AnNR 101.

It should be understood that the uplink tracking signal may be the fourth message in the method 400.

Operation S902. When receiving the uplink tracking signal, the AsNR 102 determines a first measurement report based on the uplink tracking signal, where the first measurement report is used to indicate first channel quality information between the ECO UE and the AsNR 102, and the AsNR 102 sends the first measurement report to the AnNR 101.

It should be understood that the first measurement report may be the first message in the method 400.

Optionally, the first measurement report includes: an ECO UE ID, the first channel quality information, an ID of a cell covered by the AsNR 102, and resource indication information of the AsNR 102. The cell covered by the AsNR 102 is a cell in which the ECO UE is currently located.

Operation S903. The AnNR 101 determines, based on the first measurement report, to add the AsNR 102 as a secondary access network device of the ECO UE.

Optionally, because the AnNR 101 may also receive the uplink tracking signal, the AnNR 101 may determine second channel quality information between the ECO UE and the AnNR 101 based on the received uplink tracking signal, and the AnNR 101 may compare the first channel quality information with the second channel quality information. When channel quality represented by the first channel quality information is better than channel quality represented by the second channel quality, the AnNR 101 determines to add the AsNR 102 as the secondary access network device of the ECO UE.

Operation S904. The AnNR 101 sends a secondary-addition request message to the AsNR 102, used to request to add the AsNR 102 as the secondary access network device of the ECO UE. The secondary-addition request message may be the second message in the method 400, and the secondary-addition request message carries the ECO UE ID, an ID of a radio bearer, and a type of the radio bearer.

Operation S905. The AsNR 102 sends an acknowledgment message for the secondary-addition request message to the AnNR 101. The AsNR 102 determines an ID of an acceptable radio bearer based on an ID of a radio bearer supported by the AsNR 102, and adds the ID of the radio bearer to the acknowledgment information and sends the acknowledgment information to the AnNR 101.

Operation S906. Send a notification message to the ECO UE. The notification message may be the third message in the method 400. S906 is S906a or S906b: S906a. The AsNR 102 sends the notification message to the ECO UE; S906b. The AnNR 101 sends the notification message to the ECO EU. The notification message is used to notify the ECO UE that a network device currently serving the ECO UE is the AsNR 102. In addition, the notification message includes at least one of a cause (Cause) of sending the notification message, an ID of a radio bearer served by the AsNR 102, a type of the radio bearer, and a TA value. Optionally, the notification message includes the cause, the ID of the radio bearer served by the AsNR 102, and the type of the radio bearer, used to indicate that the cause of sending the notification message is that the terminal device in the first state has moved from coverage of the AnNR 101 to coverage of the AsNR 102. The TA value enables the AnNR 101 to synchronize with the ECO UE, or the AsNR 102 to synchronize with the ECO UE, or the ECO UE to synchronize with both the AnNR 101 and the AsNR 102. Optionally, the notification message may also include the ECO UE ID.

Operation S907. Send an acknowledgment message for the notification message. S907 may be S907a or S907b: S907a. The ECO EU sends the acknowledgment message for the notification message to the AsNR 102; S907b. The ECO EU sends the acknowledgment message for the notification message to the AnNR 101. That is, S906a is corresponding to S907a, and S906b is corresponding to S907b. The acknowledgment message for the notification message includes the ECO UE ID.

Optionally, the method 900 further includes: S908. After the AsNR 102 is added as the secondary access network device, data may be forwarded to the AsNR 102 by using the AnNR 101, and the AsNR 102 transmits the data with the terminal device in the first state. Certainly, the data may also be transmitted between the terminal device in the first state and both the AnNR 101 and the AsNR 102. This embodiment of this application is not limited thereto.

Figure 11:
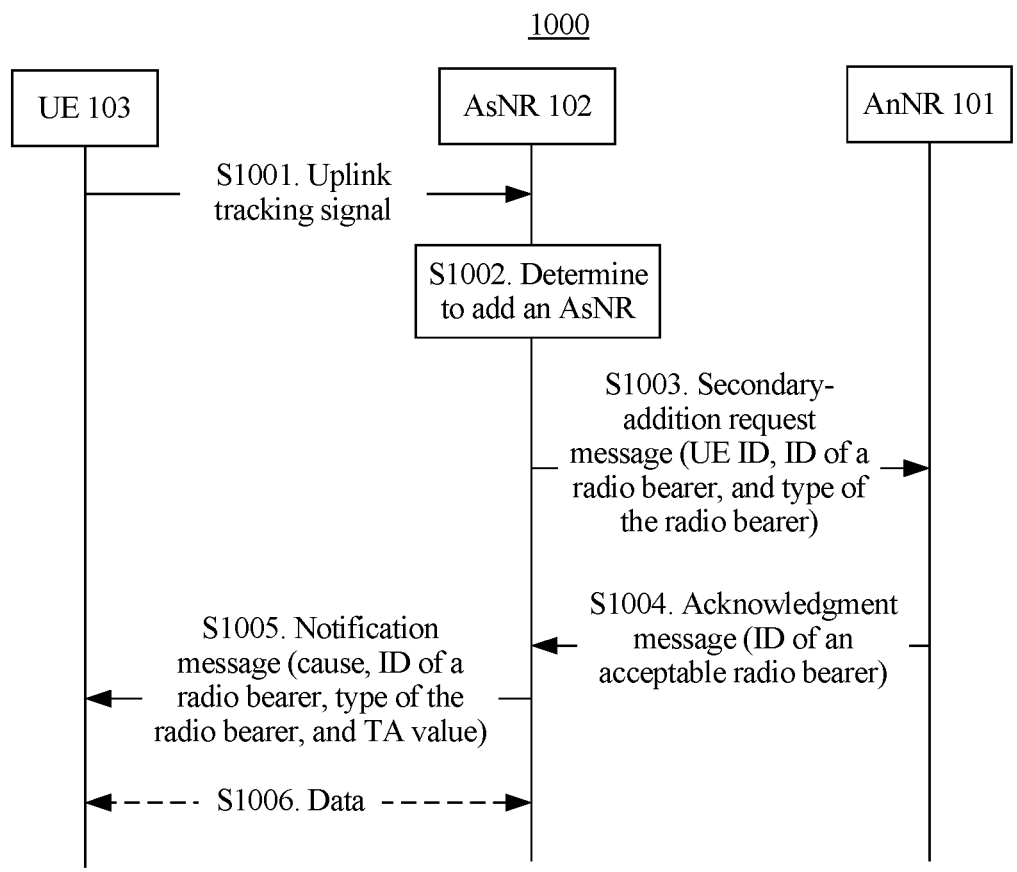
FIG. 11 is a schematic diagram of still another communication method according to an embodiment of this application.

FIG. 11 is a schematic diagram of a communication method 1000 according to an embodiment of this application. The method may be applied to the scenario 100. A difference between the method 1000 and the method 900 is as follows: In the method 900, the AnNR 101 determines to add the AsNR 102 as a secondary access network device; in the method 1000, the AsNR 102 determines to add the AsNR 102 as the secondary access network device. The method 1000 includes the following operations.

Operation S1001. ECO UE sends an uplink tracking signal to the AsNR 102.

Operation S1002. When receiving the uplink tracking signal, the AsNR 102 determines a first measurement report based on the uplink tracking signal. The first measurement report is used to indicate first channel quality information between the ECO UE and the AsNR 102. The AsNR 102 determines, based on the first channel quality information, to add the AsNR 102 as the secondary access network device of the ECO UE.

Operation S1003. The AsNR 102 sends a secondary-addition request message to the AnNR 101, used to request to add the AsNR 102 as the secondary access network device of the ECO UE. The secondary-addition request message may be the second message in the method 500. The secondary-addition request message carries an ECO UE ID, an ID of a radio bearer, and a type of the radio bearer; to be specific, an ID of a radio bearer and a type of the radio bearer that may be offloaded by the AsNR 102 for the ECO UE and that is determined by the AsNR 102 based on information such as network load of the AsNR 102.

Operation S1004. The AnNR 101 sends an acknowledgment message for the secondary-addition request message to the AsNR 102, where the acknowledgment message includes an identifier of a radio bearer that can be accepted by the AnNR 101.

Operation S1005. The AsNR 102 sends a notification message to the ECO UE. The notification message includes at least one of a cause of sending the notification message, an ID of a radio bearer served by the AsNR 102, a type of the radio bearer, and a TA value. Optionally, the notification message includes the ID of the radio bearer served by the AsNR 102 and the type of the radio bearer, used to indicate that the cause of sending the notification message is that a terminal device in a first state has moved from coverage of the AnNR 101 to coverage of the AsNR 102, and the TA value enables the AsNR 102 to synchronize with the ECO UE.

Optionally, the method 1000 further includes: S1006. After the AsNR 102 is added as the secondary access network device, data may be forwarded to the AsNR 102 by using the AnNR 101, and the data is transmitted between the AsNR 102 and the terminal device in the first state. Certainly, the data may also be transmitted between the terminal device in the first state and both the AnNR 101 and the AsNR 102. This embodiment of this application is not limited thereto.

Figure 12:
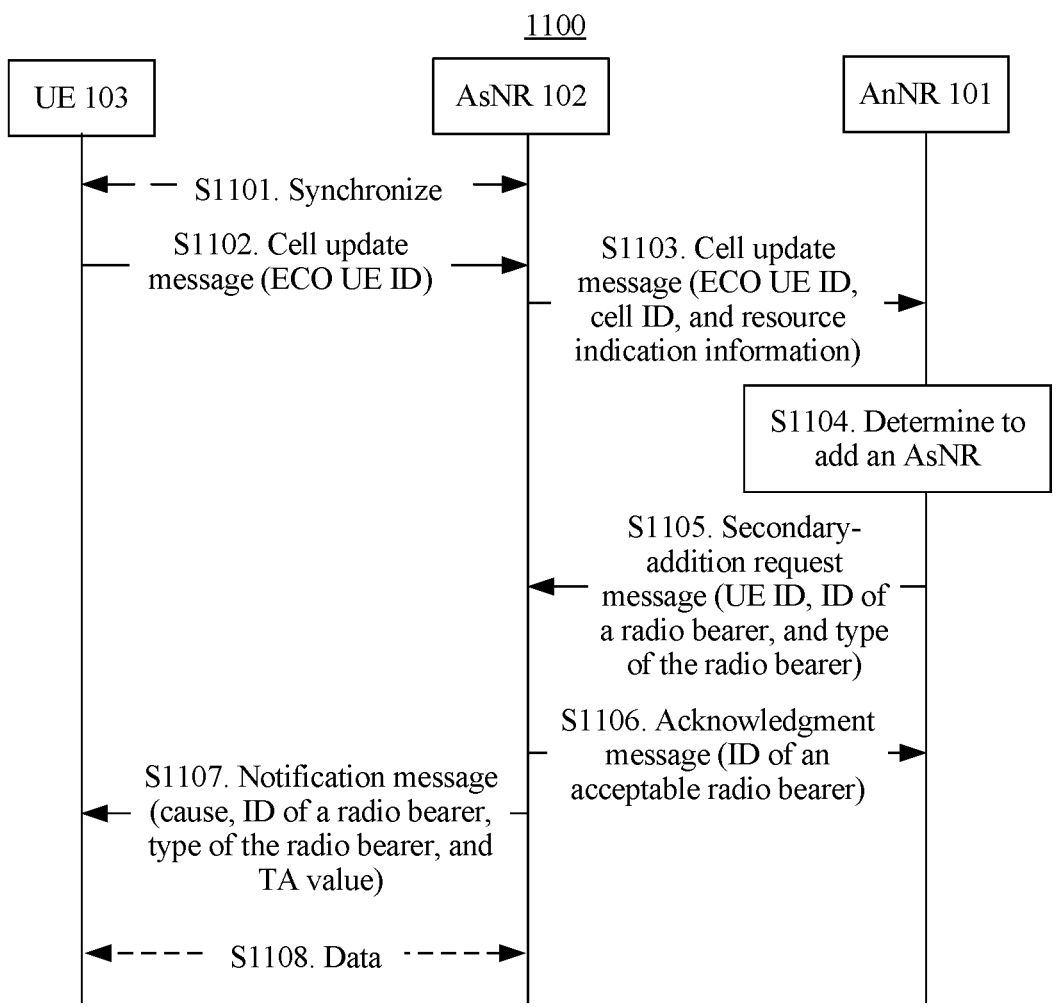
FIG. 12 is a schematic diagram of still another communication method according to an embodiment of this application.

FIG. 12 is a schematic diagram of a communication method 1100 according to an embodiment of this application. The method may be applied to the scenario 100. A difference between the method 1100 and the method 900 is as follows: In the method 900, the ECO UE sends the uplink tracking signal, and in the method 1100, the ECO UE sends cell update information. The method 1100 includes the following operations.

Operation S1101. If the ECO UE performs both uplink and downlink measurement, and the AnNR 101 or the AsNR 102 enables, by adjusting TA, the ECO UE to keep synchronization with the AsNR 102, S1101 is not required. Otherwise, S1101 is required to implement synchronization between the ECO UE and the AsNR 102.

Operation S1102. When the ECO UE performs reselection to move from a cell covered by AnNR 101 to a cell covered by the AsNR 102, the ECO UE sends cell update information to the AsNR 102. The cell update message is used to indicate that the ECO UE moves from the cell covered by the AnNR 101 to the cell covered by the AsNR 102, and the cell update information includes an ECO UE ID.

It should be understood that the cell update information may be the first message in the method 400.

Operation S1103. When receiving the cell update message, the AsNR 102 adds resource indication information of the AsNR 102 to the cell update information and sends the cell update information to the AnNR 101.

Operation S1104. When receiving the cell update information, the AnNR 101 determines to add the AsNR 102 as a secondary access network device of the ECO UE. Optionally, based on the cell update information, a network status of the AnNR 101, and the like, the AnNR 101 determines to add the AsNR 102 as the secondary access network device of the ECO UE.

Operation S1105. The AnNR 101 sends a secondary-addition request message to the AsNR 102, used to request to add the AsNR 102 as the secondary access network device of the ECO UE. The secondary-addition request message may be the second message in the method 400, and the secondary-addition request message carries the ECO UE ID, an ID of a radio bearer, and a type of the radio bearer.

Operation S1106. The AsNR 102 sends an acknowledgment message for the secondary-addition request message to the AnNR 101. The AsNR 102 determines an ID of an acceptable radio bearer based on an ID of a radio bearer supported by the AsNR 102, and adds the ID of the radio bearer to the acknowledgment information and sends the acknowledgment information to the AnNR 101.

Operation S1107. The AsNR 102 sends a notification message to the ECO UE. The notification message includes at least one of an ID of a radio bearer served by the AsNR 102, a type of the radio bearer, and a TA value. Optionally, the notification message includes the ID of the radio bearer served by the AsNR 102 and the type of the radio bearer, used to indicate that a cause of sending the notification message is that the ECO UE has moved from coverage of the AnNR 101 to coverage of the AsNR 102. The TA value enables the AsNR 102 to synchronize with the ECO UE. Optionally, the notification message may also include the ECO UE ID.

It should be understood that the notification message may be the third message in the method 400.

Optionally, the method 1100 further includes: S1108. After the AsNR 102 is added as the secondary access network device, data may be forwarded to the AsNR 102 by using the AnNR 101, and the AsNR 102 transmits the data with the terminal device in the first state. Certainly, the data may also be transmitted between the terminal device in the first state and both the AnNR 101 and the AsNR 102. This embodiment of this application is not limited thereto.

Figure 13:
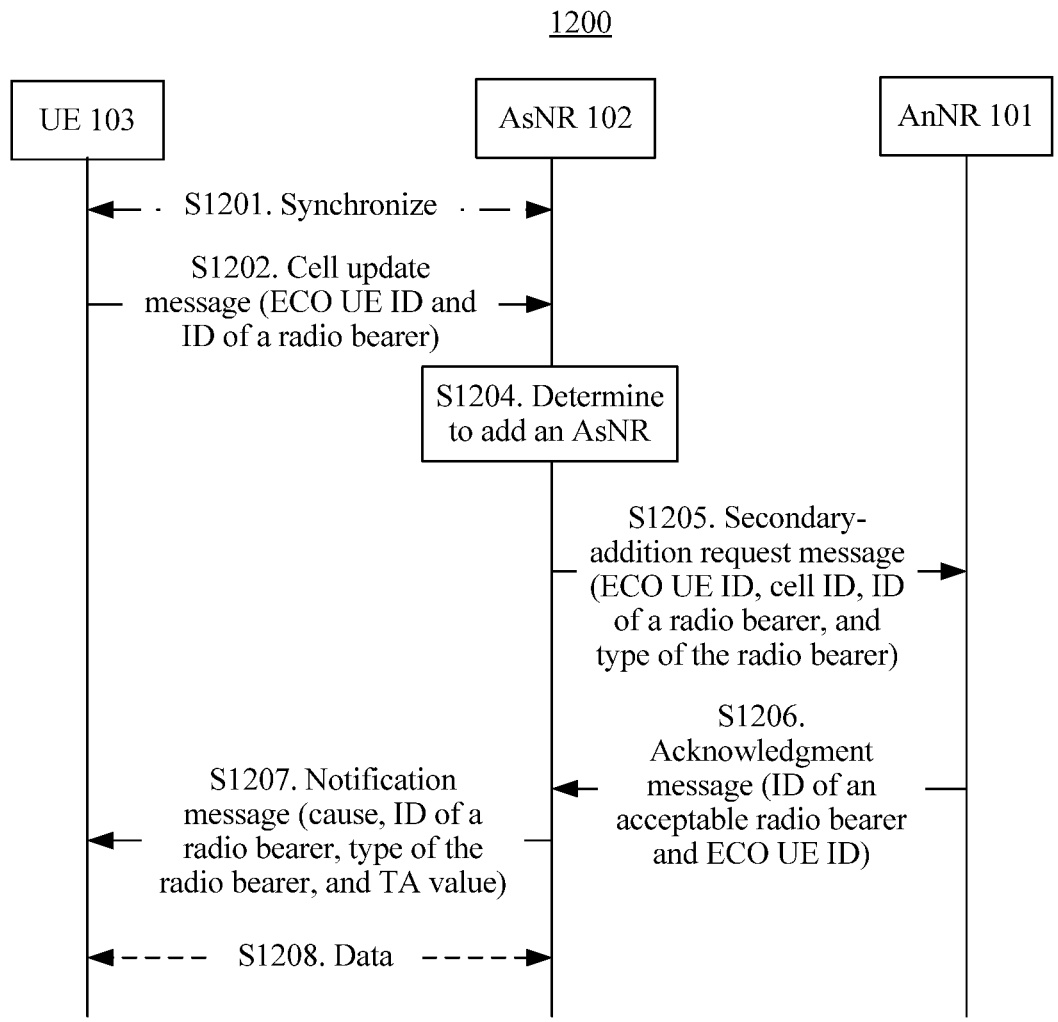
FIG. 13 is a schematic diagram of still another communication method according to an embodiment of this application.

FIG. 13 is a schematic diagram of a communication method 1200 according to an embodiment of this application. The method may be applied to the scenario 100. A difference between the method 1200 and the method 1100 is as follows: In the method 1100, the AnNR 101 determines to add the AsNR 102 as the secondary access network device, and in the method 1200, the AsNR 102 determines to add the AsNR 102 as the secondary access network device. The method 1200 includes the following operations.

Operation S1201 is the same as S1101.

Operation S1202. When the ECO UE performs reselection to move from a cell covered by the AnNR 101 to a cell covered by the AsNR 102, the ECO UE sends cell update information to the AsNR 102. The cell update message is used to indicate that the ECO UE moves from the cell covered by the AnNR 101 to the cell covered by the AsNR 102, and the cell update information includes an ECO UE ID and an ID of a current radio bearer of the ECO UE.

It should be understood that the cell update information may be the first message in the method 500.

Operation S1203. When receiving the cell update message, the AsNR 102 determines, based on the ID of the current radio bearer of the ECO UE, whether to add the AsNR 102 as a secondary access network device of the ECO UE. For example, if the AsNR 102 supports the current radio bearer of the ECO UE, the AsNR 102 determines to add the AsNR 102 as the secondary access network device of the ECO UE. Otherwise, the AsNR 102 determines not to add the AsNR 102 as the secondary access network device of the ECO UE. For another example, the AsNR 102 determines, based on resource information of the AsNR 102, a network load status, and the current radio bearer of the ECO UE, whether to add the AsNR 102 as the secondary access network device of the ECO UE.

Operation S1204. The AnNR 101 sends a secondary-addition request message to the AsNR 102, used to request to add the AsNR 102 as the secondary access network device of the ECO UE. The secondary-addition request message may be the second message in the method 500, and the secondary-addition request message carries the ECO UE ID, the ID of the radio bearer, a type of the radio bearer, and a cell ID.

Operation S1205. The AsNR 102 sends an acknowledgment message for the secondary-addition request message to the AnNR 101. The AsNR 102 determines an ID of an acceptable radio bearer based on an ID of a radio bearer supported by the AsNR 102, and adds the ID of the radio bearer to the acknowledgment information and sends the acknowledgment information to the AnNR 101.

It should be understood that there may be a plurality of IDs of radio bearers in S1202, the AsNR 102 may determine at least some of the plurality of the IDs of the radio bearers in S1204, and in S1205, the ID of the radio bearer may be at least a part of the at least some of the plurality of the IDs of the radio bearers. For example, there may be three IDs of radio bearers in S1202, the AsNR 102 may determine two of the three IDs of the radio bearers in S1204, and the ID of the radio bearer in S1205 may be an ID of one radio bearer in the two IDs of the radio bearers.

S1206. The AsNR 102 sends a notification message to the ECO UE. The notification message includes at least one of an ID of a radio bearer served by the AsNR 102, a type of the radio bearer, and a TA value. Optionally, the notification message includes the ID of the radio bearer served by the AsNR 102 and the type of the radio bearer, used to indicate that a cause of sending the notification message is that a terminal device in a first state has moved from coverage of the AnNR 101 to coverage of the AsNR 102. The TA value enables the AsNR 102 to synchronize with the ECO UE. Optionally, the notification message may also include the ECO UE ID.

It should be understood that the notification message may be the third message in the method 500.

Optionally, the method 1200 further includes: S1208. After the AsNR 102 is added as the secondary access network device, data may be forwarded to the AsNR 102 by using the AnNR 101, and the AsNR 102 transmits the data with the terminal device in the first state. Certainly, the data may also be transmitted between the terminal device in the first state and both the AnNR 101 and the AsNR 102. This embodiment of this application is not limited thereto.

Figure 14:
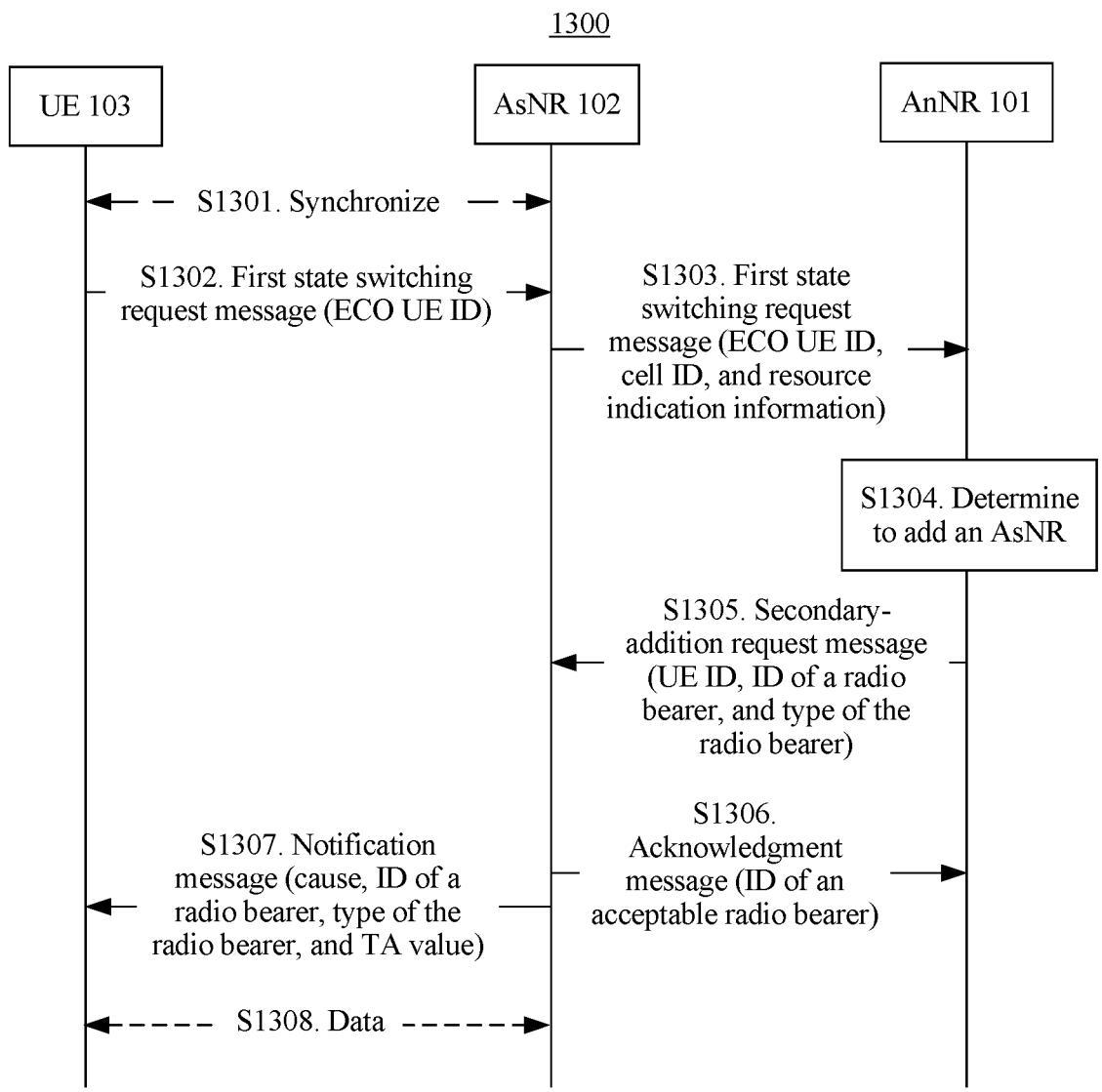
FIG. 14 is a schematic diagram of still another communication method according to an embodiment of this application.

FIG. 14 is a schematic diagram of a communication method 1300 according to an embodiment of this application. The method may be applied to the scenario 100. A difference between the method 1300 and both of the method 900 and the method 1100 is as follows: In the method 900, the ECO UE sends the uplink tracking signal, in the method 1100, the ECO UE sends the cell update information, and in the method 1300, the ECO UE sends a first state switching request message. The method 1300 includes the following operations.

Operation S1301 is the same as S1101 or S1201.

Operation S1302. When the ECO UE needs to transmit data, that is, the ECO UE needs to switch from a current ECO state to an active state, the ECO UE sends a first state switching request message to the AsNR 102. The first state switching request message is used to request the AsNR 102 that the ECO UE needs to switch from the ECO state to the active state. The first state switching request message may include an ECO UE ID, a type of data that the ECO UE needs to transmit, or packet size information of the required data.

It should be understood that the first state switching request message may be the first message in the method 400.

Operation S1303. When receiving the first state switching request message, the AsNR 102 adds resource indication information of the AsNR 102 to the first state switching request message and sends the first state switching request message to the AnNR 101.

Operation S1304. When receiving the first state switching request message, the AnNR 101 determines to add the AsNR 102 as a secondary access network device of the ECO UE. Optionally, based on the first state switching request message, a network status of the AnNR 101, and the like, the AnNR 101 determines to add the AsNR 102 as the secondary access network device of the ECO UE.

Operation S1305. The AnNR 101 sends a secondary-addition request message to the AsNR 102, used to request to add the AsNR 102 as the secondary access network device of the ECO UE. The secondary-addition request message may be the second message in the method 400, and the secondary-addition request message carries the ECO UE ID, an ID of a radio bearer, and a type of the radio bearer.

Operation S1306. The AsNR 102 sends an acknowledgment message for the secondary-addition request message to the AnNR 101. The AsNR 102 determines an ID of an acceptable radio bearer based on an ID of a radio bearer supported by the AsNR 102, and adds the ID of the radio bearer to the acknowledgment information and sends the acknowledgment information to the AnNR 101.

Operation S1307. The AsNR 102 sends a notification message to the ECO UE. The notification message includes at least one of an ID of a radio bearer served by the AsNR 102, a type of the radio bearer, and a TA value. Optionally, the notification message includes the ID of the radio bearer served by the AsNR 102 and the type of the radio bearer, used to indicate that a cause of sending the notification message is that the ECO UE needs to transmit data. The TA value enables the AsNR 102 to synchronize with the ECO UE. Optionally, the notification message may also include the ECO UE ID.

It should be understood that the notification message may be the third message in the method 400.

Optionally, the method 1300 further includes: S1308. After the AsNR 102 is added as the secondary access network device, data may be forwarded to the AsNR 102 by using the AnNR 101, and the AsNR 102 transmits the data with the terminal device in the first state. Certainly, the data may also be transmitted between the terminal device in the first state and both the AnNR 101 and the AsNR 102. This embodiment of this application is not limited thereto.

Figure 15:
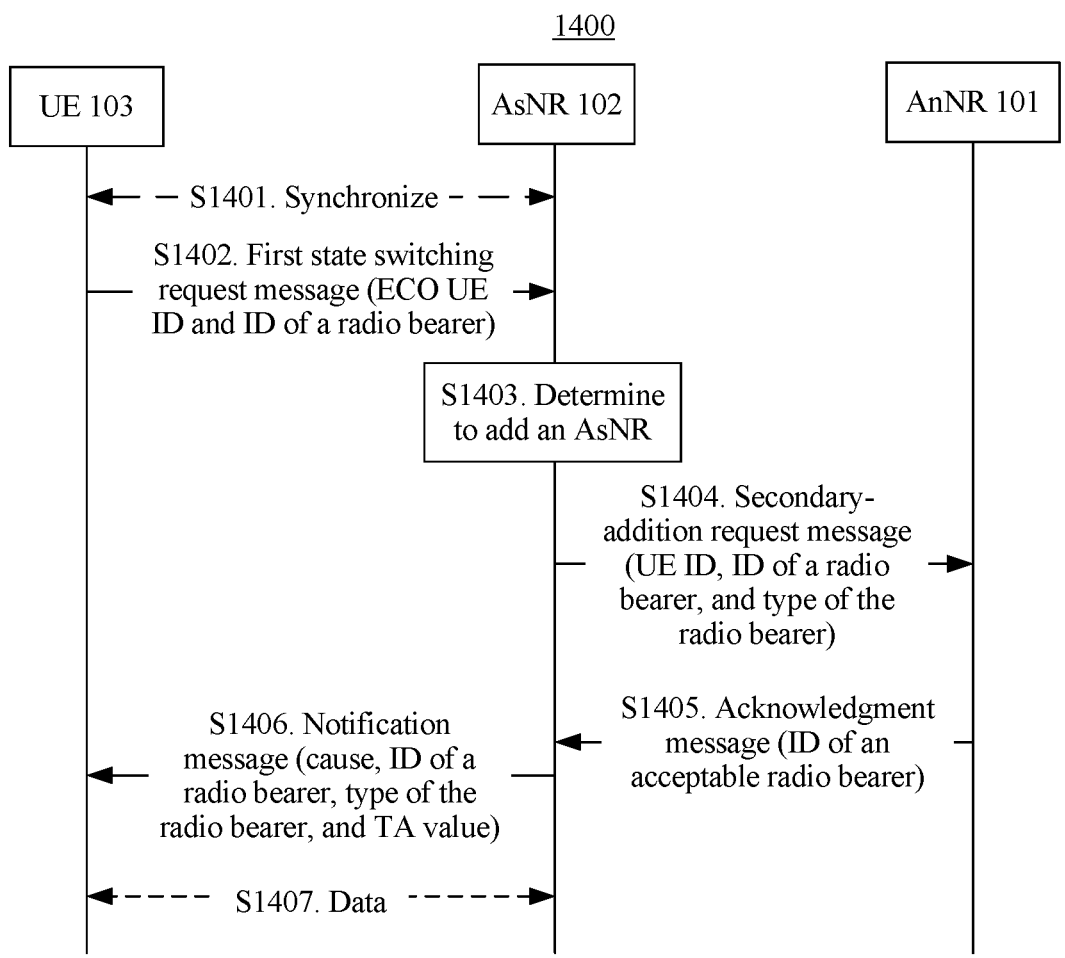
FIG. 15 is a schematic diagram of still another communication method according to an embodiment of this application.

FIG. 15 is a schematic diagram of a communication method 1400 according to an embodiment of this application. The method may be applied to the scenario 100. A difference between the method 1400 and the method 1300 is as follows: In the method 1300, the AnNR 101 determines to add the AsNR 102 as the secondary access network device, and in the method 1400, the AsNR 102 determines to add the AsNR 102 as the secondary access network device. The method 1400 includes the following operations.

Operation S1401 is the same as S1101, S1201, or S1301.

Operation S1402. When the ECO UE needs to transmit data, that is, the ECO UE needs to switch from a current ECO state to an active state, the ECO UE sends a first state switching request message to the AsNR 102. The first state switching request message is used to request the AsNR 102 that the ECO UE needs to switch from the ECO state to the active state. The first state switching request message may include an ECO UE ID and an ID of a radio bearer, that is, an identifier of data that needs to be transmitted currently by the ECO UE, or may include packet size information of the required data.

It should be understood that the first state switching request message may be the first message in the method 500.

Operation S1403. When receiving the first state switching request message, the AsNR 102 determines, based on the ID of the radio bearer of the ECO UE, whether to add the AsNR 102 as a secondary access network device of the ECO UE. For example, if the AsNR 102 supports the radio bearer of the ECO UE, the AsNR 102 determines to add the AsNR 102 as the secondary access network device of the ECO UE. Otherwise, the AsNR 102 determines not to add the AsNR 102 as the secondary access network device of the ECO UE. For another example, the AsNR 102 determines, based on resource information of the AsNR 102, a network load status, and the ID of the radio bearer of the ECO UE, whether to add the AsNR 102 as the secondary access network device of the ECO UE.

Operation S1404. The AsNR 102 sends a secondary-addition request message to the AnNR 101, used to request to add the AsNR 102 as the secondary access network device of the ECO UE. The secondary-addition request message may be the second message in the method 500, and the secondary-addition request message carries the ECO UE ID, the ID of the radio bearer, a type of the radio bearer, and a cell ID.

Operation S1405. The AnNR 101 sends an acknowledgment message for the secondary-addition request message to the AsNR 102. The AsNR 102 determines an ID of an acceptable radio bearer based on an ID of a radio bearer supported by the AsNR 102, and adds the ID of the radio bearer to the acknowledgment information and sends the acknowledgment information to the AsNR 102.

It should be understood that there may be a plurality of IDs of radio bearers in S1402, the AsNR 102 may determine at least some of the plurality of the IDs of the radio bearers in S1404, and in S1405, the ID of the radio bearer may be at least some of the at least some of the plurality of the IDs of the radio bearers. For example, there may be five IDs of radio bearers in S1402, the AsNR 102 may determine four of the five IDs of the radio bearers in S1404, and the ID of the radio bearer in S1405 may be two IDs of the radio bearers in the four IDs of the radio bearers.

Operation S1406. The AsNR 102 sends a notification message to the ECO UE. The notification message includes at least one of an ID of a radio bearer served by the AsNR 102, a type of the radio bearer, and a TA value. Optionally, the notification message includes the ID of the radio bearer served by the AsNR 102 and the type of the radio bearer, used to indicate that a cause of sending the notification message is that the ECO UE needs to transmit data. The TA value enables the AsNR 102 to synchronize with the ECO UE. Optionally, the notification message may also include the ECO UE ID.

It should be understood that the notification message may be the third message in the method 500.

Optionally, the method 1400 further includes: S1407. After the AsNR 102 is added as the secondary access network device, data may be forwarded to the AsNR 102 by using the AnNR 101, and the AsNR 102 transmits the data with the terminal device in the first state. Certainly, the data may also be transmitted between the terminal device in the first state and both the AnNR 101 and the AsNR 102. This embodiment of this application is not limited thereto.

Figure 16A:
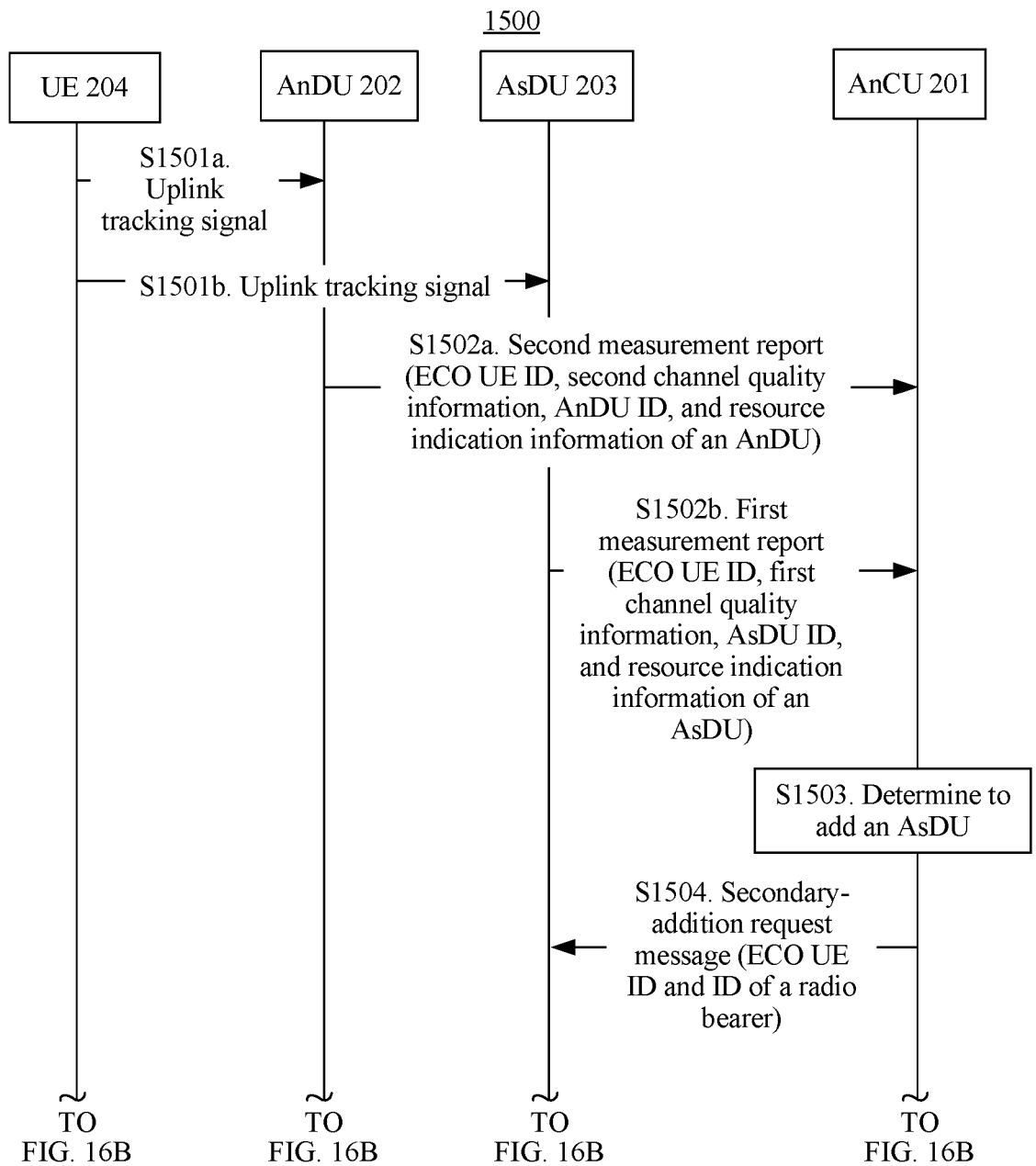
FIG. 16A and FIG. 16B are a schematic diagram of still another communication method according to an embodiment of this application.
Figure 16B:
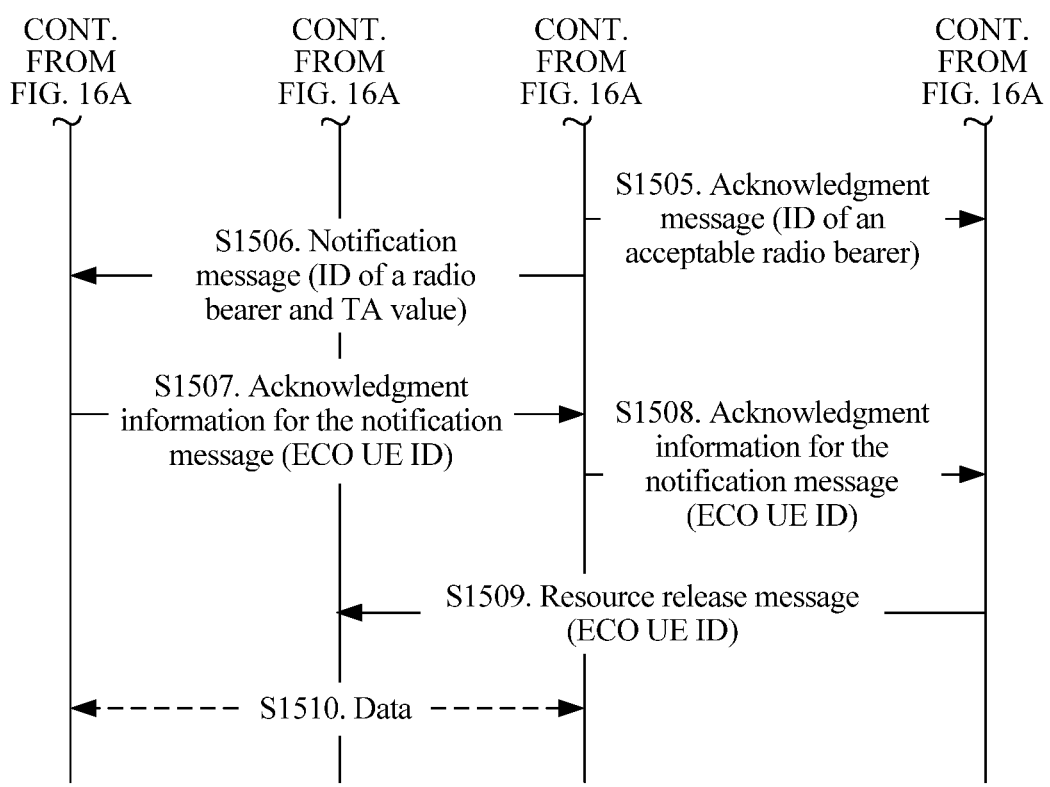

FIG. 16A and FIG. 16B are a schematic diagram of a communication method 1500 according to an embodiment of this application. The method may be applied to the scenario 200. A difference between the method 1500 and the method 900 is that application scenarios are different: The method 900 is applied to the scenario 100, and the method 1500 is applied to the scenario 200. The method 1500 includes the following operations.

Operation S1501. ECO UE sends an uplink tracking signal. S1501 may be S1501a and/or S1501b: S1501a. The ECO UE sends the uplink tracking signal to the AnDU 202; S1501b. The ECO UE sends the uplink tracking signal to the AsDU 203.

It should be understood that the uplink tracking signal may be the fourth message in the method 400.

Operation S1502b. When receiving the uplink tracking signal, the AsDU 203 determines a first measurement report based on the uplink tracking signal. The first measurement report is used to indicate first channel quality information between the ECO UE and the AsDU 203. The AsDU 203 sends the first measurement report to the AnCU 201. The first measurement includes an ECO UE ID, an ID of a cell in which the ECO UE is currently located, resource indication information of the AsDU 203, and the first channel quality information. The ID of the cell in which the ECO UE is currently located is an ID of the AsDU 203.

Operation S1502a. When receiving the uplink tracking signal, the AnDU 202 determines a second measurement report based on the uplink tracking signal. The second measurement report is used to indicate second channel quality information between the ECO UE and the AnDU 202. The AnDU 202 sends the second measurement report to the AnCU 201. The second measurement includes an ECO UE ID, a cell ID, resource indication information of the AnDU 202, and the second channel quality information. The cell ID is an ID of the AnDU 202.

In one embodiment, an ID of a cell in which the ECO UE is previously located may be a PCI and/or an ECGI of the AnDU 202, and the ID of the cell in which the ECO UE is currently located may be a PCI and/or an ECGI of the AsDU 203.

It should be understood that S1502*a* and S1502*b* may both exist, or only S1502*b* may exist.

Operation S1503. The AnCU 201 determines, based on the first measurement report, to add the AsDU 203 as a secondary access network device of the ECO UE.

In one embodiment, because the AnDU 202 may also receive the uplink tracking signal, the AnDU 202 may determine the second measurement report between the ECO UE and the AnDU 202 based on the received uplink tracking signal. The second measurement report is used to indicate the second channel quality information between the ECO UE and the AnDU 202. The second measurement report is sent to the AnCU 201, and the AnCU 201 may compare the first channel quality information and the second channel quality information. When channel quality represented by the first channel quality information is better than channel quality represented by the second channel quality, the AnCU 201 determines to add the AsDU 203 as the secondary access network device of the ECO UE.

It should be understood that the first measurement report and/or the second measurement report may be periodically sent, or may be sent in a triggering manner, or sent in an alternate hybrid manner of periodical sending and triggering-based sending.

It should be understood that the first measurement report may be the first message in the method 400.

Operation S1504. The AnCU 201 sends a secondary-addition request message to the AsDU 203, used to request to add the AsDU 203 as the secondary access network device of the ECO UE. The secondary-addition request message may be the second message in the method 400, and the secondary-addition request message carries the ECO UE ID and an ID of a radio bearer.

Operation S1505. The AsDU 203 sends an acknowledgment message for the secondary-addition request message to the AnCU 201. The AsDU 203 determines an ID of an acceptable radio bearer based on an ID of a radio bearer supported by the AsDU 203, and adds the ID of the radio bearer to the acknowledgment information and sends the acknowledgment information to the AnCU 201.

Operation S1506. The AsDU 203 sends a notification message to the ECO UE. The notification message carries at least one of an ID of a radio bearer served by the AsDU 203 and a TA value. Optionally, the notification message carries the ID of the radio bearer, and the TA value enables the AsDU 203 to synchronize with the ECO UE. Optionally, the notification message may also include the ECO UE ID, used to indicate that a cause of sending the notification message is that the ECO UE moves from a cell covered by the AnDU 202 to a cell covered by the AsDU 203.

Optionally, the notification message may also be sent by the AnCU 201 to the ECO UE. This embodiment of this application is not limited thereto.

It should be understood that the notification message may be the third message in the method 400.

Operation S1507. The ECO UE sends an acknowledgment message for the notification message to the AsDU 203, where the acknowledgment message for the notification message includes the ECO UE ID.

Operation S1508. The AsDU 203 sends the acknowledgment message for the notification message to the AnCU 201.

S1509. The AnCU 201 sends a resource release message to the AnDU 202, where the resource release message includes the ECO UE ID, and the resource release message is used to instruct the AnDU 202 to release a resource between the AnDU 202 and the ECO UE.

In one embodiment, the method 1500 further includes:
S1510. After the AsDU 203 is added as the secondary access network device, the AnCU 201 forwards data to the AsDU 203, and the AsDU 203 transmits the data with a terminal device in a first state. Certainly, the data may also be transmitted between the terminal device in the first state and both the AsDU 203 and the AnDU 202. This embodiment of this application is not limited thereto.

It should be understood that a sequence of S1509 and all of S1506, S1507, and S1508 is not limited, for example, S1509 may be performed before or after S1506.

Figure 17:
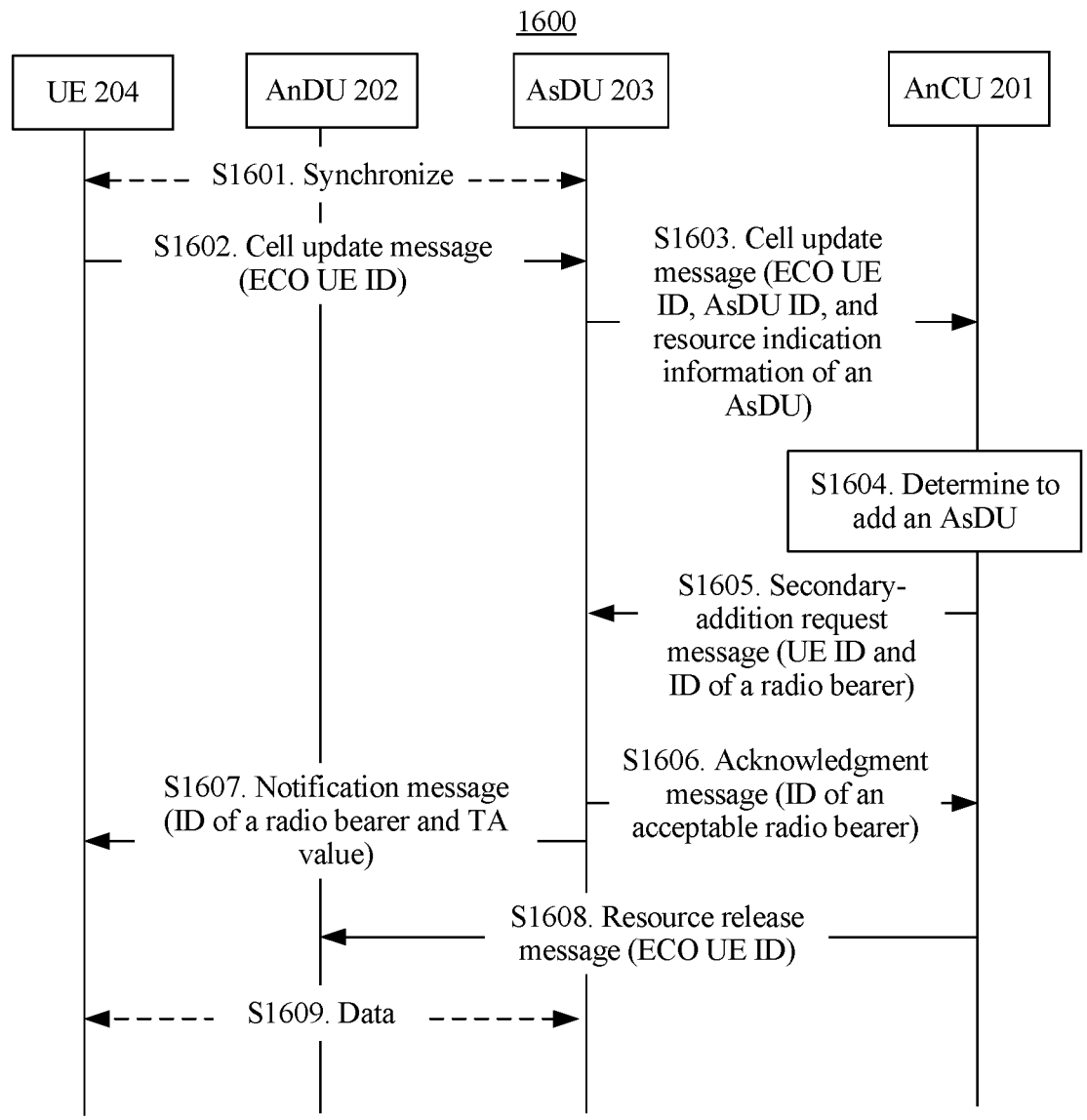
FIG. 17 is a schematic diagram of still another communication method according to an embodiment of this application.

FIG. 17 is a schematic diagram of a communication method 1600 according to an embodiment of this application. The method may be applied to the scenario 200. A difference between the method 1600 and the method 1100 is that application scenarios are different: The method 1100 is applied to the scenario 100, and the method 1600 is applied to the scenario 200. The method 1600 includes the following operations.

Operation S1601. If ECO UE performs both uplink and downlink measurement, and the AsDU 203 enables, by adjusting TA, the ECO UE to keep synchronization with the AsDU 203, S1601 is not required. Otherwise, S1601 is required to implement synchronization between the ECO UE and the AsDU 203.

Operation S1602. When the ECO UE performs reselection to move from a cell covered by the AnDU 202 to a cell covered by the AsDU 203, the ECO UE sends cell update information to the AsDU 203. The cell update message is used to indicate that the ECO UE moves from the cell covered by the AnDU 202 to the cell covered by the AsDU 203, and the cell update information includes an ECO UE ID.

Operation S1603. The AsDU 203 receives the cell update information, adds resource indication information of the AsDU 203 and an ID of a cell in which the ECO UE is currently located to the cell update information, and sends the cell update information to the AnCU 201, where the ID of the cell in which the ECO UE is currently located may be an ID of the AsDU 203.

It should be understood that the cell update information may be the first message in the method 400.

Operation S1604. When receiving the cell update information, the AnCU 201 determines to add the AsDU 203 as a secondary access network device of the ECO UE. Optionally, based on the cell update information, a network status of the AnCU 201, and the like, the AnCU 201 determines to add the AsDU 203 as the secondary access network device of the ECO UE.

Operation S1605. The AnCU 201 sends a secondary-addition request message to the AsDU 203, used to request to add the AsDU 203 as the secondary access network device of the ECO UE. The secondary-addition request message may be the second message in the method 400, and the secondary-addition request message carries the ECO UE ID and an ID of a radio bearer.

Operation S1606. The AsDU 203 sends an acknowledgment message for the secondary-addition request message to the AnCU 201. The AsDU 203 determines an ID of an acceptable radio bearer based on an ID of a radio bearer supported by the AsDU 203, and adds the ID of the radio bearer to the acknowledgment information and sends the acknowledgment information to the AnCU 201.

Operation S1607. The AsDU 203 sends a notification message to the ECO UE, where the notification message carries an ID of a radio bearer served by the AsDU 203, or may include a TA value, and the TA value enables the AsDU 203 to synchronize with the ECO UE. Optionally, the notification message may also include the ECO UE ID, used to indicate that a cause of sending the notification message is that the ECO UE moves from the cell covered by the AnDU 202 to the cell covered by the AsDU 203.

Optionally, the notification message may also be sent by the AnCU 201 to the ECO UE. This embodiment of this application is not limited thereto.

Operation S1608. The AnCU 201 sends a resource release message to the AnDU 202, where the resource release message includes the ECO UE ID, and the resource release message is used to instruct the AnDU 202 to release a resource between the AnDU 202 and the ECO UE.

It should be understood that a sequence of S1608 and S1607 is not limited, for example, S1608 may be performed before or after S1607.

In one embodiment, the method 1600 further includes: S1609. After the AsDU 203 is added as the secondary access network device, the AnCU 201 forwards data to the AsDU 203, and the AsDU 203 transmits the data with a terminal device in a first state. Certainly, the data may also be transmitted between the terminal device in the first state and both the AsDU 203 and the AnDU 202. This embodiment of this application is not limited thereto.

Figure 18:
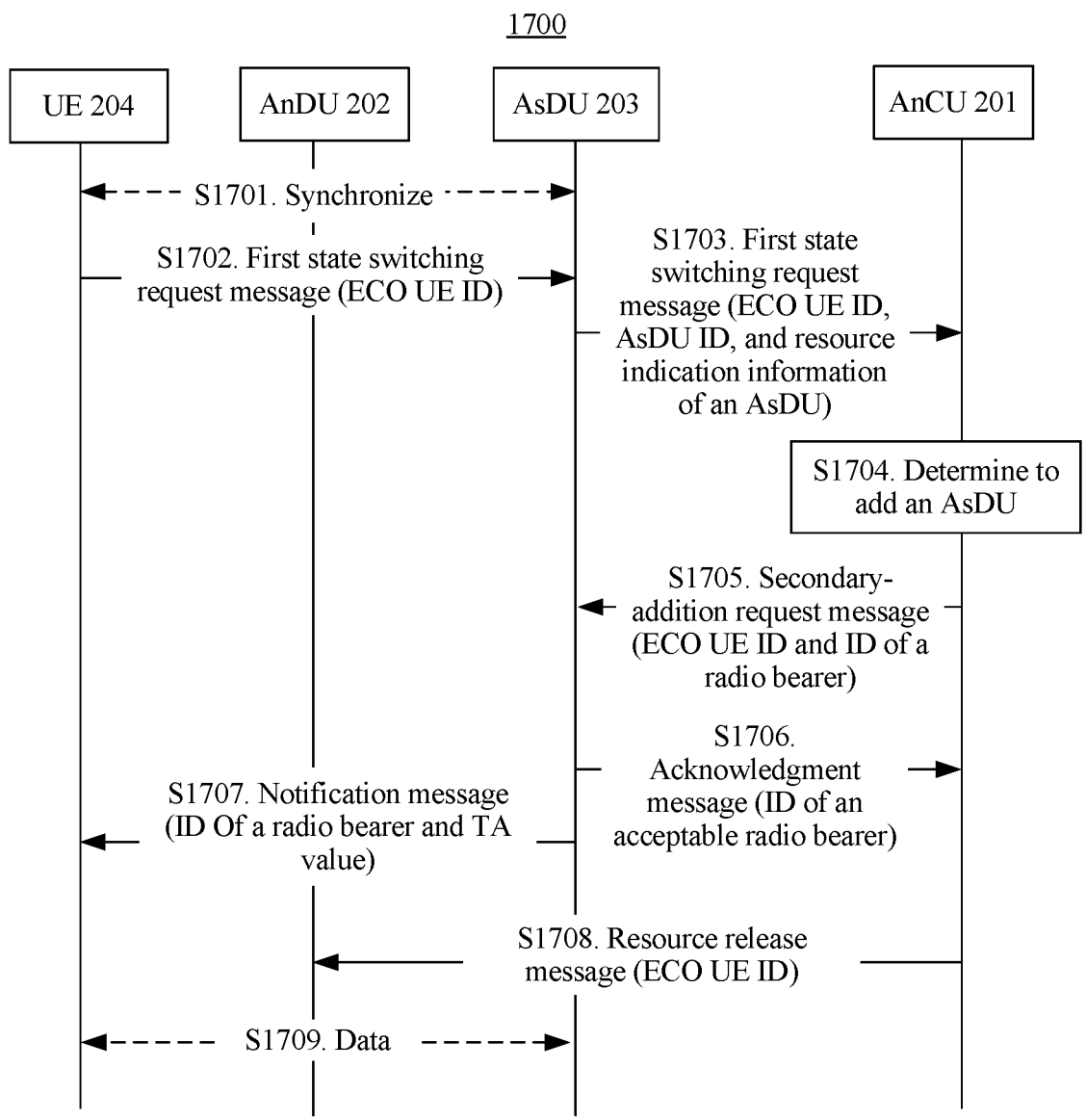
FIG. 18 is a schematic diagram of still another communication method according to an embodiment of this application.

FIG. 18 is a schematic diagram of a communication method 1700 according to an embodiment of this application. The method may be applied to the scenario 200. A difference between the method 1700 and the method 1300 is that application scenarios are different: The method 1300 is applied to the scenario 100, and the method 1700 is applied to the scenario 200. The method 1700 includes the following operations.

Operation S1701 is the same as S1601.

Operation S1702. When the ECO UE needs to transmit data, that is, the ECO UE needs to switch from a current ECO state to an active state, the ECO UE sends a first state switching request message to the AsDU 203. The first state switching request message is used to request the AsDU 203 that the ECO UE needs to switch from the ECO state to the active state. The first state switching request message may include an ECO UE ID. Optionally, the first state switching request may include packet size information of the required data and the like.

Operation S1703. When receiving the first state switching request message, the AsDU 203 adds resource indication information of the AsDU 203 and/or an identifier of the AsDU 203 to the first state switching request message and sends the first state switching request message to the AnCU 201.

It should be understood that the first state switching request message may be the first message in the method 400.

Operation S1704. When receiving the first state switching request message, the AnCU 201 determines to add the AsDU 203 as a secondary access network device of the ECO UE. Optionally, based on the first state switching request message, a network status of the AnCU 201, and the like, the AnCU 201 determines to add the AsDU 203 as the secondary access network device of the ECO UE.

Operation S1705. The AnCU 201 sends a secondary-addition request message to the AsDU 203, used to request to add the AsDU 203 as the secondary access network device of the ECO UE. The secondary-addition request message may be the second message in the method 400, and the secondary-addition request message carries the ECO UE ID and an ID of a radio bearer.

Operation S1706. The AsDU 203 sends an acknowledgment message for the secondary-addition request message to the AnCU 201. The AsDU 203 determines an ID of an acceptable radio bearer based on an ID of a radio bearer supported by the AsDU 203, and adds the ID of the radio bearer to the acknowledgment information and sends the acknowledgment information to the AnCU 201.

Operation S1707. The AnDU 201 sends a notification message to the ECO UE. The notification message includes at least one of an ID of a radio bearer served by the AsDU 203 and a TA value. Optionally, the notification message includes the ID of the radio bearer served by the AsDU 203, and the TA value enables the AsDU 203 to synchronize with the ECO UE. Optionally, the notification message may also include the ECO UE ID, used to indicate that a cause of sending the notification message is that the ECO UE needs to transmit data.

It should be understood that the notification message may be the third message in the method 400.

Operation S1708. The AnCU 201 sends a resource release message to the AnDU 202, where the resource release message includes the ECO UE ID, and the resource release message is used to instruct the AnDU 202 to release a resource between the AnDU 202 and the ECO UE.

It should be understood that a sequence of S1708 and S1707 is not limited, for example, S1708 may be performed before or after S1707.

Optionally, the method 1700 further includes: S1709. After the AsDU 203 is added as the secondary access network device, the AnCU 201 forwards data to the AsDU 203, and the AsDU 203 transmits the data with a terminal device in a first state. Certainly, the data may also be transmitted between the terminal device in the first state and both the AsDU 203 and the AnDU 202. This embodiment of this application is not limited thereto.

Figure 19A:
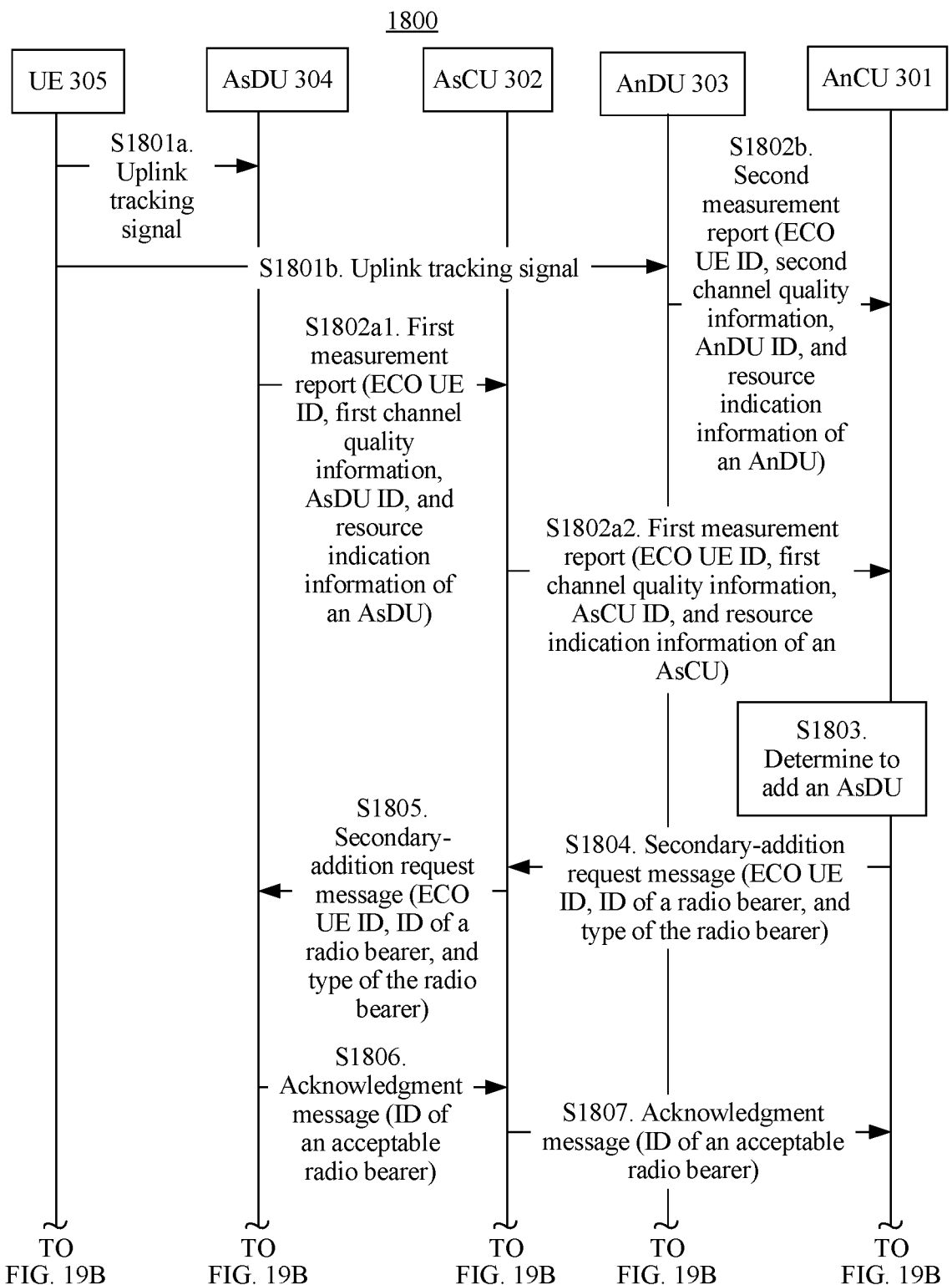
FIG. 19A and FIG. 19B are a schematic diagram of still another communication method according to an embodiment of this application.
Figure 19B:
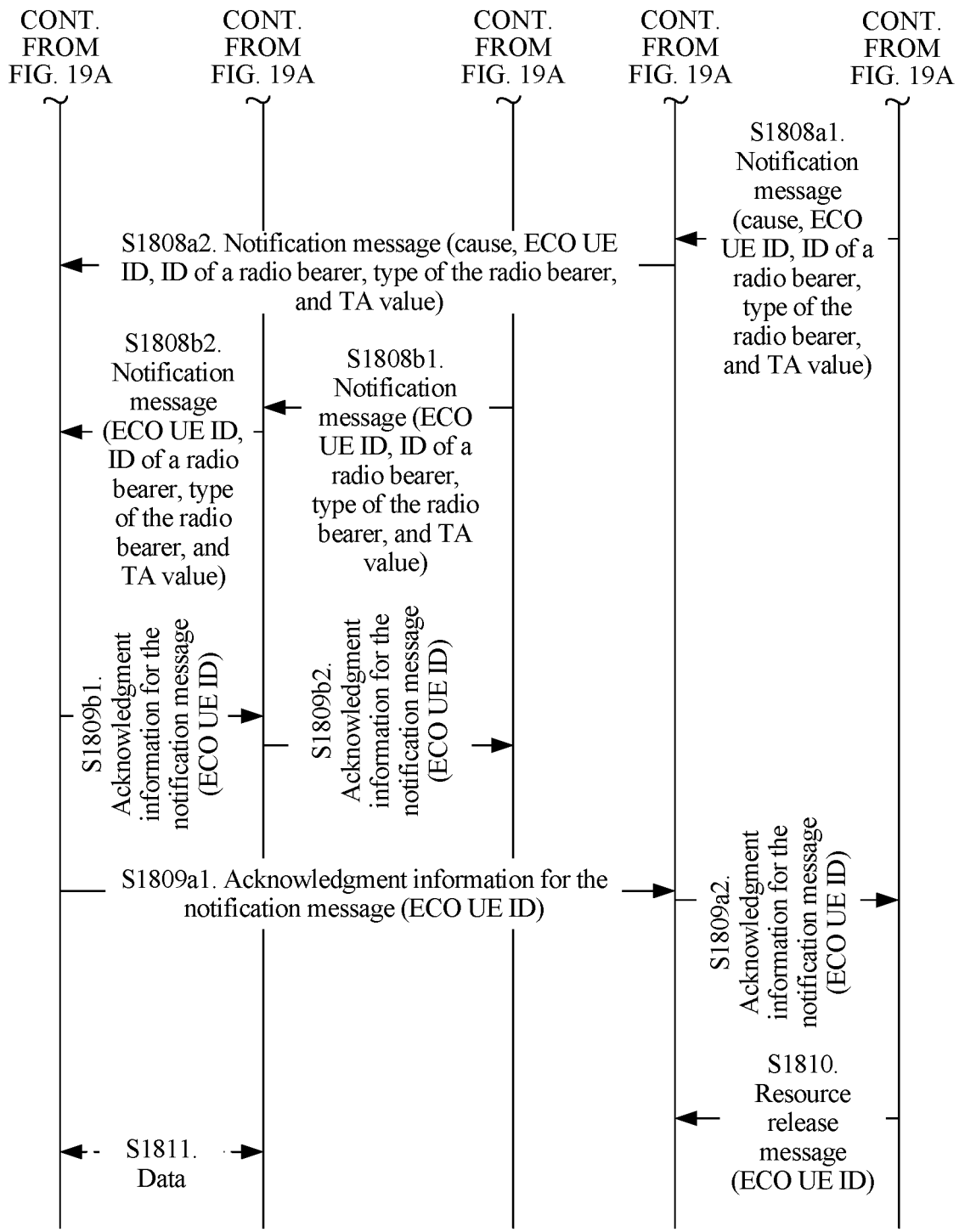

FIG. 19A and FIG. 19B are a schematic diagram of a communication method 1800 according to an embodiment of this application. The method 1800 may be applied to the scenario 300. A difference between the method 1800 and the method 900 is that application scenarios are different: The method 900 is applied to the scenario 100, and the method 1800 is applied to the scenario 300. The method 1800 includes the following operations.

Operation S1801. ECO UE sends an uplink tracking signal. S1801 may be S1801a and/or S1801b: S1801a. The ECO UE sends the uplink tracking signal to the AsDU 304; S1801b. The ECO UE sends the uplink tracking signal to the AnDU 303.

It should be understood that the uplink tracking signal may be the fourth message in the method 400.

It should also be understood that S1801a and S1802b may both exist, or only S1801b may exist.

Operation S1802a1. When receiving the uplink tracking signal, the AsDU 304 determines a first measurement report based on the uplink tracking signal. The first measurement report is used to indicate first channel quality information between the ECO UE and the AsDU 304. The AsDU 304 sends the first measurement report to the AsCU 302. The first measurement includes an ECO UE ID, an ID of a cell in which the ECO UE is currently located, resource indication information of the AsDU 304, and the first channel quality information. The ID of the cell in which the ECO UE is currently located may be, for example, an ID of the AsDU 304.

Operation S1802a2. When receiving the first measurement report sent by the AsDU 304, the AsCU 302 may add resource indication information of the AsCU 302 to the first measurement report and send the first measurement report to the AnCU 301.

Optionally, in this case, the first measurement report may include at least one of the ECO UE ID, the ID of the cell in which the ECO UE is currently located, the resource indication information of the AsDU 304, and the first channel quality information. Alternatively, the first measurement report may include at least one of the ECO UE ID, an ID of the AsCU 302, the resource indication information of the AsCU 302, and the first channel quality information. Alternatively, the first measurement report may include at least one of the ECO UE ID, the ID of the AsDU 304, an ID of the AsCU 302, the resource indication information of the AsDU 304, the resource indication information of the AsCU 302, and the first channel quality information. This embodiment of this application is not limited thereto.

It should be understood that the first measurement report may be the first message in the method 400.

Operation S1802*b*. When receiving the uplink tracking signal, the AnDU 303 determines a second measurement report based on the uplink tracking signal. The second measurement report is used to indicate second channel quality information between the ECO UE and the AnDU 303. The AnDU 303 sends the second measurement report to the AnCU 301. The second measurement includes the ECO UE ID, an ID of the AnDU 303, resource indication information of the AnDU 303, and the second channel quality information.

It should be understood that S1802 may include S1801*a*1 and S1801*a*2, or S1802 may include S1801*a*1, S1801*a*2, and S1802*b*.

Operation S1803. The AnCU 301 determines, based on the first measurement report, to add the AsDU 304 as a secondary access network device of the ECO UE.

In one embodiment, the AnCU 301 may compare the first channel quality information and the second channel quality information. When channel quality represented by the first channel quality information is better than channel quality represented by the second channel quality, the AnCU 201 determines to add the AsDU 203 as the secondary access network device of the ECO UE.

It should be understood that the first measurement report and/or the second measurement report may be periodically sent, or may be sent in a triggering manner, or sent in an alternate hybrid manner of periodical sending and triggering-based sending.

Operation S1804. The AnCU 301 sends a secondary-addition request message to the AsCU 302, used to request to add the AsDU 304 as the secondary access network device of the ECO UE. The secondary-addition request message may be the second message in the method 400, and the secondary-addition request message carries the ECO UE ID, an ID of a radio bearer, and type information of the radio bearer.

Operation S1805. The AsCU 302 sends the secondary-addition request message to the AsDU 304.

Operation S1806. The AsDU 304 sends an acknowledgment message for the secondary-addition request message to the AsCU 302. The AsDU 304 determines an ID of an acceptable radio bearer based on an ID of a radio bearer supported by the AsDU 304, and adds the ID of the radio bearer to the acknowledgment information and sends the acknowledgment information to the AsCU 302.

Operation S1807. The AsCU 302 sends the acknowledgment message in S1806 to the AnCU 301.

Operation S1808*a*1. The AnCU 301 sends a notification message to the AnDU 303. The notification message includes at least one of an ID of a radio bearer that may be served by the AsDU 304, a type of the radio bearer, a TA value, and the ECO UE ID. Optionally, the notification message includes the ID of the radio bearer that may be served by the AsDU 304 and the type of radio bearer, used to indicate that a cause of sending the notification message is that a terminal device in a first state has moved from coverage of the AnDU 303 to coverage of the AsDU 304. The TA value enables the AsDU 304 to synchronize with ECO UE.

Operation S1808*a*2. The AnDU 303 sends the notification message in S1808*a*1 to the ECO UE.

Operation S1808*b*1. The AsCU 302 sends a notification message to the AsDU 304, where information included in the notification message is similar to information included in the notification message in S1808*a*1.

Operation S1808*b*2. The AsDU 304 sends the notification message in S1808*b*1 to the ECO UE.

It should be understood that the notification message may be sent by performing S1808*a*1 and S1808*a*2, or may be sent by performing S1808*b*1 and S1808*b*2. This embodiment of this application is not limited thereto.

Operation S1809*b*1. The ECO UE sends an acknowledgment message for the notification message to the AsDU 304, where the acknowledgment message for the notification message includes the ECO UE ID.

Operation S1809*b*2. The AsDU 304 sends the notification message in S1809*b*1 to the AsCU 302.

Operation S1809*a*1. The ECO UE sends an acknowledgment message for the notification message to the AnDU 304.

Operation S1809*a*2. The AnDU 304 sends the notification message in S1809*a*1 to the AnCU 301.

It should be understood that the acknowledgment message for the notification message may be sent by performing S1809*a*1 and S1809*a*2, or may be sent by performing S1809*b*1 and S1809*b*2. This embodiment of this application is not limited thereto.

It should also be understood that the notification message is sent by performing S1808*a*1 and S1808*a*2, and the acknowledgment message for the notification message is sent by performing S1809*a*1 and S1809*a*2; the notification message is sent by performing S1808*b*1 and S1808*b*2, and the acknowledgment message for the notification message is sent by performing S1809*b*1 and S1809*b*2. This embodiment of this application is not limited thereto.

It should also be understood that the notification message is the third message in the method 400.

Operation S1810. The AnCU 301 sends a resource release message to the AnDU 304, where the resource release message includes the ECO UE ID, and the resource release message is used to instruct the AnDU 304 to release a resource between the AnDU 304 and the ECO UE.

In one embodiment, the method 1800 further includes: S1811. After the AsDU 303 is added as the secondary access network device, the AnCU 301 forwards data to the AsDU 304, and the AsDU 304 transmits the data with a terminal device in a first state. Certainly, the data may also be transmitted between the terminal device in the first state and both the AsDU 304 and the AnDU 303. This embodiment of this application is not limited thereto.

Figure 20:
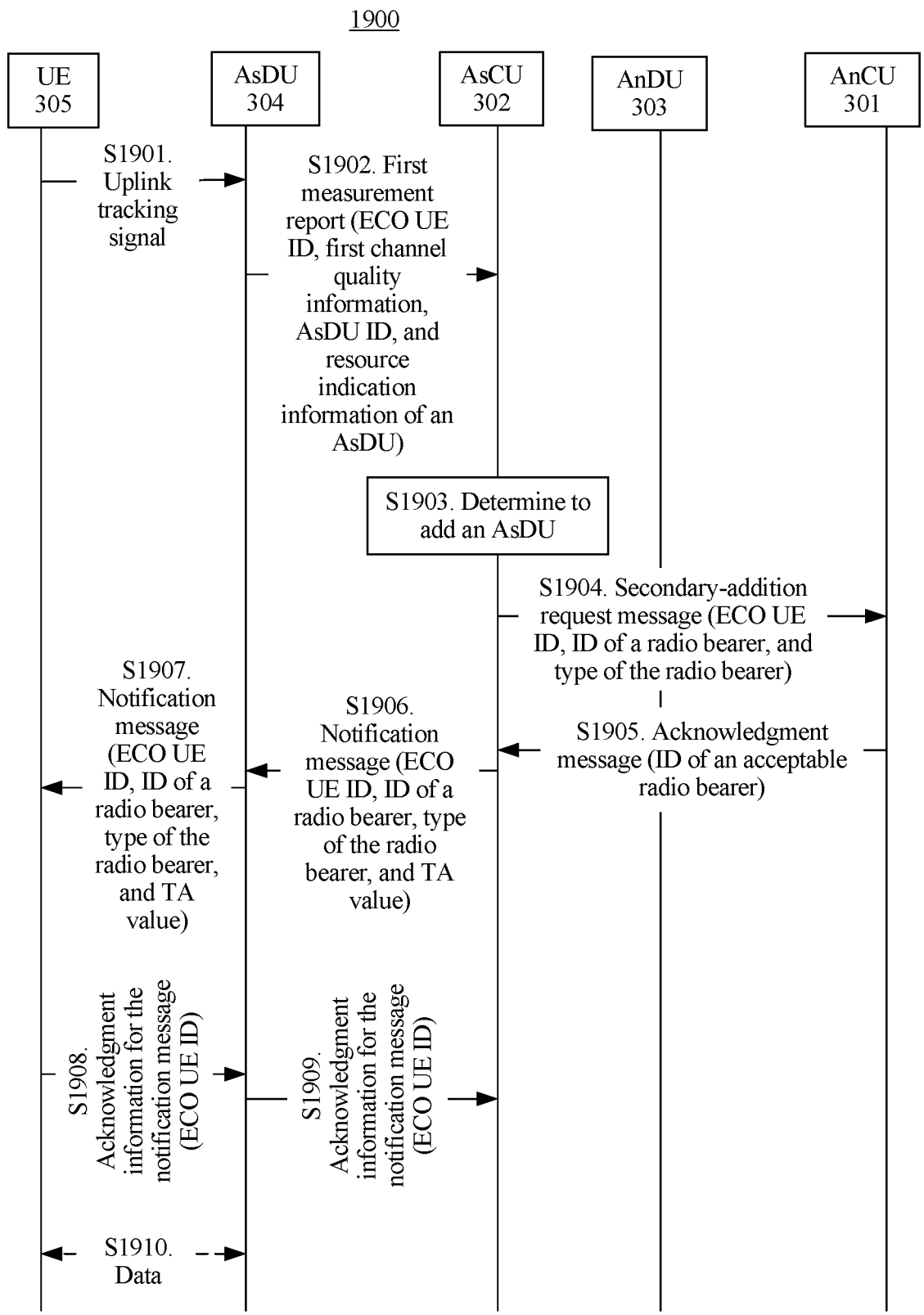
FIG. 20 is a schematic diagram of still another communication method according to an embodiment of this application.

FIG. 20 is a schematic diagram of a communication method 1900 according to an embodiment of this application. The method 1900 may be applied to the scenario 300. A difference between the method 1900 and the method 1000 is that application scenarios are different: The method 1000 is applied to the scenario 100, and the method 1900 is applied to the scenario 300. The method 1900 includes the following operations.

Operation S1901 is the same as S1801a.

Operation S1902 is the same as S1802a1.

Operation S1903. The AsCU 302 determines, based on the received first measurement report, to add the AsDU 304 as a secondary access network device of the ECO UE.

It should be understood that the first measurement report may be the first message in the method 500.

Operation S1904. The AsCU 302 sends a secondary-addition request message to the AnCU 301, used to request to add the AsDU 304 as the secondary access network device of the ECO UE. The secondary-addition request message may be the second message in the method 500, and the secondary-addition request message carries the ECO UE ID, an ID of a radio bearer supported by the AsCU 302, and a type of the radio bearer.

Operation S1905. The AnCU 301 sends an acknowledgment message for the secondary-addition request message to the AsCU 302, where the acknowledgment message includes an ID of a radio bearer that can be accepted by the AnCU 301.

Operation S1906 is the same as S1808b1.

Operation S1907 is the same as 1808b2.

Operation S1908 is the same as 1809b1.

Operation S1909 is the same as 1809b2.

Optionally, the method 1900 further includes: S1910. After the AsDU 303 is added as the secondary access network device, the AnCU 301 forwards data to the AsDU 304, and the AsDU 304 transmits the data with a terminal device in a first state. Certainly, the data may also be transmitted between the terminal device in the first state and both the AsDU 304 and the AnDU 303. This embodiment of this application is not limited thereto.

Figure 21:
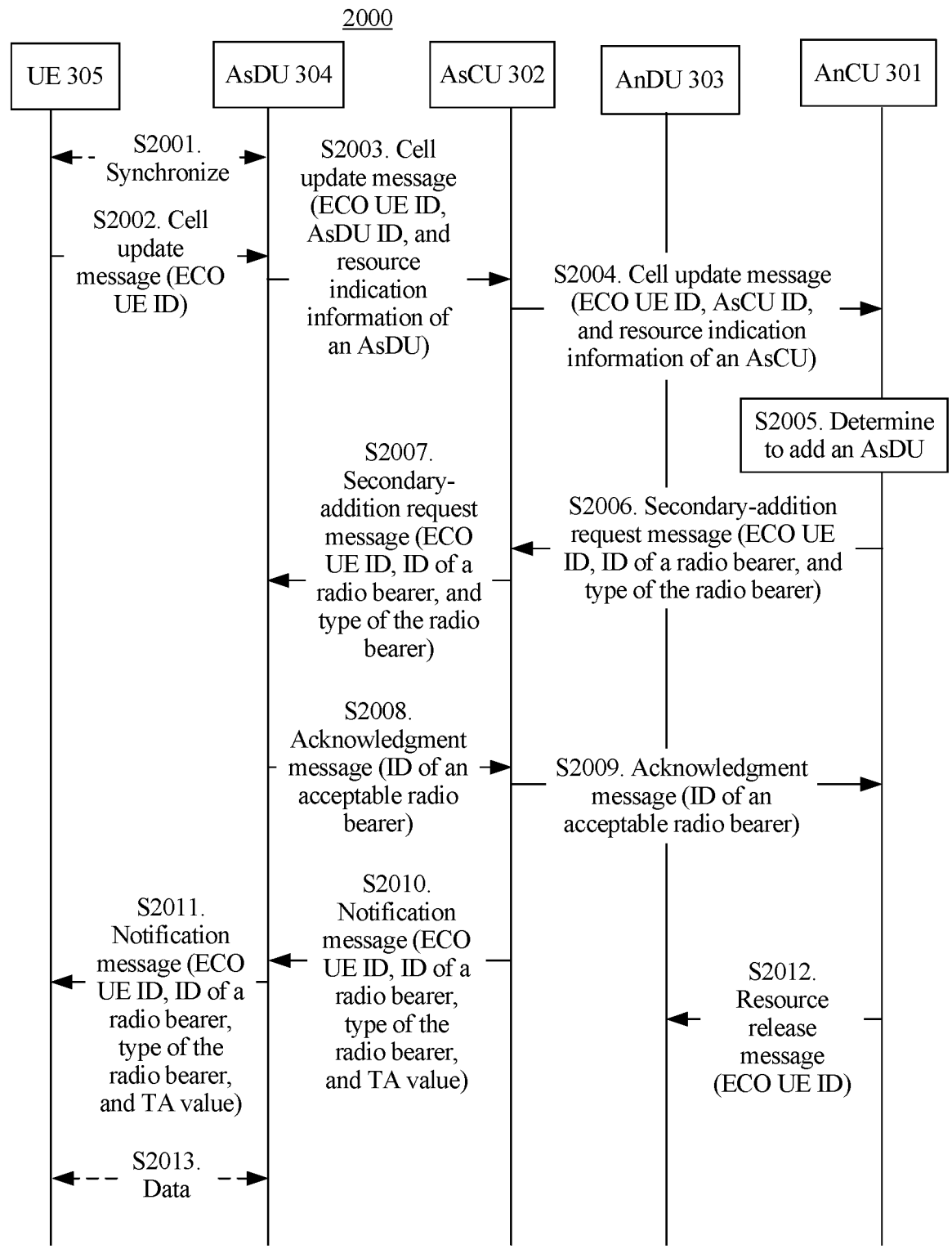
FIG. 21 is a schematic diagram of still another communication method according to an embodiment of this application.

FIG. 21 is a schematic diagram of a communication method 2000 according to an embodiment of this application. The method 2000 may be applied to the scenario 300. A difference between the method 2000 and the method 1100 is that application scenarios are different: The method 1100 is applied to the scenario 100, and the method 2000 is applied to the scenario 300. The method 2000 includes the following operations.

Operation S2001. If ECO UE performs both uplink and downlink measurement, and the AsDU 304 enables, by adjusting TA, the ECO UE to keep synchronization with the AsDU 304, S2001 is not required. Otherwise, S2001 is required to implement synchronization between the ECO UE and the AsDU 304.

Operation S2002. When the ECO UE performs reselection to move from a cell covered by the AnDU 304 to a cell covered by the AsDU 304, the ECO UE sends cell update information to the AsDU 304. The cell update message is used to indicate that the ECO UE moves from the cell covered by the AnDU 304 to the cell covered by the AsDU 304, and the cell update information includes an ECO UE ID.

Operation S2003. When receiving the cell update information, the AsDU 304 adds resource indication information of the AsDU 304, an ID of the AsDU 304, and the ECO UE ID to the cell update information and sends the cell update information to the AsCU 302.

S2004. When receiving the cell update information, the AsCU 302 may add resource indication information of the AsCU 302, an ID of the AsCU 302, and the ECO UE ID to the cell update information and sends the cell update information to the AnCU 301.

In one embodiment, the cell update information in this case may include at least one of the resource indication information of the AsDU 304, the ID of the AsDU 304, and the ECO UE ID. Alternatively, the cell update information may include at least one of the resource indication information of the AsCU 302, the ID of the AsCU 302, and the ECO UE ID. Alternatively, the cell update information may include at least one of the resource indication information of the AsDU 304, the resource indication information of the AsCU 302, the ID of the AsDU 304, the ID of the AsCU 302, and the ECO UE ID.

It should be understood that the cell update information in S2004 may be construed as the first message in the method 400.

Operation S2005. When receiving the cell update information, the AnCU 301 determines to add the AsDU 304 as a secondary access network device of the ECO UE. Optionally, based on the cell update information, a network status of the AnCU 301, and the like, the AnCU 301 determines to add the AsDU 304 as the secondary access network device of the ECO UE.

Operation S2006. The AnCU 301 sends a secondary-addition request message to the AsCU 302, used to request to add the AsDU 304 as the secondary access network device of the ECO UE. The secondary-addition request message may be the second message in the method 400, and the secondary-addition request message carries the ECO UE ID, an ID of a radio bearer, and a type of the radio bearer.

Operation S2007. The AsCU 302 sends the secondary-addition request message in S2006 to the AsDU 304.

Operation S2008. The AsDU 304 sends an acknowledgment message for the secondary-addition request message to the AsCU 302. The AsDU 304 determines an ID of an acceptable radio bearer based on an ID of a radio bearer supported by the AsDU 304, and adds the ID of the radio bearer to the acknowledgment information and sends the acknowledgment information to the AsCU 302.

Operation S2009. The AsCU 302 sends the acknowledgment message for the secondary-addition request message in S2008 to the AnCU 301.

Operation S2010. The AsCU 302 sends a notification message to the AsDU 304, where the notification message carries an ID of a radio bearer served by the AsDU 304 and a type of the radio bearer served by the AsDU 304, or may include a TA value and/or the ECO UE ID. The TA value enables the AsDU 203 to synchronize with the ECO UE. The notification message may be the third message in the method 400.

Operation S2011. The AsDU 304 sends the notification message in S2010 to the ECO UE.

Operation S2012. The AnCU 301 sends a resource release message to the AnDU 303, where the resource release message includes the ECO UE ID, and the resource release message is used to instruct the AnDU 303 to release a resource between the AnDU 303 and the ECO UE.

It should be understood that a sequence of S2012 and both S2010 and S2011 is not limited, for example, S2012 may be performed before S2010 or S2011.

Optionally, the notification message may also be sent by the AnCU 301 to the AnDU 303, and then the AnDU 303 sends the notification message to the ECO UE. This embodiment of this application is not limited thereto.

Optionally, the method 2000 further includes: S2013. After the AsDU 303 is added as the secondary access network device, the AnCU 301 forwards data to the AsDU 304, and the AsDU 304 transmits the data with a terminal device in a first state. Certainly, the data may also be transmitted between the terminal device in the first state and both the AsDU 304 and the AnDU 303. This embodiment of this application is not limited thereto.

Figure 22:
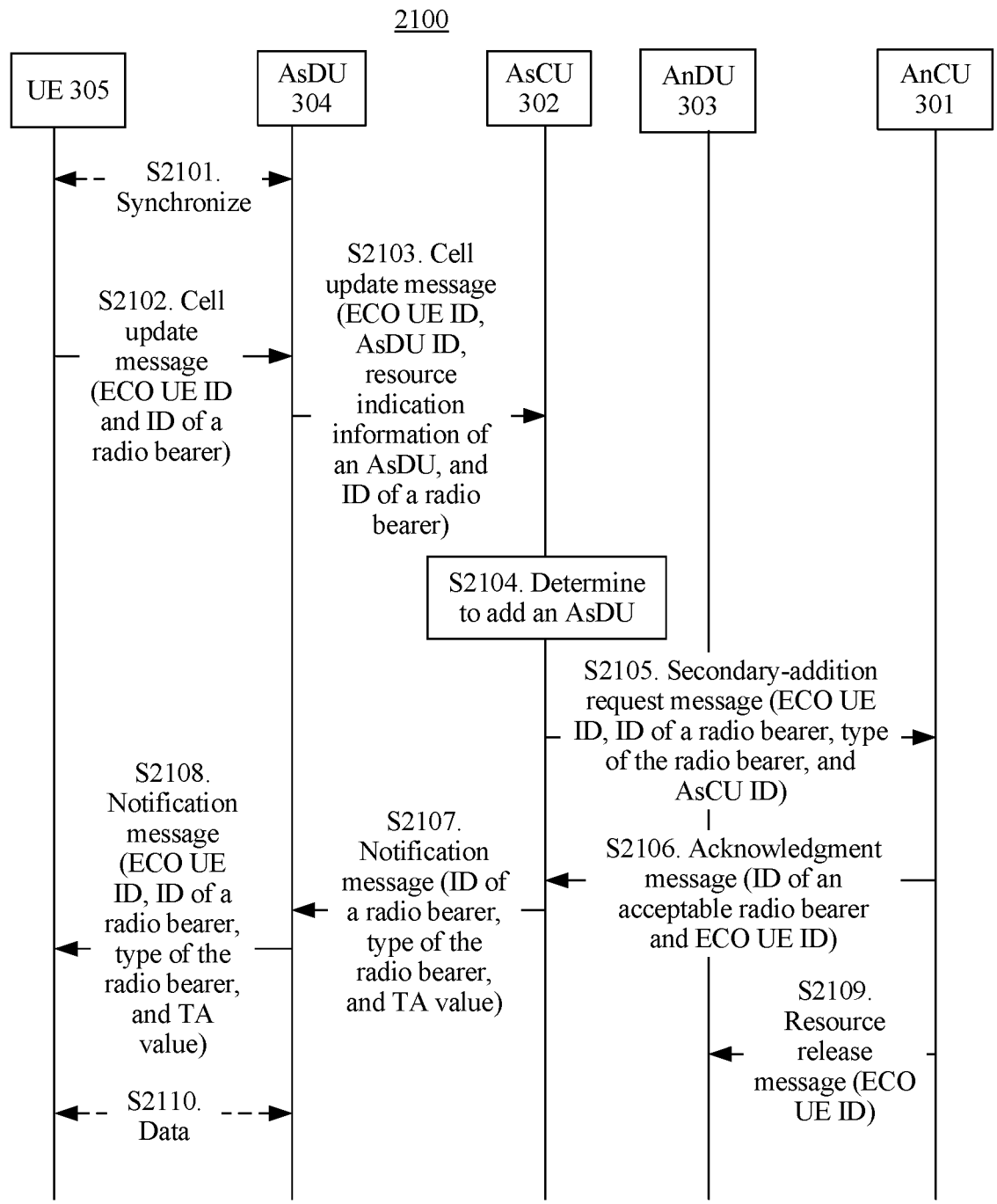
FIG. 22 is a schematic diagram of still another communication method according to an embodiment of this application.

FIG. 22 is a schematic diagram of a communication method 2100 according to an embodiment of this application. The method 2100 may be applied to the scenario 300. A difference between the method 2100 and the method 1200 is that application scenarios are different: The method 1200 is applied to the scenario 100, and the method 2100 is applied to the scenario 300. The method 2100 includes the following operations.

Operation S2101 is the same as S2001.

Operation S2102. When the ECO UE performs reselection to move from a cell covered by the AnDU 304 to a cell covered by the AsDU 304, the ECO UE sends cell update information to the AsDU 304. The cell update message is used to indicate that the ECO UE moves from the cell covered by the AnDU 304 to the cell covered by the AsDU 304, and the cell update information includes an ECO UE ID and an ID of a current radio bearer of the ECO UE.

Operation S2103. When receiving the cell update information, the AsDU 304 adds resource indication information of the AsDU 304, an ID of the AsDU 304, and the ECO UE ID to the cell update information and sends the cell update information to the AsCU 302.

Operation S2104. When the AsCU 302 receives the cell update information, the AsCU 302 determines, based on the ID of the current radio bearer of the ECO UE, whether to add the AsDU 304 as a secondary access network device of the ECO UE. For example, if the AsDU 304 supports the current radio bearer of the ECO UE, the AsCU 302 determines to add the AsDU 304 as the secondary access network device of the ECO UE; otherwise, the AsCU 302 determines not to add the AsDU 304 as the secondary access network device of the ECO UE. For another example, the AsCU 302 determines, based on resource information of the AsCU 302, a network load status, the resource indication information of the AsDU 304, and the current radio bearer of the ECO UE, whether to add the AsDU 304 as the secondary access network device of the ECO UE.

Operation S2105. The AsCU 302 sends a secondary-addition request message to the AnCU 301, used to request to add the AsDU 304 as the secondary access network device of the ECO UE. The secondary-addition request message may be the second message in the method 500, and the secondary-addition request message carries the ECO UE ID, an ID of a radio bearer, a type of the radio bearer, and an ID of the AsCU 302.

Operation S2106. The AnCU 301 sends an acknowledgment message for the secondary-addition request message to the AsCU 302. The AnCU 301 determines an ID of an acceptable radio bearer based on an ID of a radio bearer supported by the AnCU 301, and adds the ID of the radio bearer and the ECO UE ID to the acknowledgment information and sends the acknowledgment information to the AsCU 302.

Operation S2107 is the same as S2010.
Operation S2108 is the same as S2011.
Operation S2109 is the same as S2012.

Optionally, the notification message may also be sent by the AnCU 301 to the AnDU 303, and then the AnDU 303 sends the notification message to the ECO UE. This embodiment of this application is not limited thereto.

Optionally, the method 2100 further includes: S2110. After the AsDU 303 is added as the secondary access network device, the AnCU 301 forwards data to the AsDU 304, and the AsDU 304 transmits the data with a terminal device in a first state. Certainly, the data may also be transmitted between the terminal device in the first state and both the AsDU 304 and the AnDU 303. This embodiment of this application is not limited thereto.

Figure 23:
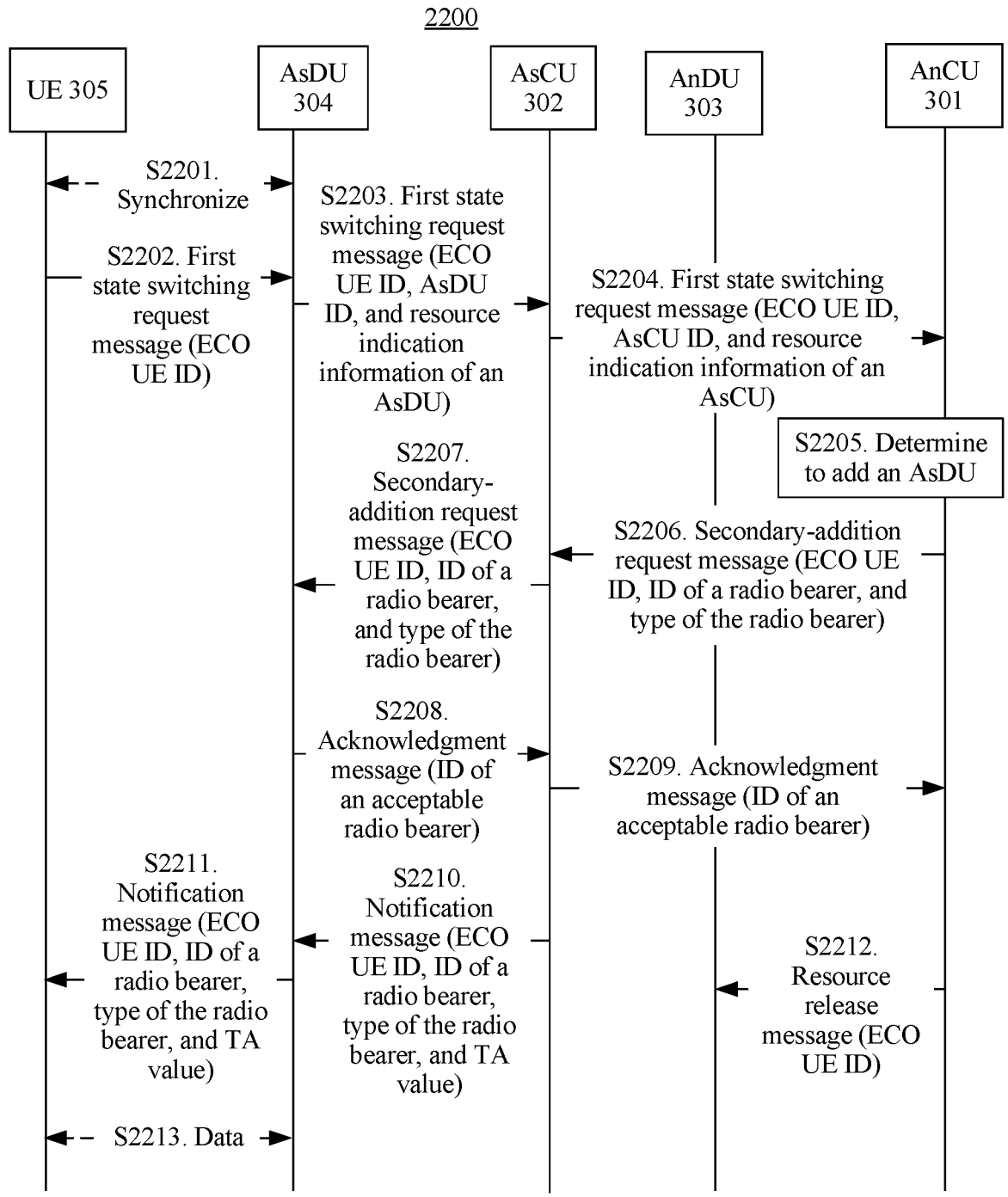
FIG. 23 is a schematic diagram of another communication method according to an embodiment of this application.

FIG. 23 is a schematic diagram of a communication method 2200 according to an embodiment of this application. The method 2200 may be applied to the scenario 300. A difference between the method 2200 and the method 1300 is that application scenarios are different: The method 1300 is applied to the scenario 100, and the method 2200 is applied to the scenario 300. The method 2200 includes the following operations.

Operation S2201 is the same as S2001.

Operation S2202. When the ECO UE needs to transmit data, that is, the ECO UE needs to switch from a current ECO state to an active state, the ECO UE sends a first state switching request message to the AsDU 304. The first state switching request message is used to request that the ECO UE needs to switch from the ECO state to the active state. The first state switching request message may include an ECO UE ID, or may include packet size information of the required data and the like.

Operation S2203. When receiving the first state switching request message, the AsDU 304 adds an ID of the AsDU 304, the ECO UE ID, and resource indication information of the AsDU 304 to the first state switching request message and sends the first state switching request message to the AsCU 302.

Operation S2204. When receiving the first state switching request message, the AsCU 302 adds an ID of the AsCU 302, the ECO UE ID, and resource indication information of the AsCU 302 to the first state switching request message and sends the first state switching request message to the AnCU 301.

Optionally, the first state switching request message may include at least one of the ID of the AsDU 304, the ECO UE ID, and the resource indication information of the AsDU 304. Alternatively, the first state switching request message may include at least one of the ID of the AsCU 302, the ECO UE ID, and the resource indication information of the AsCU 302. Alternatively, the first state switching request message may include at least one of the ID of the AsDU 304, the ID of the AsCU 302, the ECO UE ID, the resource indication information of the AsDU 304, and the resource indication information of the AsCU 302. This embodiment of this application is not limited thereto.

It should be understood that the first state switching request message may be the first message in the method 400.

Operation S2205. When receiving the first state switching request message, the AnCU 301 determines to add the AsDU 304 as a secondary access network device of the ECO UE. Optionally, based on the first state switching request message, a network status of the AnCU 301, and the like, the AnCU 301 determines to add the AsDU 304 as the secondary access network device of the ECO UE.

Operation S2206. The AnCU 301 sends a secondary-addition request message to the AsCU 302, used to request to add the AsDU 304 as the secondary access network device of the ECO UE. The secondary-addition request message may be the second message in the method 400, and the secondary-addition request message carries the ECO UE ID, an ID of a radio bearer, and a type of the radio bearer.

Operation S2207. The AsCU 302 sends the secondary-addition request message in S2206 to the AsDU 304.

Operation S2208. The AsDU 304 sends an acknowledgment message for the secondary-addition request message to the AsCU 302. The AsDU 304 determines an ID of an acceptable radio bearer based on an ID of a radio bearer supported by the AsDU 304, and adds the ID of the radio bearer to the acknowledgment information and sends the acknowledgment information to the AsCU 302.

Operation S2209. The AsCU 302 sends the acknowledgment message for the secondary-addition request message in S2208 to the AnCU 301.

Operation S2210. The AsCU 302 sends a notification message to the AsDU 304. The notification message includes at least one of the ECO UE ID, an ID of a radio bearer served by the AsDU 304, a type of the radio bearer served by the AsDU 304, and a TA value. Optionally, the notification message includes the ID of the radio bearer served by the AsDU 203 and the type of the radio bearer served by the AsDU 203, used to indicate that a cause of sending the notification message is that the ECO UE needs to transmit data. The TA value enables the AsDU 203 to synchronize with the ECO UE.

It should be understood that the notification message may be the third message in the method 400.

Operation S2211. The AsDU 304 sends the notification message in S2210 to the ECO UE.

Operation S2212. The AnCU 301 sends a resource release message to the AnDU 303, where the resource release message includes the ECO UE ID, and the resource release message is used to instruct the AnDU 303 to release a resource between the AnDU 303 and the ECO UE.

It should be understood that a sequence of S2212 and both S2210 and S2211 is not limited, for example, S2212 may be performed before S2210 and S2211.

Optionally, the method 2200 further includes: S2213. After the AsDU 303 is added as the secondary access network device, the AnCU 301 forwards data to the AsDU 304, and the AsDU 304 transmits the data with a terminal device in a first state. Certainly, the data may also be transmitted between the terminal device in the first state and both the AsDU 304 and the AnDU 303. This embodiment of this application is not limited thereto.

Figure 24:
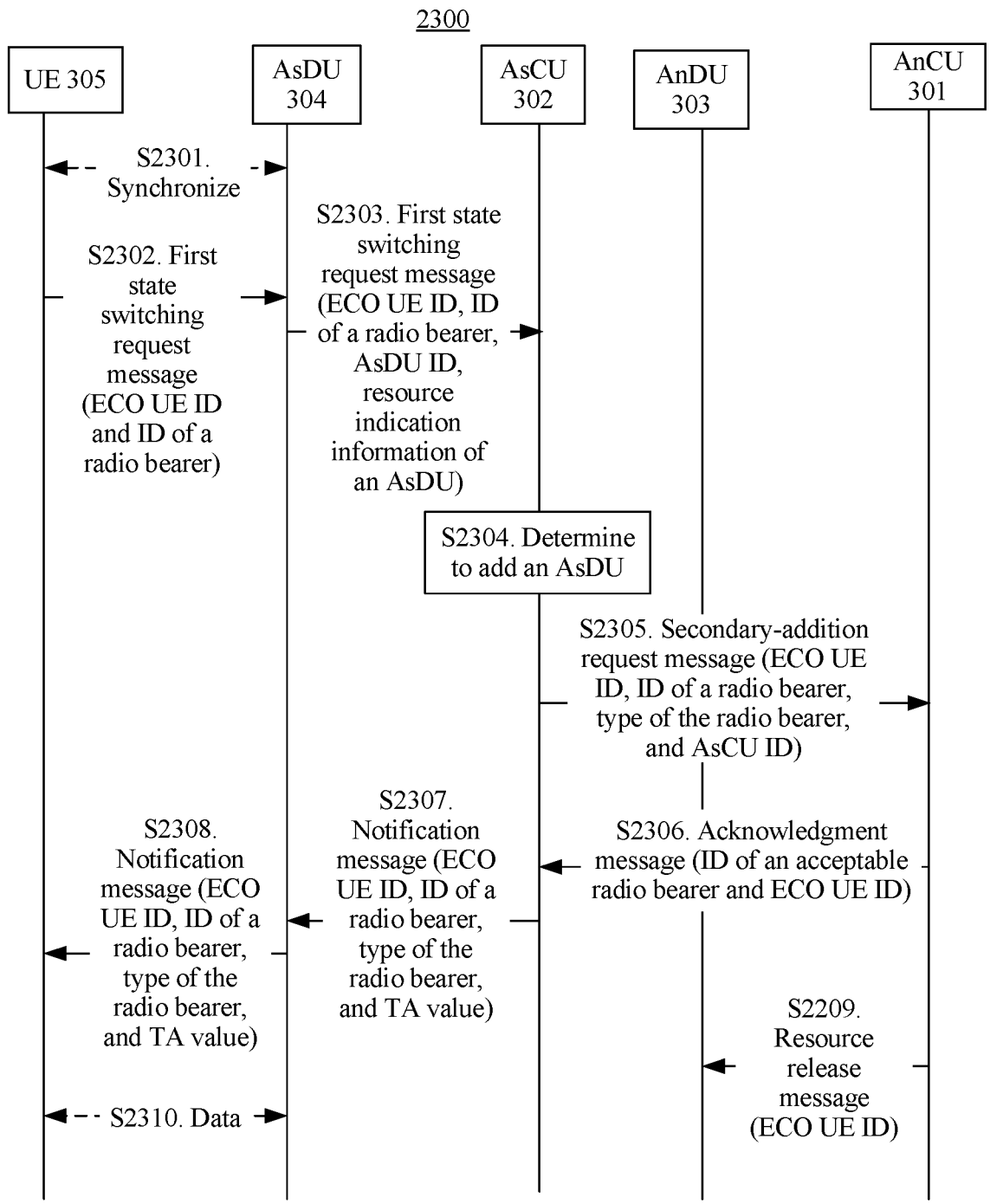
FIG. 24 is a schematic diagram of another communication method according to an embodiment of this application.

FIG. 24 is a schematic diagram of a communication method 2300 according to an embodiment of this application. The method 2300 may be applied to the scenario 300. A difference between the method 2300 and the method 1400 is that application scenarios are different: The method 1400 is applied to the scenario 100, and the method 2300 is applied to the scenario 300. The method 2300 includes the following operations.

Operation S2301 is the same as S2201.

Operation S2302. When the ECO UE needs to transmit data, that is, the ECO UE needs to switch from a current ECO state to an active state, the ECO UE sends a first state switching request message to the AsDU 304. The first state switching request message is used to request that the ECO UE needs to switch from the ECO state to the active state. The first state switching request message may include an ECO UE ID and an ID of a radio bearer, that is, an identifier of data that needs to be transmitted currently by the ECO UE, or may include packet size information of the required data.

Operation S2303. When receiving the first state switching request message, the AsDU 304 adds at least one of an ID of the AsDU 304, resource indication information of the AsDU 304, the ECO UE ID, and the ID of the radio bearer to the first state switching request message and sends the first state switching request message to the AsCU 302. Optionally, the first state switching request message includes the ID of the AsDU 304, the resource indication information of the AsDU 304, the ECO UE ID, and the ID of the radio bearer.

It should be understood that the first switching request message may be the first message in the method 500.

Operation S2304. When receiving the first state switching request message, the AsCU 302 determines, based on the ID of the radio bearer of the ECO UE, whether to add the AsDU 304 as a secondary access network device of the ECO UE. For example, if the AsDU 304 supports the radio bearer of the ECO UE, the AsCU 302 determines to add the AsDU 304 as the secondary access network device of the ECO UE. Otherwise, the AsCU 302 determines not to add the AsDU 304 as the secondary access network device of the ECO UE. For another example, the AsCU 302 determines, based on resource information of the AsCU 302, the resource indication information of the AsDU 304, a network load status, and the ID of the radio bearer of the ECO UE, whether to add the AsDU 304 as the secondary access network device of the ECO UE.

Operation S2305. When the AsCU 302 determines to add the AsDU 304 as the secondary access network device of the ECO UE, the AsCU 302 sends a secondary-addition request message to the AnCU 301, used to request to add the AsDU 304 as the secondary access network device of the ECO UE. The secondary-addition request message may be the second message in the method 500, and the secondary-addition request message carries the ECO UE ID, the ID of the radio bearer, the type of the radio bearer, and an ID of the AsCU 302.

Operation S2306. The AnCU 301 sends an acknowledgment message for the secondary-addition request message to the AsCU 302. The AnCU 301 determines an ID of an acceptable radio bearer based on an ID of a radio bearer supported by the AnCU 301, and adds the ID of the radio bearer to the acknowledgment information and sends the acknowledgment information to the AsCU 302.

Operation S2307 is the same as S2210.

It should be understood that the notification message may be the third message in the method 500.

Operation S2308 is the same as S2211.

Operation S2309 is the same as S2212.

In one embodiment, the method 2300 further includes: S2310. After the AsDU 303 is added as the secondary access network device, the AnCU 301 forwards data to the AsDU 304, and the AsDU 304 transmits the data with a terminal device in a first state. Certainly, the data may also be transmitted between the terminal device in the first state and both the AsDU 304 and the AnDU 303. This embodiment of this application is not limited thereto.

With reference to FIG. 4 to FIG. 24, the communication methods according to the embodiments of this application are described in detail in the foregoing. With reference to FIG. 25 to FIG. 42, communications apparatuses according to the embodiments of this application are described in the following.

Figure 25:
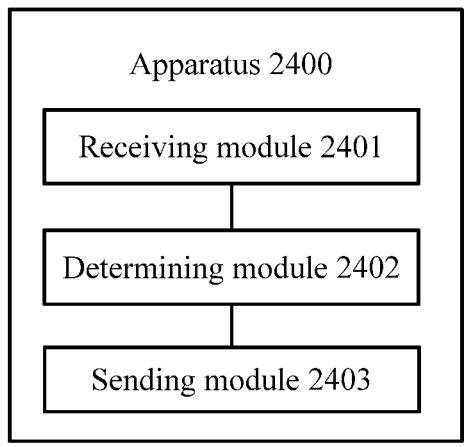
FIG. 25 is a schematic diagram of a communications apparatus according to an embodiment of this application.

FIG. 25 is a schematic diagram of a communications apparatus 2400 according to an embodiment of this application. The apparatus 2400 includes:

a receiving module 2401, configured to receive a first message, where the apparatus 2400 is a primary access network device of a terminal device in a first state, the terminal device in the first state does not send channel state information to the apparatus 2400, and a core network device and the apparatus 2400 reserve a data plane connection of the terminal device in the first state;

a determining module 2402, configured to determine, based on the first message, that a second device is a secondary access network device of the terminal device in the first state; and a sending module 2403, configured to send a second message to the second device, where the second message is used to request to add the second device as the secondary access network device of the terminal device in the first state.

The receiving module 2401 is further configured to receive an acknowledgment message that is for the second message and that is sent by the second device based on the second message.

In an optional embodiment, the sending module 2401 is further configured to: after the acknowledgment message that is for the second message and that is sent by the second device based on the second message is received, send a third message to the terminal device in the first state, where the third message is used to notify the terminal device in the first state that the second device is the secondary access network device of the terminal device in the first state.

In an optional embodiment, the third message includes at least one of first indication information, identification information of the terminal device in the first state, identification information of a first radio bearer, type information of the radio bearer, and timing advance TA information. The first indication information is used to indicate that the apparatus 2400 and the core network device reserve a data plane connection and/or the apparatus 2400 reserves a radio bearer of the terminal device in the first state. The identification information of the first radio bearer is used to identify a radio bearer that is able to be transmitted by the second device to the terminal device in the first state. The type information of the radio bearer is used to indicate an allocation manner that is between the apparatus 2400 and the second device and that is of a protocol stack corresponding to the radio bearer. The TA information is used to indicate time information of timing advance of uplink synchronization between the terminal device in the first state and the second device.

In an optional embodiment, the second message includes at least one of the identification information of the terminal device in the first state, the type information of the radio bearer, and identification information of at least one radio bearer that the apparatus 2400 requests the second device to transmit, and the type information of the radio bearer is used to indicate the allocation manner that is between the apparatus 2400 and the second device and that is of the protocol stack corresponding to the radio bearer that is of the terminal device in the first state and that is reserved by a network device; and/or, the acknowledgment message for the second message includes the identification information of the first radio bearer that is able to be transmitted by the second device to the terminal device in the first state, and the identification information of the at least one radio bearer includes the identification information of the first radio bearer.

In an optional embodiment, the receiving module 2401 is specifically configured to receive a first measurement report, where the first measurement report is used to indicate first channel quality information between the terminal device in the first state and the second device. The determining module 2402 is specifically configured to determine, based on the first channel quality information, that the second device is the secondary access network device of the terminal device in the first state.

In an optional embodiment, the receiving module 2401 is specifically configured to receive a cell update message of the terminal device in the first state, where the cell update message is used to indicate that the terminal device in the first state moves from a cell covered by the apparatus 2400 to a cell covered by the second device. The determining module 2402 is further specifically configured to determine, based on the cell update message, that the second device is the secondary access network device of the terminal device in the first state.

In an optional embodiment, the receiving module 2401 is further specifically configured to receive a first state switching request message of the terminal device in the first state, where the first state switching request message is used to request the second device that the terminal device in the first state needs to switch from the first state to an active state. The determining module 2402 is further specifically configured to determine, based on the first state switching request message, that the second device is the secondary access network device of the terminal device in the first state.

In an optional embodiment, the first message includes at least one of the identification information of the terminal device in the first state, identification information of a current cell in which the terminal device in the first state is located, a channel quality parameter between the second device and the terminal device in the first state, and resource indication information of the second device. The current cell in which the terminal device in the first state is located is the cell covered by the second device.

In an optional embodiment, the apparatus 2400 is an anchor network device AnNR, and the second device is an assistant network device AsNR. The receiving module 2401 is specifically configured to receive the first message sent by the AsNR.

In an optional embodiment, the apparatus 2400 is an anchor central unit AnCU, and the second device is an assistant distribute unit AsDU. The AnCU is configured to control an AnDU, and an assistant central unit AsCU is configured to control the AsDU. The receiving module 2401 is further specifically configured to receive the first message sent by the AsDU by using the AsCU; the sending module 2403 is specifically configured to send the second message to the AsDU by using the AsCU; and the receiving module 2401 is further specifically configured to receive the acknowledgment message that is for the second message and that is sent by the AsDU by using the AsCU.

It should be understood that the apparatus 2400 herein is represented in a form of a functional module. The term "module" herein may be an application-specific integrated circuit (application-specific integrated circuit, ASIC), an electronic circuit, a processor (for example, a shared processor, a dedicated processor, or a group processor) configured to execute one or more software or firmware programs and a memory, a combination logic circuit, and/or another proper component supporting the described functions. In an optional example, a person skilled in the art may understand that the apparatus 2400 may be specifically the first device in the foregoing embodiments, and the apparatus 2400 may be configured to perform procedures and/or operations corresponding to the first device in the embodiment of the method 400. To avoid repetition, details are not described herein again.

Figure 26:
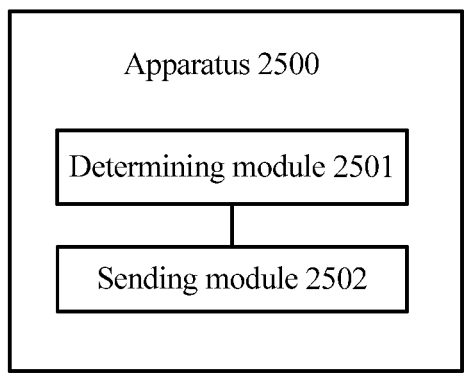
FIG. 26 is a schematic diagram of another communications apparatus according to an embodiment of this application.

FIG. 26 is a schematic diagram of a communications apparatus 2500 according to an embodiment of this application. The apparatus 2500 includes:

a determining module 2501, configured to determine to perform first-state configuration on a terminal device; and a sending module 2502, configured to send first-state configuration information to the terminal device, so that the terminal device enters a first state according to the first-state configuration information, where the first-state configuration information is used to indicate that the network device and a core network device reserve a data plane connection, and the first-state configuration information includes at least one of measurement manner indication information, identification information of the first state allocated by the apparatus 2500 to the terminal device, identification information of a radio bearer reserved by the apparatus 2500, and a radio resource allocated by the apparatus 2500 to the terminal device.

In an optional embodiment, the apparatus 2500 further includes a receiving module, configured to receive capability information of the terminal device that is sent by the terminal device or the core network device, where the capability information includes at least one of: whether the terminal device supports the first state, identification information of the terminal device, whether the terminal device supports uplink measurement, and whether the terminal device supports downlink measurement. The determining module 2501 is specifically configured to determine, based on the capability information, to perform first-state configuration on the terminal device.

In an optional embodiment, the sending module 2502 is further configured to send a first-state preset condition to the terminal device, and the receiving module is further configured to receive a second state request message sent by the terminal device based on the first-state preset condition. The second state switching request message is used to request that the terminal device needs to switch from a current state to the first state. The determining module 2501 is further specifically configured to determine, based on the second state request message, to perform first-state configuration on the terminal device.

It should be understood that the apparatus 2500 herein is represented in a form of a functional module. The term "module" herein may be an ASIC, an electronic circuit, a processor (for example, a shared processor, a dedicated processor, or a group processor) configured to execute one or more software or firmware programs and a memory, a combination logic circuit, and/or another proper component supporting the described functions. In an optional example, a person skilled in the art may understand that the apparatus 2500 may be specifically the network device in the foregoing embodiments, and the apparatus 2500 may be configured to perform procedures and/or operations corresponding to the network device in the embodiment of the method 600. To avoid repetition, details are not described herein again.

Figure 27:
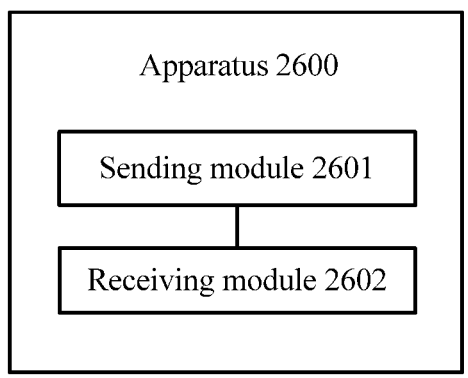
FIG. 27 is a schematic diagram of still another communications apparatus according to an embodiment of this application.

FIG. 27 is a schematic diagram of a communications apparatus 2600 according to an embodiment of this application. The apparatus 2600 includes:

a sending module 2601, configured to send a first message to a first device, where the first message is used by the first device to determine that the apparatus 2600 is a secondary access network device of a terminal device in a first state, the first device is a primary access network device of the terminal device in the first state, the terminal device in the first state does not send channel state information to the first device, and a core network device and the first device reserve a data plane connection of the terminal device in the first state; and a receiving module 2602, configured to receive a second message sent by the first device based on the first message, where the second message is used to request to add the apparatus 2600 as the secondary access network device of the terminal device in the first state.

The sending module 2601 is further configured to send an acknowledgment message for the second message to the first device based on the second message.

In an embodiment, the sending module 2601 is further configured to: after sending the acknowledgment message for the second message to the first device based on the second message, send a third message to the terminal device in the first state, where the third message is used to notify the terminal device in the first state that the apparatus 2600 is the secondary access network device of the terminal device in the first state.

In an embodiment, the third message includes at least one of first indication information, identification information of the terminal device in the first state, identification information of a first radio bearer, type information of the radio bearer, and timing advance TA information. The first indication information is used to indicate that the first device and the core network device reserve a data plane connection and/or the first device reserves a radio bearer of the terminal device in the first state. The identification information of the first radio bearer is used to identify a radio bearer that is able to be transmitted by the apparatus 2600 to the terminal device in the first state. The type information of the radio bearer is used to indicate an allocation manner that is between the first device and the apparatus 2600 and that is of a protocol stack corresponding to the radio bearer. The TA information is used to indicate time information of timing advance of uplink synchronization between the terminal device in the first state and the apparatus 2600.

In an embodiment, the second message includes at least one of the identification information of the terminal device in the first state, the type information of the radio bearer, and identification information of at least one radio bearer that the first device requests the apparatus 2600 to transmit. The type information of the radio bearer is used to indicate the allocation manner that is between the first device and the apparatus 2600 and that is of the protocol stack corresponding to the radio bearer.

In an embodiment, the acknowledgment message for the second message includes the identification information of the first radio bearer that is able to be transmitted by the apparatus 2600 to the terminal device in the first state, and the identification information of the at least one radio bearer includes the identification information of the first radio bearer.

In an embodiment, the sending module 2601 is specifically configured to send a first measurement report to the first device, where the first measurement report is used to indicate first channel quality information between the terminal device in the first state and the apparatus 2600. The receiving module 2602 is specifically configured to receive the second message sent by the first device based on the first channel quality information.

In an embodiment, the sending module 2601 is further specifically configured to send a cell update message of the terminal device in the first state to the first device, where the cell update message is used to indicate that the terminal device in the first state moves from a cell covered by the first device to a cell covered by the apparatus 2600. The receiving module 2602 is specifically configured to receive the second message sent by the first device based on the cell update message.

In an embodiment, the sending module 2601 is further specifically configured to send a first state switching request message of the terminal device in the first state to the first device, where the first state switching request message is used to request the apparatus 2600 that the terminal device in the first state needs to switch from the first state to an active state. The receiving module 2602 is further specifically configured to receive the second message sent by the first device based on the first state switching request message.

In an embodiment, the first message includes at least one of the identification information of the terminal device in the first state, identification information of a current cell in which the terminal device in the first state is located, a channel quality parameter between the apparatus 2600 and the terminal device in the first state, and resource indication information of the apparatus 2600. The current cell in which the terminal device in the first state is located is the cell covered by the apparatus 2600.

It should be understood that the apparatus 2600 herein is represented in a form of a functional module. The term "module" herein may be an ASIC, an electronic circuit, a processor (for example, a shared processor, a dedicated processor, or a group processor) configured to execute one or more software or firmware programs and a memory, a combination logic circuit, and/or another proper component supporting the described functions. In an optional example, a person skilled in the art may understand that the apparatus 2600 may be specifically the second device in the foregoing embodiments, and the apparatus 2600 may be configured to perform procedures and/or operations corresponding to the second device in the embodiment of the method 400. To avoid repetition, details are not described herein again.

Figure 28:
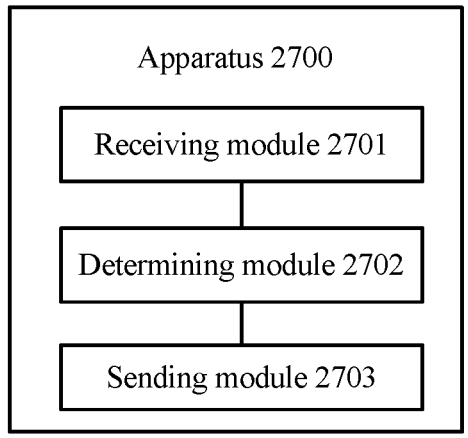
FIG. 28 is a schematic diagram of still another communications apparatus according to an embodiment of this application.

FIG. 28 is a schematic diagram of a communications apparatus 2700 according to an embodiment of this application. The apparatus 2700 includes:

a receiving module 2701, configured to receive a first message, where the first message is used to determine that a third device is a secondary access network device of a terminal device in the first state, the terminal device in the first state does not send channel state information to the first device, and a core network device and the first device reserve a data plane connection of the terminal device in the first state;

a determining module 2702, configured to determine, based on the first message, that the third device is the secondary access network device of the terminal device in the first state; and a sending module 2703, configured to send a second message to the first device, where the second message is used to request to add the third device as the secondary access network device of the terminal device in the first state, and the first device is a primary access network device of the terminal device in the first state.

The receiving module 2701 is further configured to receive an acknowledgment message that is for the second message and that is sent by the first device based on the second message.

It should be understood that the apparatus 2700 herein is represented in a form of a functional module. The term "module" herein may be an ASIC, an electronic circuit, a processor (for example, a shared processor, a dedicated processor, or a group processor) configured to execute one or more software or firmware programs and a memory, a combination logic circuit, and/or another proper component supporting the described functions. In an optional example, a person skilled in the art may understand that the apparatus 2700 may be specifically the second device in the foregoing embodiments, and the apparatus 2700 may be configured to perform procedures and/or operations corresponding to the second device in the embodiment of the method 500. To avoid repetition, details are not described herein again.

Figure 29:
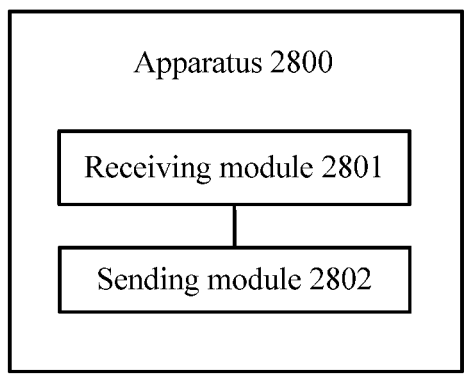
FIG. 29 is a schematic diagram of still another communications apparatus according to an embodiment of this application.

FIG. 29 is a schematic diagram of a communications apparatus 2800 according to an embodiment of this application. The apparatus 2800 includes:

a receiving module 2801, configured to receive a second message sent by a second device, where the second message is used to request to add a third device as a secondary access network device of a terminal device in the first state, and the first device is a primary access network device of the terminal device in the first state; and a sending module 2802, configured to send an acknowledgment message for the second message to the second device, where the terminal device in the first state does not send channel state information to the apparatus 2800, and a core network device and the apparatus 2800 reserve a data plane connection of the terminal device in the first state.

It should be understood that the apparatus 2800 herein is represented in a form of a functional module. The term "module" herein may be an ASIC, an electronic circuit, a processor (for example, a shared processor, a dedicated processor, or a group processor) configured to execute one or more software or firmware programs and a memory, a combination logic circuit, and/or another proper component supporting the described functions. In an optional example, a person skilled in the art may understand that the apparatus 2800 may be specifically the first device in the foregoing embodiments, and the apparatus 2800 may be configured to perform procedures and/or operations corresponding to the first device in the embodiment of the method 500. To avoid repetition, details are not described herein again.

Figure 30:
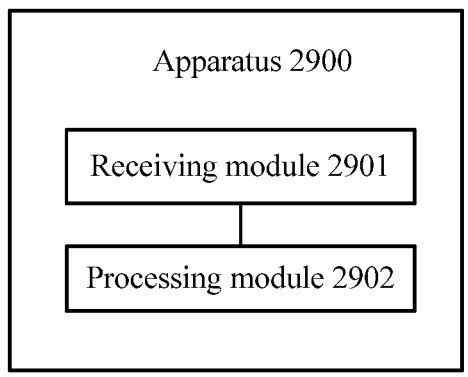
FIG. 30 is a schematic diagram of still another communications apparatus according to an embodiment of this application.

FIG. 30 is a schematic diagram of a communications apparatus 2900 according to an embodiment of this application. The apparatus 2900 includes:

a receiving module 2901, configured to receive first-state configuration information sent by a network device, where the first-state configuration information is used to indicate that the network device and a core network device reserve a data plane connection, and the first-state configuration information includes at least one of measurement manner indication information and identification information of a first state allocated by the network device to the apparatus 2900; and a processing module 2902, configured to enter the first state according to the first-state configuration information, where the apparatus 2900 in the first state does not send channel state information to the first device, and the core network device and the first device reserve a data plane connection of the terminal device in the first state.

It should be understood that the apparatus 2900 herein is represented in a form of a functional module. The term "module" herein may be an ASIC, an electronic circuit, a processor (for example, a shared processor, a dedicated processor, or a group processor) configured to execute one or more software or firmware programs and a memory, a combination logic circuit, and/or another proper component supporting the described functions. In an optional example, a person skilled in the art may understand that the apparatus 2900 may be specifically the terminal device in the foregoing embodiments, and the apparatus 2900 may be configured to perform procedures and/or operations corresponding to the terminal device in the embodiment of the method 600. To avoid repetition, details are not described herein again.

Figure 31:
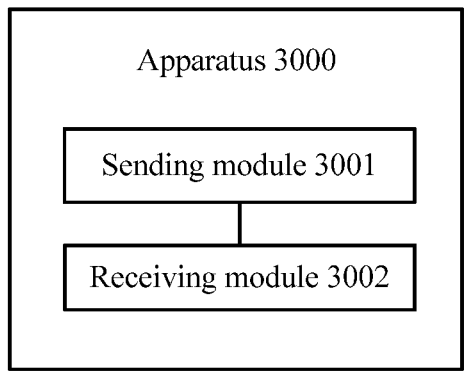
FIG. 31 is a schematic diagram of still another communications apparatus according to an embodiment of this application.

FIG. 31 is a schematic diagram of a communications apparatus 3000 according to an embodiment of this application. The apparatus 3000 includes:

a sending module 3001, configured to send a fourth message to a second device, where the fourth information is used by the second device to send a first message, the first message is used to determine that the second device is a secondary access network device of the apparatus 3000, and the first device is a primary access network device of the apparatus 3000; and a receiving module 3002, configured to: when the second device is a secondary access network device of a terminal device in the first state, receive a third message for the terminal device in the first state, where the third message is used to notify the terminal device in the first state that the second device is the secondary access network device of the terminal device in the first state.

The sending module 3001 is further configured to send an acknowledgment message for the third message based on the third message, where the apparatus 3000 does not send channel state information to the first device, and a core network device and the first device reserve a data plane connection of the terminal device in the first state.

It should be understood that the apparatus 3000 herein is represented in a form of a functional module. The term "module" herein may be an ASIC, an electronic circuit, a processor (for example, a shared processor, a dedicated processor, or a group processor) configured to execute one or more software or firmware programs and a memory, a combination logic circuit, and/or another proper component supporting the described functions. In an optional example, a person skilled in the art may understand that the apparatus 3000 may be specifically the terminal device in the first state in the foregoing embodiments, and the apparatus 3000 may be configured to perform procedures and/or operations corresponding to the terminal device in the first state in the embodiments of the method 400 and the method 500. To avoid repetition, details are not described herein again.

Figure 32:
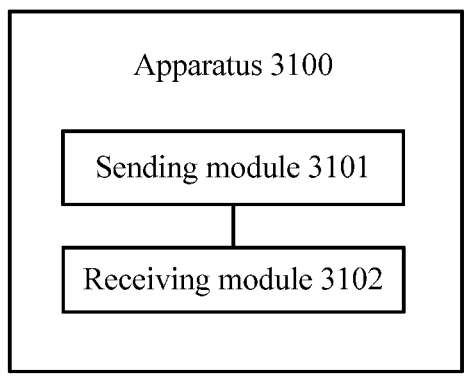
FIG. 32 is a schematic diagram of still another communications apparatus according to an embodiment of this application.

FIG. 32 is a schematic diagram of a communications apparatus 3100 according to an embodiment of this application. The apparatus 3100 includes:

a sending module 3101, configured to send a first message to a first device, where the first message is used by the first device to determine that the second device is a secondary access network device of a terminal device in a first state, the first device is a primary access network device of the terminal device in the first state, the terminal device in the first state does not send channel state information to the first device, and a core network device and the first device reserve a data plane connection of the terminal device in the first state; and a receiving module 3102, configured to receive a third message sent by the first device based on the first message, and send the third message to the terminal device in the first state, where the third message is used to notify the terminal device in the first state that the second device is the secondary access network device of the terminal device in the first state.

The receiving module 3102 is further configured to receive an acknowledgment message that is for the third message and that is sent by the terminal device in the first state, and send the acknowledgment message for the third message to the first device.

It should be understood that the apparatus 3100 herein is represented in a form of a functional module. The term "module" herein may be an ASIC, an electronic circuit, a processor (for example, a shared processor, a dedicated processor, or a group processor) configured to execute one or more software or firmware programs and a memory, a combination logic circuit, and/or another proper component supporting the described functions. In an optional example, a person skilled in the art may understand that the apparatus 3100 may be specifically the fourth device in the foregoing embodiments, and the apparatus 3100 may be configured to perform procedures and/or operations corresponding to the fourth device in the embodiments of the method 400 and the method 500. To avoid repetition, details are not described herein again.

Figure 33:
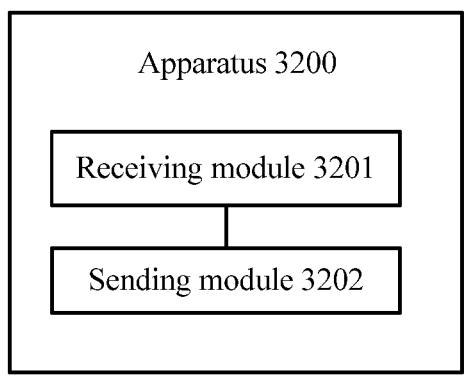
FIG. 33 is a schematic diagram of still another communications apparatus according to an embodiment of this application.

FIG. 33 is a schematic diagram of a communications apparatus 3200 according to an embodiment of this application. The apparatus 3200 includes:

a receiving module 3201, configured to receive a first message sent by a second device, where the first message is used by the first device to determine that the second device is a secondary access network device of a terminal device in a first state, the first device is a primary access network device of the terminal device in the first state, the terminal device in the first state does not send channel state information to the first device, and a core network device and the first device reserve a data plane connection of the terminal device in the first state; and a sending module 3202, configured to send the first message to the first device.

The receiving module 3201 is further configured to receive a second message sent by the first device based on the first message, where the second message is used to request to add the second device as the secondary access network device of the terminal device in the first state.

The sending module 3202 is further configured to send the second message to the second device.

In one embodiment, the receiving module 3201 is further configured to receive an acknowledgment message that is for the second message and that is sent by the second device, and the sending module 3202 is further configured to send the acknowledgment message for the second message to the first device.

It should be understood that the apparatus 3200 herein is represented in a form of a functional module. The term "module" herein may be an ASIC, an electronic circuit, a processor (for example, a shared processor, a dedicated processor, or a group processor) configured to execute one or more software or firmware programs and a memory, a combination logic circuit, and/or another proper component supporting the described functions. In an optional example, a person skilled in the art may understand that the apparatus 3200 may be specifically the sixth device in the foregoing embodiments, and the apparatus 3200 may be configured to perform procedures and/or operations corresponding to the sixth device in the embodiment of the method 400. To avoid repetition, details are not described herein again.

Figure 34:
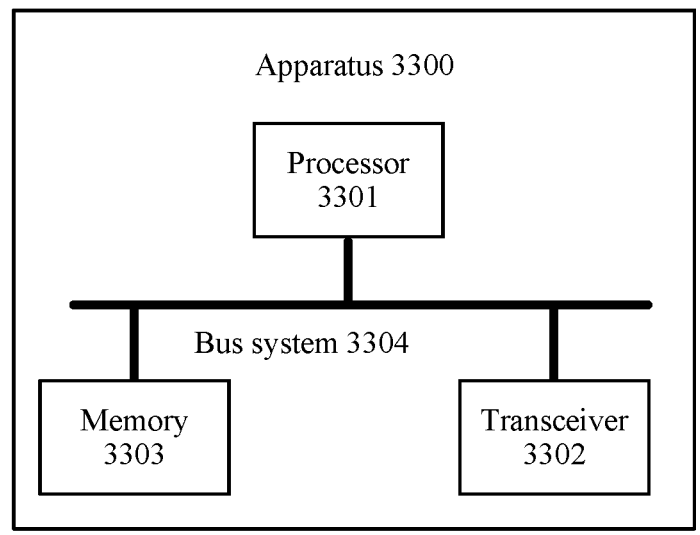
FIG. 34 is a schematic diagram of still another communications apparatus according to an embodiment of this application.

FIG. 34 shows a communications apparatus 3300 according to an embodiment of this application. The apparatus 3300 includes a processor 3301, a transceiver 3302, a memory 3303, and a bus system 3304. The processor 3301, the transceiver 3302, and the memory 3303 are connected by using the bus system 3304. The memory 3303 is configured to store an instruction, and the processor 3301 is configured to execute the instruction stored in the memory 3303, so as to control the transceiver 3302 to send a signal and/or receive a signal.

The transceiver 3302 is configured to receive a first message, the apparatus 3300 is a primary access network device of a terminal device in a first state, the terminal device in the first state does not send channel state information to the apparatus 3300, and a core network device and the apparatus 3300 reserve a data plane connection of the terminal device in the first state. The processor 3301 is configured to determine, based on the first message, that a second device is a secondary access network device of the terminal device in the first state. The transceiver 3302 is further configured to send a second message to the second device, where the second message is used to request to add the second device as the secondary access network device of the terminal device in the first state; and receive an acknowledgment message that is for the second message and that is sent by the second device based on the second message.

In an optional embodiment, the transceiver 3302 is further configured to: after receiving the acknowledgment message that is for the second message and that is sent by the second device based on the second message, send a third message to the terminal device in the first state, where the third message is used to notify the terminal device in the first state that the second device is the secondary access network device of the terminal device in the first state.

In an optional embodiment, the third message includes at least one of first indication information, identification information of the terminal device in the first state, identification information of a first radio bearer, type information of the radio bearer, and timing advance TA information. The first indication information is used to indicate that the apparatus 3300 and the core network device reserve a data plane connection and/or the apparatus 3300 reserves a radio bearer of the terminal device in the first state. The identification information of the first radio bearer is used to identify a radio bearer that is able to be transmitted by the second device to the terminal device in the first state. The type information of the radio bearer is used to indicate an allocation manner that is between the apparatus 3300 and the second device and that is of a protocol stack corresponding to the radio bearer. The TA information is used to indicate time information of timing advance of uplink synchronization between the terminal device in the first state and the second device.

In an optional embodiment, the second message includes at least one of the identification information of the terminal device in the first state, the type information of the radio bearer, and identification information of at least one radio bearer that the apparatus 3300 requests the second device to transmit, and the type information of the radio bearer is used to indicate the allocation manner that is between the apparatus 3300 and the second device and that is of the protocol stack corresponding to the radio bearer that is of the terminal device in the first state and that is reserved by the network device; and/or, the acknowledgment message for the second message includes the identification information of the first radio bearer that is able to be transmitted by the second device to the terminal device in the first state, and the identification information of the at least one radio bearer includes the identification information of the first radio bearer.

In an optional embodiment, the transceiver 3302 is specifically configured to receive a first measurement report, where the first measurement report is used to indicate first channel quality information between the terminal device in the first state and the second device. The processor 3301 is specifically configured to determine, based on the first channel quality information, that the second device is the secondary access network device of the terminal device in the first state.

In an embodiment, the transceiver 3302 is further specifically configured to receive a cell update message of the terminal device in the first state, where the cell update message is used to indicate that the terminal device in the first state moves from a cell covered by the apparatus 3300 to a cell covered by the second device. The processor 3301 is further specifically configured to determine, based on the cell update message, that the second device is the secondary access network device of the terminal device in the first state.

In an embodiment, the transceiver 3302 is further specifically configured to receive a first state switching request message of the terminal device in the first state, where the first state switching request message is used to request the second device that the terminal device in the first state needs to switch from the first state to an active state. The processor 3301 is further specifically configured to determine, based on the first state switching request message, that the second device is the secondary access network device of the terminal device in the first state.

In an embodiment, the first message includes at least one of the identification information of the terminal device in the first state, identification information of a current cell in which the terminal device in the first state is located, a channel quality parameter between the second device and the terminal device in the first state, and resource indication information of the second device. The current cell in which the terminal device in the first state is located is the cell covered by the second device.

In an embodiment, the apparatus 3300 is an anchor network device AnNR, and the second device is an assistant network device AsNR. The receiving module is specifically configured to receive the first message sent by the AsNR.

In an embodiment, the apparatus 3300 is an anchor central unit AnCU, and the second device is an assistant distribute unit AsDU. The AnCU is configured to control an AnDU, and an assistant central unit AsCU is configured to control the AsDU. The transceiver 3302 is further specifically configured to receive the first message sent by the AsDU by using the AsCU; send the second message to the AsDU by using the AsCU; and receive the acknowledgment message that is for the second message and that is sent by the AsDU by using the AsCU.

It should be understood that the apparatus 3300 may be specifically the first device in the method 400, and may be configured to perform the operations and/or the procedures corresponding to the first device in the method 400. Optionally, the memory 3303 may include a read-only memory and a random access memory, and provide an instruction and data to the processor. A part of the memory may further include a non-volatile random access memory. For example, the memory may further store information about a device type. The processor 3301 may be configured to execute the instruction stored in the memory. In addition, when the processor 3301 executes the instruction stored in the memory 3303, the processor 3301 is configured to perform the operations and/or the procedures corresponding to the first device in the embodiment in the method 400.

Figure 35:
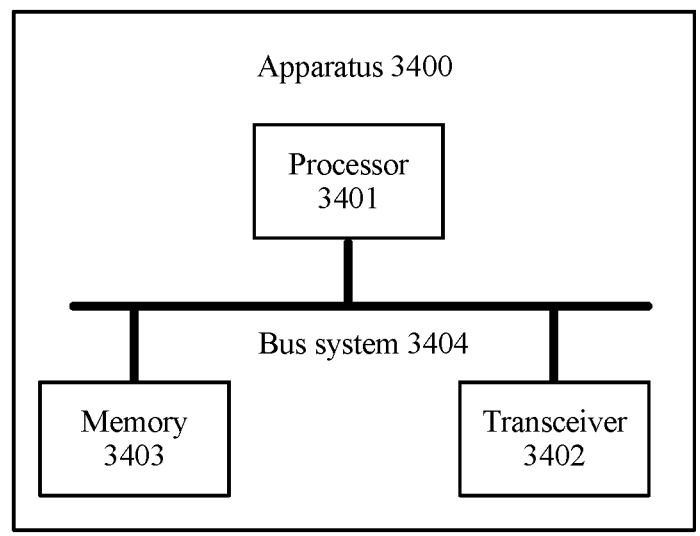
FIG. 35 is a schematic diagram of still another communications apparatus according to an embodiment of this application.

FIG. 35 shows a communications apparatus 3400 according to an embodiment of this application. The apparatus 3400 includes a processor 3401, a transceiver 3402, a memory 3403, and a bus system 3404. The processor 3401, the transceiver 3402, and the memory 3403 are connected by using the bus system 3404. The memory 3403 is configured to store an instruction, and the processor 3401 is configured to execute the instruction stored in the memory 3403, so as to control the transceiver 3402 to send a signal and/or receive a signal.

The processor 3401 is configured to determine to perform first-state configuration on a terminal device. The transceiver 3402 is configured to send first-state configuration information to the terminal device, so that the terminal device enters a first state according to the first-state configuration information, where the first-state configuration information is used to indicate that the network device and a core network device reserve a data plane connection, and the first-state configuration information includes at least one of measurement manner indication information, identification information of the first state allocated by the apparatus 3400 to the terminal device, identification information of a radio bearer reserved by the apparatus 3400, and a radio resource allocated by the apparatus 3400 to the terminal device.

In an embodiment, the transceiver 3402 is further configured to receive capability information of the terminal device that is sent by the terminal device or the core network device, where the capability information includes at least one of: whether the terminal device supports the first state, identification information of the terminal device, whether the terminal device supports uplink measurement, and whether the terminal device supports downlink measurement. The processor 3401 is specifically configured to determine, based on the capability information, to perform first-state configuration on the terminal device.

In an embodiment, the transceiver 3402 is further configured to send a first-state preset condition to the terminal device, and receive a second state request message sent by the terminal device based on the first-state preset condition, where the second state switching request message is used to request that the terminal device needs to switch from a current state to the first state. The processor 3401 is further specifically configured to determine, based on the second state request message, to perform first-state configuration on the terminal device.

It should be understood that the apparatus 3400 may be specifically the network device in the method 600, and may be configured to perform the operations and/or the procedures corresponding to the network device in the method 600. Optionally, the memory 3403 may include a read-only memory and a random access memory, and provide an instruction and data to the processor. A part of the memory may further include a non-volatile random access memory. For example, the memory may further store information about a device type. The processor 3401 may be configured to execute the instruction stored in the memory. In addition, when the processor 3401 executes the instruction stored in the memory 3403, the processor 3401 is configured to perform the operations and/or the procedures corresponding to the network device in the method 600.

Figure 36:
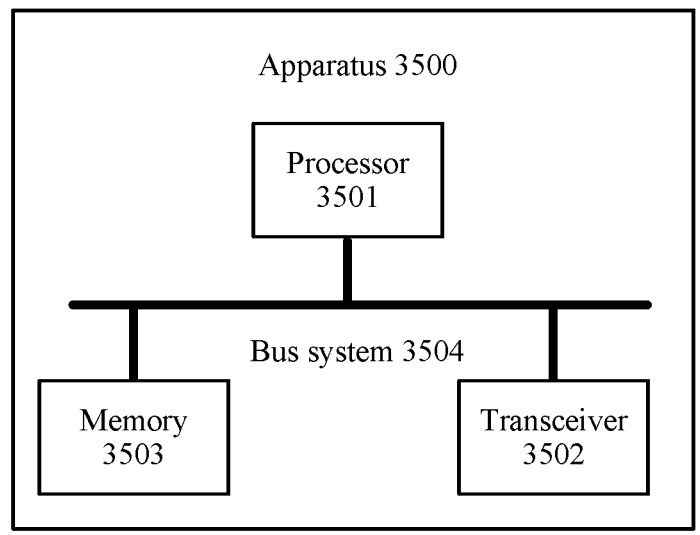
FIG. 36 is a schematic diagram of still another communications apparatus according to an embodiment of this application.

FIG. 36 shows a communications apparatus 3500 according to an embodiment of this application. The apparatus 3500 includes a processor 3501, a transceiver 3502, a memory 3503, and a bus system 3504. The processor 3501, the transceiver 3502, and the memory 3503 are connected by using the bus system 3504. The memory 3503 is configured to store an instruction, and the processor 3501 is configured to execute the instruction stored in the memory 3503, so as to control the transceiver 3502 to send a signal and/or receive a signal.

The transceiver 3502 is configured to send a first message to a first device, where the first message is used by the first device to determine that the apparatus 3500 is a secondary access network device of a terminal device in a first state, the first device is a primary access network device of the terminal device in the first state, the terminal device in the first state does not send channel state information to the first device, and a core network device and the first device reserve a data plane connection of the terminal device in the first state; receive a second message sent by the first device based on the first message, where the second message is used to request to add the apparatus 3500 as the secondary access network device of the terminal device in the first state; and send an acknowledgment message for the second message to the first device based on the second message.

In an embodiment, the transceiver 3502 is further configured to: after sending the acknowledgment message for the second message to the first device based on the second message, send a third message to the terminal device in the first state, where the third message is used to notify the terminal device in the first state that the apparatus 3500 is the secondary access network device of the terminal device in the first state.

In an embodiment, the third message includes at least one of first indication information, identification information of the terminal device in the first state, identification information of a first radio bearer, type information of the radio bearer, and timing advance TA information. The first indication information is used to indicate that the first device and the core network device reserve a data plane connection and/or the first device reserves a radio bearer of the terminal device in the first state. The identification information of the first radio bearer is used to identify a radio bearer that is able to be transmitted by the apparatus 3500 to the terminal device in the first state. The type information of the radio bearer is used to indicate an allocation manner that is between the first device and the apparatus 3500 and that is of a protocol stack corresponding to the radio bearer. The TA information is used to indicate time information of timing advance of uplink synchronization between the terminal device in the first state and the apparatus 3500.

In an embodiment, the second message includes at least one of the identification information of the terminal device in the first state, the type information of the radio bearer, and identification information of at least one radio bearer that the first device requests the apparatus 3500 to transmit. The type information of the radio bearer is used to indicate the allocation manner that is between the first device and the apparatus 3500 and that is of the protocol stack corresponding to the radio bearer.

In an optional embodiment, the acknowledgment message for the second message includes the identification information of the first radio bearer that is able to be transmitted by the apparatus 3500 to the terminal device in the first state, and the identification information of the at least one radio bearer includes the identification information of the first radio bearer.

In an embodiment, the transceiver 3502 is specifically configured to send a first measurement report to the first device, where the first measurement report is used to indicate first channel quality information between the terminal device in the first state and the apparatus 3500; and receive the second message sent by the first device based on the first channel quality information.

In an embodiment, the transceiver 3502 is further specifically configured to send a cell update message of the terminal device in the first state to the first device, where the cell update message is used to indicate that the terminal device in the first state moves from a cell covered by the first device to a cell covered by the apparatus 3500; and receive the second message sent by the first device based on the cell update message.

In an embodiment, the transceiver 3502 is further specifically configured to send a first state switching request message of the terminal device in the first state to the first device, where the first state switching request message is used to request the apparatus 3500 that the terminal device in the first state needs to switch from the first state to an active state; and receive the second message sent by the first device based on the first state switching request message.

In an embodiment, the first message includes at least one of the identification information of the terminal device in the first state, identification information of a current cell in which the terminal device in the first state is located, a channel quality parameter between the apparatus 3500 and the terminal device in the first state, and resource indication information of the apparatus 3500. The current cell in which the terminal device in the first state is located is the cell covered by the apparatus 3500.

It should be understood that the apparatus 3500 may be specifically the second device in the method 400, and may be configured to perform the operations and/or the procedures corresponding to the second device in the method 400. Optionally, the memory 3503 may include a read-only memory and a random access memory, and provide an instruction and data to the processor. A part of the memory may further include a non-volatile random access memory. For example, the memory may further store information about a device type. The processor 3501 may be configured to execute the instruction stored in the memory. In addition, when the processor 3501 executes the instruction stored in the memory 3503, the processor 3501 is configured to perform the operations and/or the procedures corresponding to the second device in the method 400.

Figure 37:
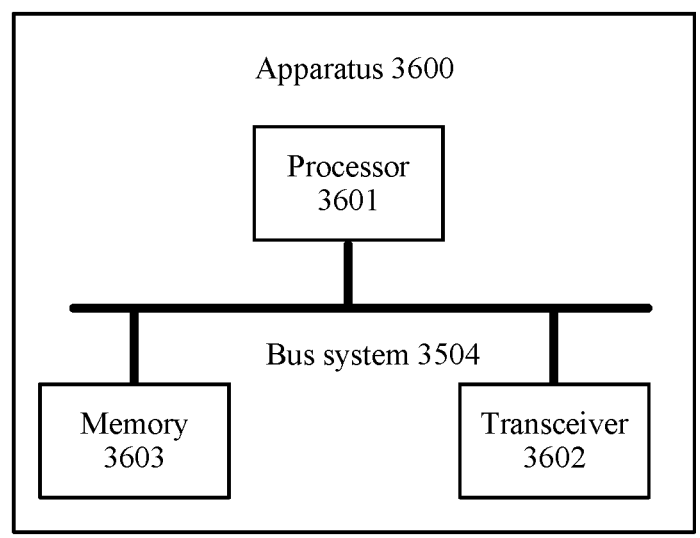
FIG. 37 is a schematic diagram of still another communications apparatus according to an embodiment of this application.

FIG. 37 shows a communications apparatus 3600 according to an embodiment of this application. The apparatus 3600 includes a processor 3601, a transceiver 3602, a memory 3603, and a bus system 3604. The processor 3601, the transceiver 3602, and the memory 3603 are connected by using the bus system 3604. The memory 3603 is configured to store an instruction, and the processor 3601 is configured to execute the instruction stored in the memory 3603, so as to control the transceiver 3602 to send a signal and/or receive a signal.

The transceiver 3602 is configured to receive a first message, where the first message is used to determine that a third device is a secondary access network device of a terminal device in the first state, the terminal device in the first state does not send channel state information to the first device, and a core network device and the first device reserve a data plane connection of the terminal device in the first state. The processor 3601 is configured to determine, based on the first message, that the third device is the secondary access network device of the terminal device in the first state. The transceiver 3602 is further configured to send a second message to the first device, where the second message is used to request to add the third device as the secondary access network device of the terminal device in the first state, and the first device is a primary access network device of the terminal device in the first state. The transceiver 3602 is further configured to receive an acknowledgment message that is for the second message and that is sent by the first device based on the second message.

It should be understood that the apparatus 3600 may be specifically the second device in the method 500, and may be configured to perform the operations and/or the procedures corresponding to the second device in the method 500. Optionally, the memory 3603 may include a read-only memory and a random access memory, and provide an instruction and data to the processor. A part of the memory may further include a non-volatile random access memory. For example, the memory may further store information about a device type. The processor 3601 may be configured to execute the instruction stored in the memory. In addition, when the processor 3601 executes the instruction stored in the memory 3603, the processor 3601 is configured to perform the operations and/or the procedures corresponding to the second device in the method 500.

Figure 38:
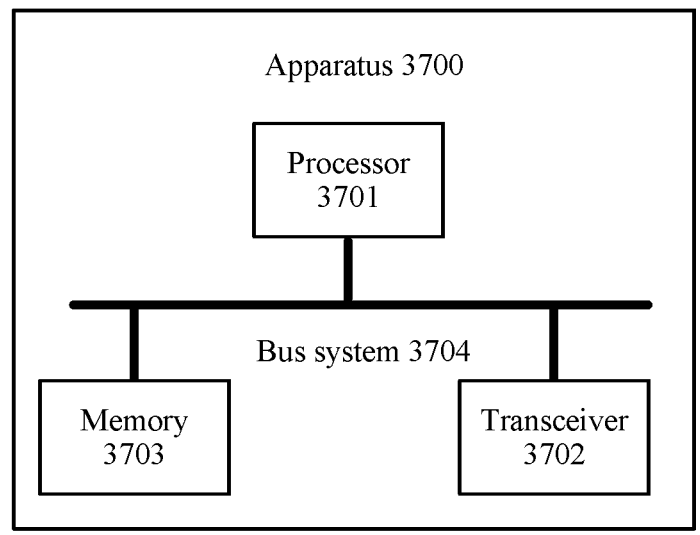
FIG. 38 is a schematic diagram of still another communications apparatus according to an embodiment of this application.

FIG. 38 shows a communications apparatus 3700 according to an embodiment of this application. The apparatus 3700 includes a processor 3701, a transceiver 3702, a memory 3703, and a bus system 3704. The processor 3701, the transceiver 3702, and the memory 3703 are connected by using the bus system 3704. The memory 3703 is configured to store an instruction, and the processor 3701 is configured to execute the instruction stored in the memory 3703, so as to control the transceiver 3702 to send a signal and/or receive a signal.

The transceiver 3702 is configured to receive a second message sent by a second device, where the second message is used to request to add a third device as a secondary access network device of a terminal device in the first state, and the first device is a primary access network device of the terminal device in the first state; and send an acknowledgment message for the second message to the second device, where the terminal device in the first state does not send channel state information to the apparatus 3700, and a core network device and the apparatus 3700 reserve a data plane connection of the terminal device in the first state.

It should be understood that the apparatus 3700 may be specifically the first device in the method 500, and may be configured to perform the operations and/or the procedures corresponding to the first device in the method 500. Optionally, the memory 3703 may include a read-only memory and a random access memory, and provide an instruction and data to the processor. A part of the memory may further include a non-volatile random access memory. For example, the memory may further store information about a device type. The processor 3701 may be configured to execute the instruction stored in the memory. In addition, when the processor 3701 executes the instruction stored in the memory 3703, the processor 3701 is configured to perform the operations and/or the procedures corresponding to the first device in the method 500.

Figure 39:
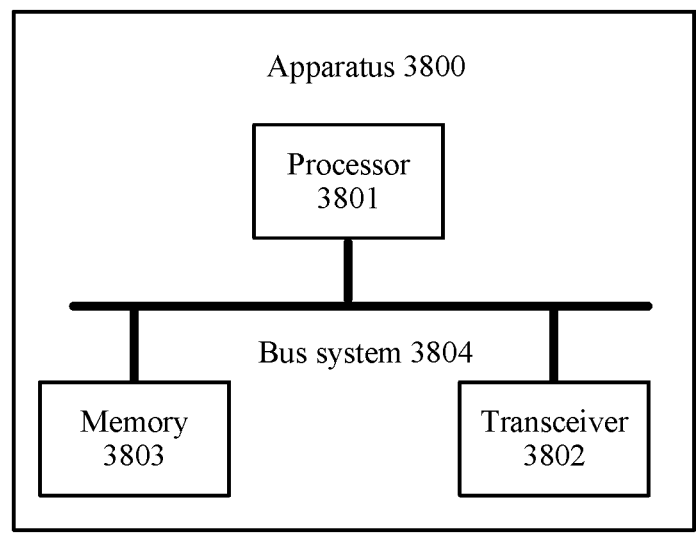
FIG. 39 is a schematic diagram of still another communications apparatus according to an embodiment of this application.

FIG. 39 shows a communications apparatus 3800 according to an embodiment of this application. The apparatus 3800 includes a processor 3801, a transceiver 3802, a memory 3803, and a bus system 3804. The processor 3801, the transceiver 3802, and the memory 3803 are connected by using the bus system 3804. The memory 3803 is configured to store an instruction, and the processor 3801 is configured to execute the instruction stored in the memory 3803, so as to control the transceiver 3802 to send a signal and/or receive a signal.

The transceiver 3802 is configured to receive first-state configuration information sent by a network device, where the first-state configuration information is used to indicate that the network device and a core network device reserve a data plane connection, and the first-state configuration information includes at least one of measurement manner indication information and identification information of a first state allocated by the network device to the apparatus 3800. The processor 3801 is configured to enter the first state according to the first-state configuration information, where the apparatus 3800 in the first state does not send channel state information to the first device, and the core network device and the first device reserve a data plane connection of the terminal device in the first state.

It should be understood that the apparatus 3800 may be specifically the terminal device in the method 600, and may be configured to perform the operations and/or the procedures corresponding to the terminal device in the method 600. Optionally, the memory 3803 may include a read-only memory and a random access memory, and provide an instruction and data to the processor. A part of the memory may further include a non-volatile random access memory. For example, the memory may further store information about a device type. The processor 3801 may be configured to execute the instruction stored in the memory. In addition, when the processor 3801 executes the instruction stored in the memory 3803, the processor 3801 is configured to perform the operations and/or the procedures corresponding to the terminal device in the method 600.

Figure 40:
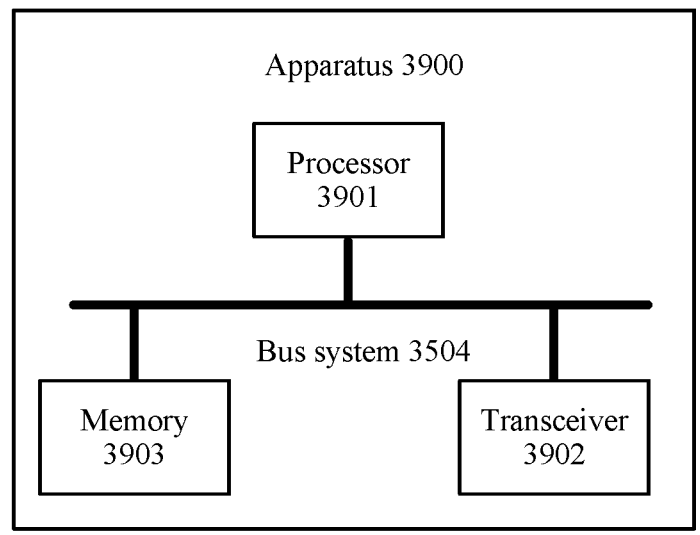
FIG. 40 is a schematic diagram of still another communications apparatus according to an embodiment of this application.

FIG. 40 shows a communications apparatus 3900 according to an embodiment of this application. The apparatus

3900 includes a processor 3901, a transceiver 3902, a memory 3903, and a bus system 3904. The processor 3901, the transceiver 3902, and the memory 3903 are connected by using the bus system 3904. The memory 3903 is configured to store an instruction, and the processor 3901 is configured to execute the instruction stored in the memory 3903, so as to control the transceiver 3902 to send a signal and/or receive a signal.

The transceiver 3902 is configured to send a fourth message to a second device, where the fourth information is used by the second device to send a first message, the first message is used to determine that the second device is a secondary access network device of the apparatus 3900, and the first device is a primary access network device of the apparatus 3900; when the second device is a secondary access network device of a terminal device in the first state, receive a third message for the terminal device in the first state, where the third message is used to notify the terminal device in the first state that the second device is the secondary access network device of the terminal device in the first state; and send an acknowledgment message for the third message based on the third message, where the apparatus 3900 does not send channel state information to the first device, and a core network device and the first device reserve a data plane connection of the terminal device in the first state.

It should be understood that the apparatus 3900 may be specifically the terminal device in the first state in the method 400 and the method 500, and may be configured to perform the operations and/or the procedures corresponding to the terminal device in the first state in the method 400 and the method 500. Optionally, the memory 3903 may include a read-only memory and a random access memory, and provide an instruction and data to the processor. A part of the memory may further include a non-volatile random access memory. For example, the memory may further store information about a device type. The processor 3901 may be configured to execute the instruction stored in the memory. In addition, when the processor 3901 executes the instruction stored in the memory 3903, the processor 3901 is configured to perform the operations and/or the procedures corresponding to the terminal device in the first state in the method 400 and the method 500.

Figure 41:
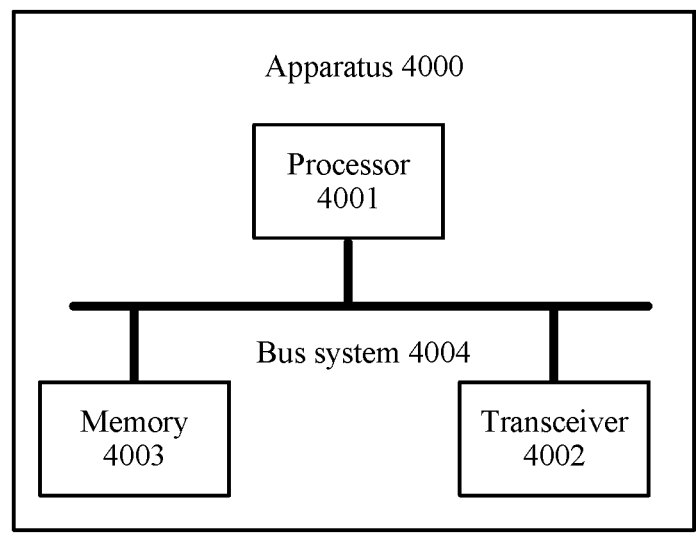
FIG. 41 is a schematic diagram of still another communications apparatus according to an embodiment of this application.

FIG. 41 shows a communications apparatus 4000 according to an embodiment of this application. The apparatus 4000 includes a processor 4001, a transceiver 4002, a memory 4003, and a bus system 4004. The processor 4001, the transceiver 4002, and the memory 4003 are connected by using the bus system 4004. The memory 4003 is configured to store an instruction, and the processor 4001 is configured to execute the instruction stored in the memory 4003, so as to control the transceiver 4002 to send a signal and/or receive a signal.

The transceiver 4002 is configured to send a first message to a first device, where the first message is used by the first device to determine that the second device is a secondary access network device of a terminal device in a first state, the first device is a primary access network device of the terminal device in the first state, the terminal device in the first state does not send channel state information to the first device, and a core network device and the first device reserve a data plane connection of the terminal device in the first state; receive a third message sent by the first device based on the first message, and send the third message to the terminal device in the first state, where the third message is used to notify the terminal device in the first state that the second device is the secondary access network device of the terminal device in the first state; and receive an acknowledgment message that is for the third message and that is sent by the terminal device in the first state, and send the acknowledgment message for the third message to the first device.

It should be understood that the apparatus 4000 may be specifically the fourth device in the method 400 and the method 500, and may be configured to perform the operations and/or the procedures corresponding to the fourth device in the method 400 and the method 500. Optionally, the memory 4003 may include a read-only memory and a random access memory, and provide an instruction and data to the processor. A part of the memory may further include a non-volatile random access memory. For example, the memory may further store information about a device type. The processor 4001 may be configured to execute the instruction stored in the memory. In addition, when the processor 4001 executes the instruction stored in the memory 4003, the processor 4001 is configured to perform the operations and/or the procedures corresponding to the fourth device in the method 600.

Figure 42:
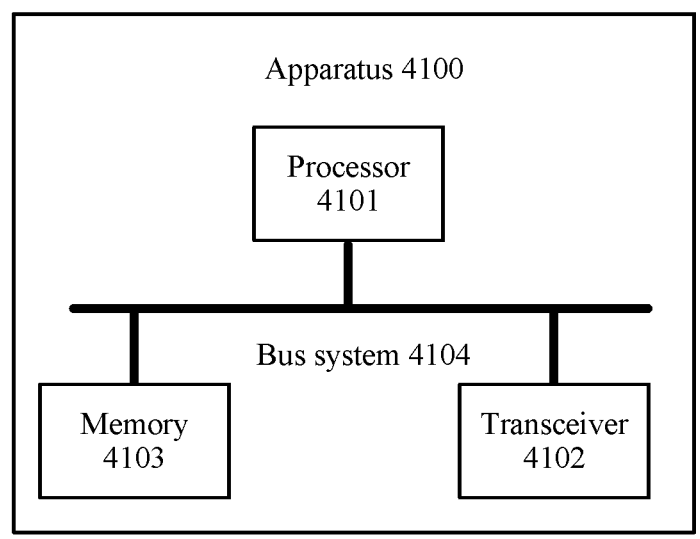
FIG. 42 is a schematic diagram of still another communications apparatus according to an embodiment of this application.

FIG. 42 shows a communications apparatus 4100 according to an embodiment of this application. The apparatus 4100 includes a processor 4101, a transceiver 4102, a memory 4103, and a bus system 4104. The processor 4101, the transceiver 4102, and the memory 4103 are connected by using the bus system 4104. The memory 4103 is configured to store an instruction, and the processor 4101 is configured to execute the instruction stored in the memory 4103, so as to control the transceiver 4102 to send a signal and/or receive a signal.

The transceiver 4102 is configured to send the first message to a first device, and receive a second message sent by the first device based on the first message, where the second message is used to request to add the second device as the secondary access network device of the terminal device in the first state; and send the second message to the second device.

It should be understood that the apparatus 4100 may be specifically the sixth device in the method 400, and may be configured to perform the operations and/or the procedures corresponding to the sixth device in the method 400. Optionally, the memory 4103 may include a read-only memory and a random access memory, and provide an instruction and data to the processor. A part of the memory may further include a non-volatile random access memory. For example, the memory may further store information about a device type. The processor 4101 may be configured to execute the instruction stored in the memory. In addition, when the processor 4101 executes the instruction stored in the memory 4103, the processor 4101 is configured to perform the operations and/or the procedures corresponding to the sixth device in the method 400. It should be understood that in the embodiment of this application, the processor may be a central processing unit (central processing unit, CPU), or the processor may be another general purpose processor, a digital signal processor (DSP), an application-specific integrated circuit (ASIC), a field programmable gate array (FPGA), or another programmable logic device, a discrete gate or transistor logic device, a discrete hardware component, or the like. The general purpose processor may be a microprocessor, or the processor may be any conventional processor or the like.

In an implementation process, operations in the foregoing methods can be implemented by using a hardware integrated logical circuit in the processor, or by using instructions in a form of software. The operations of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, a register, or the like. The storage medium is located in the memory, and a processor executes instructions in the memory and completes the operations in the foregoing methods in combination with hardware of the processor. To avoid repetition, details are not described herein again.

A person of ordinary skill in the art may be aware that, in combination with the examples described in the embodiments disclosed in this specification, method operations and units may be implemented by electronic hardware, computer software, or a combination thereof. To clearly describe the interchangeability between the hardware and the software, the foregoing has generally described operations and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the operations of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    receiving, by a first device, a first message sent by a second device, wherein the first device is a primary access network device of a terminal device in a first state, the terminal device in the first state does not send channel state information to the first device, and a core network device and the first device reserve a data plane connection of the terminal device in the first state, and wherein the first message comprises identification information of the terminal device in the first state;
    determining, by the first device based on the first message, that the second device is a secondary access network device of the terminal device in the first state;
    sending, by the first device, a second message to the second device, wherein the second message is used to request to add the second device as the secondary access network device of the terminal device in the first state; and
    receiving, by the first device, an acknowledgment message for the second message and that is sent by the second device based on the second message, wherein the first device and the core network device reserve at least one data plane connection and wherein the at least one data plane connection is shared with the second device for transmitting data of the terminal device by the second device.

2. The method according to claim 1, wherein after the receiving, by the first device, an acknowledgment message for the second message and that is sent by the second device based on the second message, the method further comprises:
    sending, by the first device, a third message to the terminal device in the first state, wherein the third message is used to notify the terminal device in the first state that the second device is the secondary access network device of the terminal device in the first state.

3. The method according to claim 2, wherein the third message comprises:
    at least one of first indication information, identification information of the terminal device in the first state, identification information of a first radio bearer, type information of a radio bearer, and timing advance TA information, wherein the first indication information is used to indicate that the first device and the core network device reserve a data plane connection and/or the first device reserves a radio bearer of the terminal device in the first state, the identification information of the first radio bearer is used to identify a radio bearer that is able to be transmitted by the second device to the terminal device in the first state, the type information of the radio bearer is used to indicate an allocation manner between the first device and the second device and a protocol stack corresponding to the radio bearer, and the TA information is used to indicate time information of timing advance of uplink synchronization between the terminal device in the first state and the second device.

4. The method according to claim 1, wherein the second message comprises:
at least one of the identification information of the terminal device in the first state, the type information of the radio bearer, and identification information of at least one radio bearer that the first device requests the second device to transmit, wherein the type information of the radio bearer is used to indicate the allocation manner between the first device and the second device and the protocol stack corresponding to the radio bearer; and/or
the acknowledgment message for the second message comprises the identification information of the first radio bearer that is able to be transmitted by the second device to the terminal device in the first state, and the identification information of the at least one radio bearer comprises the identification information of the first radio bearer.

5. The method according to claim 1, wherein the receiving, by the first device, the first message comprises:
receiving, by the first device, a first measurement report, wherein the first measurement report is used to indicate first channel quality information between the terminal device in the first state and the second device; and
the determining, by the first device based on the first message, that a second device is a secondary access network device of the terminal device in the first state comprises:
determining, by the first device based on the first channel quality information, that the second device is the secondary access network device of the terminal device in the first state.

6. The method according to claim 1, wherein the receiving, by the first device, the first message comprises:
receiving, by the first device, a cell update message of the terminal device in the first state, wherein the cell update message is used to indicate that the terminal device in the first state moves from a cell covered by the first device to a cell covered by the second device; and
the determining, by the first device based on the first message, that a second device is a secondary access network device of the terminal device in the first state comprises:
determining, by the first device based on the cell update message, that the second device is the secondary access network device of the terminal device in the first state.

7. The method according to claim 1, wherein the receiving, by the first device, the first message comprises:
receiving, by the first device, a first state switching request message of the terminal device in the first state, wherein the first state switching request message is used to request the second device that the terminal device in the first state needs to switch from the first state to an active state; and the determining, by the first device based on the first message, that a second device is a secondary access network device of the terminal device in the first state comprises:
determining, by the first device based on the first state switching request message, that the second device is the secondary access network device of the terminal device in the first state.

8. The method according to claim 1, wherein the first message comprises:
at least one of the identification information of the terminal device in the first state, identification information of a current cell in which the terminal device in the first state is located, a channel quality parameter between the second device and the terminal device in the first state, and resource indication information of the second device, wherein the current cell in which the terminal device in the first state is located is the cell covered by the second device.

9. The method according to claim 1, wherein the first device is an anchor network device (AnNR), and the second device is an assistant network device (AsNR); and
the receiving, by the first device, the first message comprises:
receiving, by the AnNR, the first message sent by the AsNR.

10. The method according to claim 1, wherein the first device is an anchor central unit (AnCU), the second device is an assistant distribute unit (AsDU), the (AnCU) is configured to control an AnDU, and an assistant central unit AsCU is configured to control the AsDU;
the receiving, by the first device, the first message comprises:
receiving, by the AnCU, the first message sent by the AsDU by using the AsCU;
the sending, by the first device, a second message to the second device comprises:
sending, by the AnCU, the second message to the AsDU by using the AsCU; and
the receiving, by the first device, an acknowledgment message for the second message and that is sent by the second device comprises:
receiving, by the AnCU, the acknowledgment message for the second message and that is sent by the AsDU by using the AsCU.

11. A communication method, comprising:
sending, by a second device, a first message to a first device, wherein the first message is used by the first device to determine that the second device is a secondary access network device of a terminal device in a first state, the first device is a primary access network device of the terminal device in the first state, the terminal device in the first state does not send channel state information to the first device, and a core network device and the first device reserve a data plane connection of the terminal device in the first state, and wherein the first message comprises identification information of the terminal device in the first state;
receiving, by the second device, a second message sent by the first device based on the first message, wherein the second message is used to request to add the second device as the secondary access network device of the terminal device in the first state; and
sending, by the second device, an acknowledgment message for the second message to the first device based on the second message; and transmitting, by the second device, data for the terminal device by using the data plane connection between the first device and the core network device.

12. The method according to claim 11, wherein after the sending, by the second device, an acknowledgment message for the second message to the first device based on the second message, the method further comprises:
sending, by the second device, a third message to the terminal device in the first state, wherein the third message is used to notify the terminal device in the first state that the second device is the secondary access network device of the terminal device in the first state.

13. The method according to claim 12, wherein the third message comprises:
at least one of first indication information, identification information of the terminal device in the first state, identification information of a first radio bearer, type information of a radio bearer, and timing advance TA information, wherein the first indication information is used to indicate that the first device and the core network device reserve a data plane connection and/or the first device reserves a radio bearer of the terminal device in the first state, the identification information of the first radio bearer is used to identify a radio bearer that is able to be transmitted by the second device to the terminal device in the first state, the type information of the radio bearer is used to indicate an allocation manner between the first device and the second device and a protocol stack corresponding to the radio bearer, and the TA information is used to indicate time information of timing advance of uplink synchronization between the terminal device in the first state and the second device.

14. The method according to claim 11, wherein the second message comprises:
at least one of the identification information of the terminal device in the first state, the type information of the radio bearer, and identification information of at least one radio bearer that the first device requests the second device to transmit, wherein the type information of the radio bearer is used to indicate the allocation manner between the first device and the second device and the protocol stack corresponding to the radio bearer; and/or
the acknowledgment message for the second message comprises the identification information of the first radio bearer that is able to be transmitted by the second device to the terminal device in the first state, and the identification information of the at least one radio bearer comprises the identification information of the first radio bearer.

15. The method according to claim 11, wherein the sending, by the second device, the first message to the first device comprises:
sending, by the second device, a first measurement report to the first device, wherein the first measurement report is used to indicate first channel quality information between the terminal device in the first state and the second device; and
the receiving, by the second device, the second message sent by the first device based on the first message comprises:
receiving, by the second device, the second message sent by the first device based on the first channel quality information.

16. A communications apparatus, comprising:
a transceiver configured to receive a first message, wherein the apparatus is a primary access network device of a terminal device in a first state, the terminal device in the first state does not send channel state information to the apparatus, and a core network device and the apparatus reserve a data plane connection of the terminal device in the first state, and wherein the first message comprises identification information of the terminal device; and
a processor connected to the transceiver and configured to determine, based on the first message, that a second device is a secondary access network device of the terminal device in the first state; wherein
the transceiver is further configured to send a second message to the second device, wherein the second message is used to request to add the second device as the secondary access network device of the terminal device in the first state; and the transceiver receives an acknowledgment message for the second message and that is sent by the second device based on the second message, wherein the apparatus and the core network device reserve at least one data plane connection and wherein the at least one data plane connection is shared with the second device for transmitting data of the terminal device by the second device.

17. The apparatus according to claim 16, wherein the transceiver is further configured to:
after receiving the acknowledgment message for the second message and that is sent by the second device based on the second message, send a third message to the terminal device in the first state, wherein the third message is used to notify the terminal device in the first state that the second device is the secondary access network device of the terminal device in the first state.

18. The apparatus according to claim 17, wherein the third message comprises:
at least one of first indication information, identification information of the terminal device in the first state, identification information of a first radio bearer, type information of a radio bearer, and timing advance TA information, wherein the first indication information is used to indicate that the apparatus and the core network device reserve a data plane connection and/or the apparatus reserves a radio bearer of the terminal device in the first state, the identification information of the first radio bearer is used to identify a radio bearer that is able to be transmitted by the second device to the terminal device in the first state, the type information of the radio bearer is used to indicate an allocation manner between the apparatus and the second device and a protocol stack corresponding to the radio bearer, and the TA information is used to indicate time information of timing advance of uplink synchronization between the terminal device in the first state and the second device.

19. The apparatus according to claim 16, wherein the second message comprises:
at least one of the identification information of the terminal device in the first state, the type information of the radio bearer, and identification information of at least one radio bearer that the apparatus requests the second device to transmit, wherein the type information of the radio bearer is used to indicate the allocation manner between the apparatus and the second device and the protocol stack corresponding to the radio bearer of the terminal device in the first state reserved by the core network device; and/or the acknowledgment message for the second message comprises the identification information of the first radio bearer that is able to be transmitted by the second device to the terminal device in the first state, and the identification information of the at least one radio bearer comprises the identification information of the first radio bearer.

20. The apparatus according to claim 16, wherein the transceiver is configured to:
receive a first measurement report, wherein the first measurement report is used to indicate first channel quality information between the terminal device in the first state and the second device; and
the processor is configured to:
determine, based on the first channel quality information, that the second device is the secondary access network device of the terminal device in the first state.

* * * * *

UNITED STATES PATENT AND TRADEMARK OFFICE
CERTIFICATE OF CORRECTION

PATENT NO. : 11,343,725 B2
APPLICATION NO. : 16/265756
DATED : May 24, 2022
INVENTOR(S) : Yinghao Jin et al.

It is certified that error appears in the above-identified patent and that said Letters Patent is hereby corrected as shown below:

In the Claims

In Column 86, Line 63, in Claim 3, delete "TA" and insert -- (TA) --.

In Column 88, Line 30, in Claim 10, delete "(AnCU)" and insert -- AnCU --.

In Column 88, Line 32, in Claim 10, delete "AsCU" and insert -- (AsCU) --.

In Column 89, Line 19, in Claim 13, delete "TA" and insert -- (TA) --.

In Column 90, Line 40, in Claim 18, delete "TA" and insert -- (TA) --.

Signed and Sealed this
Ninth Day of August, 2022

Katherine Kelly Vidal
*Director of the United States Patent and Trademark Office*